United States Patent [19]
Sites

[11] Patent Number: 5,287,490
[45] Date of Patent: Feb. 15, 1994

[54] IDENTIFYING PLAUSIBLE VARIABLE LENGTH MACHINE CODE OF SELECTING ADDRESS IN NUMERICAL SEQUENCE, DECODING CODE STRINGS, AND FOLLOWING EXECUTION TRANSFER PATHS

[75] Inventor: Richard L. Sites, Boylston, Mass.

[73] Assignee: Digital Equipment Corporation, Maynard, Mass.

[21] Appl. No.: 666,216

[22] Filed: Mar. 7, 1991

[51] Int. Cl.$^5$ .............................................. G06F 5/00
[52] U.S. Cl. ................................. 395/500; 395/200; 364/DIG. 1; 364/DIG. 2
[58] Field of Search .................... 395/500, 375, 200

[56] References Cited

U.S. PATENT DOCUMENTS 4,951,195  8/1990  Fogg, Jr. et al. ................. 395/500
5,005,119  4/1991  Rumbaugh et al. ............... 364/200

FOREIGN PATENT DOCUMENTS 0372835  6/1990  European Pat. Off. ....... G06F 9/45
9001738  2/1990  PCT Int'l Appl. ............ G06F 5/00

OTHER PUBLICATIONS

Michael Saari, 68000 Binary Code Translator, 1987 FORML Conference Proceedings pp. 48–52.
Hunter et al., "DOS at RISC", Byte vol. 14, No. 12, Nov. 1989 pp. 361–368.
Banning, "The XDOS Binary Code Conversion System", COMPCON 89 (Sep. 27, 1989) pp. 282–287.
S. Reiss, "PECAN: Program Development System That Supports Multiple Views," IEEE Transactions on Software Engineering, SE-11, No. 3, Mar. 1985, New York, N.Y., pp. 276–285.
Gaines, "On the Translation of Machine Language Programs," Communications of the Association for Computing Machinery, vol. 8, No. 12, (Dec. 1965), New York, N.Y., pp. 736–741.
Bergh et al., "HP 3000 Emulation on HP Precision Architecture Computers," Hewlett-Packard Journal, Dec. 1987, pp. 87–89.
Beyond RISC!—An Essential Guide To Hewlett-Packard Precision Architecture, Wayne E. Holt, Ed., 1988, pp. 225–238.
Eve M. Tanner, "Providing Programmers with a Driver Debug Technique," Hewlett-Packard Journal, Oct. 1989, pp. 76–80.
The Handbook of Artificial Intelligence vol. II Barr & Feigenbaum, eds., William Kaufmann, Los Altos, Calif, 1982, pp. 297–379.

*Primary Examiner*—Robert B. Harrell
*Assistant Examiner*—Timothy L. Philipp
*Attorney, Agent, or Firm*—Arnold, White & Durkee

[57] ABSTRACT

Information about the location of untranslated instructions in an original program is discovered during execution of a partial translation of the program, and that information is used later during re-translation of the original program. Preferably the information includes origin addresses of translated instructions and corresponding destination address of untranslated instructions of execution transfers that occur during the execution of the partial translation. Preferably this feedback of information from execution to re-translation is performed after each execution of the translated program so that virtually all of the instructions in the original program will eventually be located and translated. To provide an indication of the fraction of the code that has been translated, the program is scanned to find plausible code in the areas of memory that do not contain translated code. The plausible code is identified by selecting addresses according to three different scanning modes and attempting to decode variable-length instructions beginning at the selected addresses. The scanning modes include a first mode in which addresses are selected in numerical sequence by a scan pointer, a second mode in which addresses are selected in instruction-length sequence by an instruction decode pointer, and a third mode in which the selected addresses are destination addresses of previously-decoded execution transfer instructions.

26 Claims, 28 Drawing Sheets

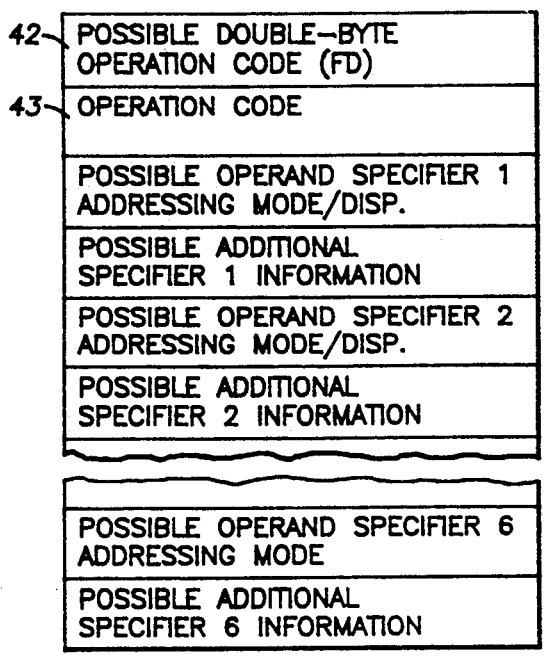

*FIG. 3*

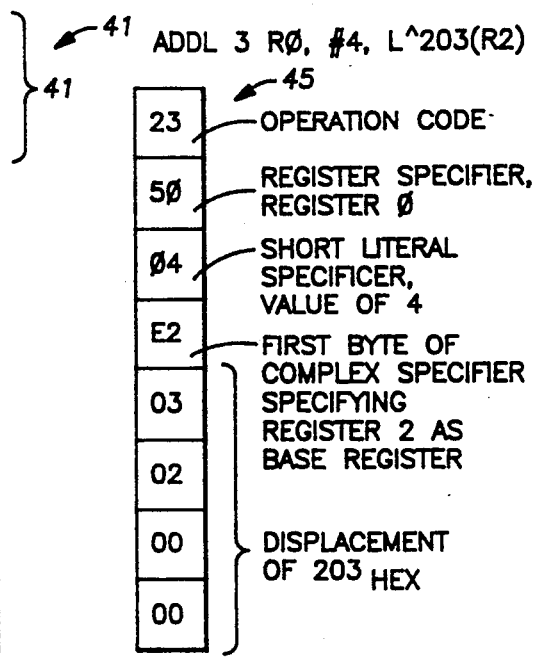

*FIG. 4*

| REGISTER MODE FIELD | REGISTER ADDRESS FIELD | |
|---|---|---|
| 0-3 | LITERAL | SHORT LITERAL SPECIFIER |
| 4 | REG. | INDEX REGISTER FOR COMPLEX SPECIFIER |
| 5 | REG. | REGISTER SPECIFIER |
| 6 | REG. | REGISTER DEFERRED |
| 7 | REG. | AUTODECREMENT |
| 8 | REG. | AUTOINCREMENT/IMMEDIATE |
| 9 | REG. | AUTOINCREMENT DEFERRED/ABSOLUTE |
| A | REG. | BYTE DISPLACEMENT |
| B | REG. | BYTE DISPLACEMENT DEFERRED |
| C | REG. | WORD DISPLACEMENT |
| D | REG. | WORD DISPLACEMENT DEFERRED |
| E | REG. | LONGWORD DISPLACEMENT |
| F | REG. | LONGWORD DISPLACEMENT DEFERRED |

7' 6' 5' 4' 3' 2' 1' 0

FIRST BYTE OF SPECIFIER

COMPLEX SPECIFIERS

*FIG. 5*

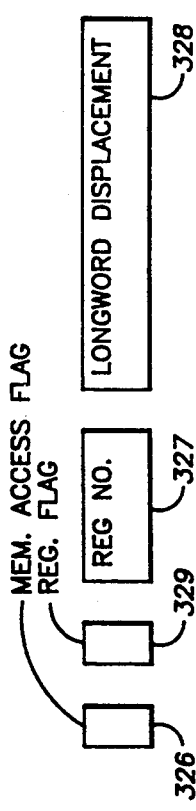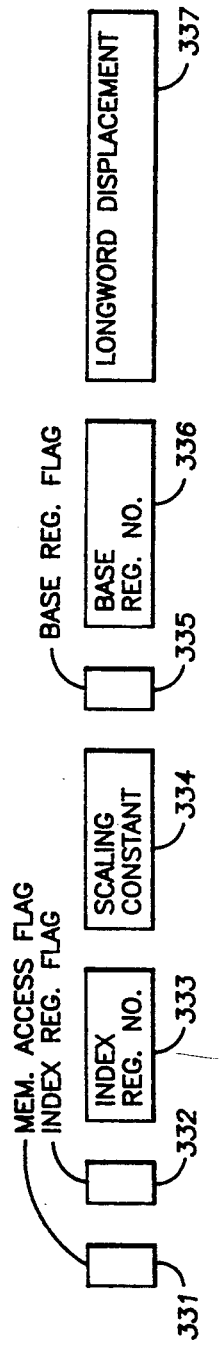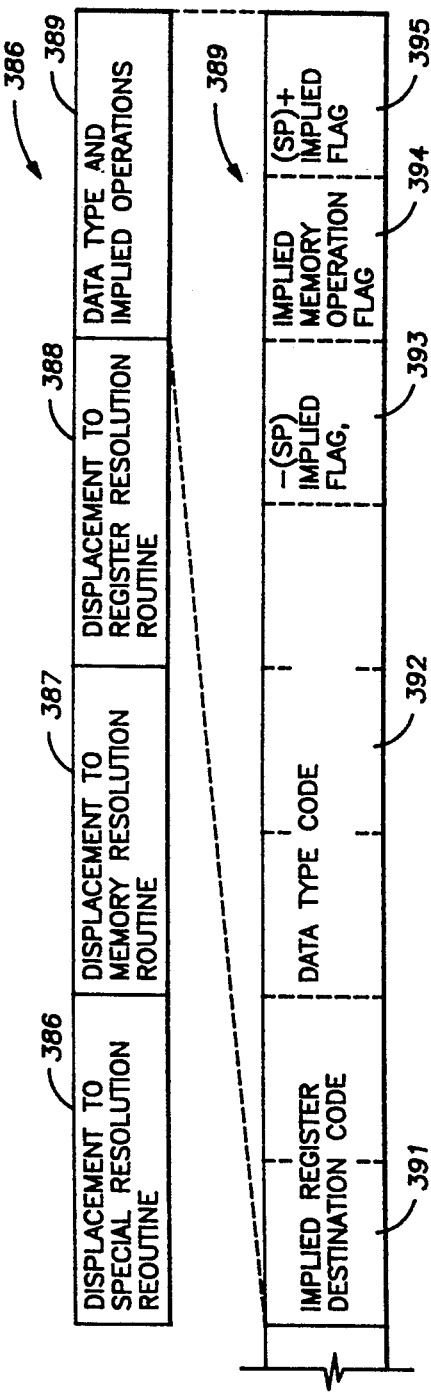

IDENTIFYING PLAUSIBLE VARIABLE LENGTH MACHINE CODE OF SELECTING ADDRESS IN NUMERICAL SEQUENCE, DECODING CODE STRINGS, AND FOLLOWING EXECUTION TRANSFER PATHS

RELATED APPLICATIONS

This application discloses subject matter that is related to subject matter disclosed in the following co-pending applications, which are filed herewith and assigned to Digital Equipment Corporation, the assignee of the present invention, and are incorporated by reference herein:

Richard L. Sites, BRANCH RESOLUTION VIA BACKWARD SYMBOLIC EXECUTION, U.S. application Ser. No. 666,070, filed Mar. 7, 1991;

Richard L. Sites, USE OF STACK DEPTH TO IDENTIFY MACHINE CODE MISTAKES, U.S. application Ser. No. 666,210, filed Mar. 7, 1991;

Scott Robinson, Richard L. Sites, and Richard Witek, IMPROVED SYSTEM AND METHOD FOR PRESERVING INSTRUCTION STATE-ATOMICITY FOR TRANSLATED PROGRAM CODE, U.S. application Ser. No. 666,071, filed Mar. 7, 1991;

Richard L. Sites, CROSS-IMAGE REFERENCING OF PROGRAM CODE, U.S. application Ser. No. 666,223, filed Mar. 7, 1991;

Scott Robinson and Richard L. Sites, IMPROVED SYSTEM AND METHOD FOR PRESERVING INSTRUCTION GRANULARITY FOR TRANSLATED PROGRAM CODE, U.S. application Ser. No. 666,025, filed Mar. 7, 1991;

Thomas R. Benson, USE OF STACK DEPTH TO IDENTIFY ARCHITECTURE AND CALLING STANDARD DEPENDENCIES IN MACHINE CODE, U.S. application Ser. No. 666,083, filed Mar. 7, 1991;

Thomas R. Benson, REGISTER USAGE TRACKING TO SUPPORT COMPILED 32-BIT CODE IN 64-BIT ENVIRONMENT, U.S. application Ser. No. 666,084, filed Mar. 7, 1991;

Thomas R. Benson, MAPPING ASSEMBLY LANGUAGE ARGUMENT LIST REFERENCES ACROSS MACHINE ARCHITECTURES, U.S. application Ser. No. 666,085, filed Mar. 7, 1991;

Thomas R. Benson, TRACKING VAX TM CONDITION CODES FOR PORTING TO RISC ARCHITECTURE, U.S. application Ser. No. 666,082, filed Mar. 7, 1991;

Daniel L. Murphy, EFFICIENT AND FLEXIBLE LINK OF PROGRAM UNITS AT PROGRAM ACTIVATION, U.S. application Ser. No. 666,023, filed Mar. 7, 1991; and Daniel L. Murphy, AUTOMATIC ADJUSTMENT OF INTERFACE CONVENTIONS BETWEEN TWO DISSIMILAR PROGRAM UNITS, U.S. application Ser. No. 666,028, filed Mar. 7, 1991.

This application discloses subject matter that is also disclosed in Richard L. Sites, SUCCESSIVE TRANSLATION, EXECUTION AND INTERPRETATION OF COMPUTER PROGRAM HAVING CODE AT UNKNOWN LOCATIONS DUE TO EXECUTION TRANSFER INSTRUCTIONS HAVING COMPUTED DESTINATION ADDRESSES, U.S. application Ser. No. 07/666,196, filed Mar. 7, 1991.

BACKGROUND OF THE INVENTION

1. Field of the Invention

The present invention relates to the translation of program code for a digital computer, and more particularly to the translation of program code from one language to another in cases where the location of all of the program code to be translated is not known until the program code is actually executed.

2. Description of the Background Art

Computer language translation programs are well known for translating high-level languages such as Pascal, Fortran, Cobol, PL/I or C into machine language. For these languages, programs are coded in an English-like style. A language translation program called a compiler reads the high level language program (called the source program) and translates it into a machine language program (called the object program).

One major advantage of high level languages, besides the ease with which they can express algorithms, is their machine independence. They hide the specifics of the hardware machine and instruction set. Nonetheless, there are a number of applications where machine language programming is desirable. To increase the execution speed of a program, it is often desirable 15 to write code for repetitively executed procedures in machine language to minimize the number of machine cycles that are needed to execute the procedures. Machine language programming is also required in many computer systems to directly control specific hardware features of a particular computer. For example, the parts of an operating system that manage memory and input/output devices are often written in machine language.

Machine language programming is usually written in assembly language code instead of binary code. Assembly language permits the programmer to specify machine operations using symbolic names for memory locations and instructions. A program called an assembler translates the assembly language program into binary machine code. The assembler does all of the work of remembering the values of symbols and the addresses of data elements. However, unlike the high level language, each assembly language instruction corresponds to exactly one machine instruction.

More recently there has arisen a need to translate machine language for one kind of computer to machine language for another kind of computer. This need has arisen due to rapid advances in computer hardware that have made new computer architectures more cost effective. In particular, for more than a decade most high performance computers for general purpose applications used a "complex instruction set architecture" (CISC) characterized by having a large number of instructions in the instruction set, often including variable-length instructions and memory-to-memory instructions with complex memory accessing modes. The VAX TM instruction set is a primary example of CISC and employs instructions having one to two byte opcodes plus from zero to six operand specifiers, where each operand specifier is from one byte to eighteen bytes in length. The size of the operand specifier depends upon the addressing mode, size of displacement (byte, word or longword), etc. The first byte of the operand specifier describes the addressing mode for that operand, while the opcode defines the number of operands: zero to six. The opcode itself, however, does not always determine the total length of the instruction, because many opcodes can be used with operand specifiers of different lengths. Another characteristic of the VAX TM instruction set is the use of byte or byte string memory references, in addition to quadword or longword references; that is, a memory reference may be of a length variable from one byte to multiple words, including unaligned byte references.

The CISC architecture provided compactness of code, and also made assembly language programming easier. When the central processor units (CPU) were much faster than memory, it was advantageous to do more work per instruction, because otherwise the CPU would spend an inordinate amount of time waiting for the memory to deliver instructions. Recently, however, advances in memory speed as well as techniques such as on-chip cache and hierarchical cache have eliminated the primary advantages of the CISC architecture. Therefore the selection of the instruction architecture is now dictated by the required complexity of the CPU for maximizing execution speed at reasonable cost. These considerations indicate that a reduced instruction set architecture (RISC) has superior performance and cost advantages.

Reduced instruction set or RISC processors are characterized by a smaller number of instructions which are simple to decode, and by the requirement that all arithmetic/logic operations are performed register-to-register. Another feature is that complex memory accesses are not permitted; all memory accesses are register load/store operations, and there are only a small number of relatively simple addressing modes, i.e., only a few ways of specifying operand addresses. Instructions are of only one length, and memory accesses are of a standard data width, usually aligned. Instruction execution is of the direct hardwired type, as distinct from microcoding. There is a fixed instruction cycle time, and the instructions are defined to be relatively simple so that they all execute in one short cycle (on average, since pipelining will spread the actual execution over several cycles).

Unfortunately there is a vast amount of computer software already written for established instruction architectures, and much of that software includes machine language programming that did not originate from the compilation of a high-level language. In these cases the software can not be "ported" to the new computer architecture by the usual method of re-compiling the source code using a compiler written for the new instruction architecture.

In some cases, assembly language code exists for the machine language programming of existing computer software. Therefore it should be possible to write a translator program for translating each assembly language instruction into one or more machine instructions in the new instruction architecture that perform the same basic function. The practicality of such a direct translation is dependent upon the compatibility of the new instruction architecture. For translating CISC code including VAX TM instructions to RISC code, for example, the practicality of the translation is improved significantly by innovations in the RISC CPU hardware and the RISC instruction set, as further described in Richard L. Sites and Richard T. Witek, "Branch Prediction in High-Performance Processor," U.S. application Ser. No. 07/547,589 filed Jun. 29, 1990, herein incorporated by reference.

In many cases existing computer software includes binary machine language code for which there does not exist a complete or coherent set of high-level or assembly language source code. This presents a very difficult problem of locating all of the binary machine code to translate. In the usual case a portion of the binary machine code in a program cannot be found prior to execution time because the code includes at least one execution transfer instruction, such as a "Jump" or "Call" instruction, having a computed destination address. At execution time, the destination address is computed, and execution is transferred from the instruction to the "missing" code.

In more unusual cases, some of the binary machine code in a program is not created until execution time. These unusual cases are typically due to poor programming techniques, although code is often created at execution time for security purposes, for example, as part of a "license check" routine. The "license check" routine, for example, writes a sequence of instructions to a scratch memory area and then executes the sequence of instructions. To circumvent the licensing routine, one must discern the mode of operation of the routine from the sequence of instructions written to the scratch area. But the sequence of instructions is absent from the usual print-out or dump of the program, because the sequence of instructions does not exist until execution time.

When there is a problem of locating all of the machine code in an original program, the code has been interpreted at execution time. The translation process of the interpreter is similar to an assembly language translator, but interpretation at execution time is about two orders of magnitude slower than execution of translated code, due to the fact that a multiplicity of instructions in the interpreter program must be executed to interpret each machine instruction. To permit the use of an incomplete translation, an interpreter program, a copy of the original program, and address conversion information is provided together with the translated code when porting the original program to a CPU using the new instruction architecture. When execution of the translated code reaches a point corresponding to an execution transfer in the original program to untranslated code, the CPU transfers execution instead to the interpreter program to interpret the untranslated code in the original program. The interpreter successively translates each untranslated machine instruction into one or more machine instructions for the new architecture and executes them. The interpreter uses the address conversion information to transfer execution back to the translated program at an appropriate time. The presence of untranslated code, however, has a substantial impact on performance unless almost all of the instructions can be located and translated prior to execution time.

SUMMARY OF THE INVENTION

The present invention concerns the problem of finding plausible instructions in a machine language program. A machine language program typically includes data, such as ASCII characters, as well as machine language instructions. A machine language program may also include unused address locations that are often cleared or set to zero. Often the data or the content of the unused address locations will have the appearance of program instructions.

For translating the machine language program, it is desirable to identify the locations of the instructions in the program. The machine language program typically has a known starting address, where a sequence of instructions begins. Therefore the locations of at least some of the instructions can be identified with certainty by decoding instructions and building a flowgraph of the decoded instructions. In may cases, however, the locations of all of the instructions in the program cannot be determined by this technique, because the decoded instructions may include execution transfer instructions having computed destination addresses, and it may not be possible to determine the values of the computed destination addresses until the time that the program is executed.

When it is not possible to determine with certainty the address locations of all of the instructions of the program, it is desirable to scan the remaining address locations, which do not contain the known code, to find address locations that appear to be true instructions of the program. Such address locations will then be said to contain "plausible" instructions.

In accordance with a basic aspect of the invention, a scan of the program is performed to search for address locations containing plausible binary machine instructions. The result of such a scan is useful for quantifying the number of plausible instructions in the original program for comparison to the number of instructions located by the translator. The result of the comparison, for example, is an estimate of the fraction of instructions that were translated. This estimate can be used by a systems analyst in choosing a porting strategy for the original program or for monitoring or augmenting the performance of the translator. If the translator is unable to translate a high percentage of the instructions, then the systems analyst may run a number of test cases upon the translated program and employ the technique of feedback of information from execution to re-translation to reduce the indicated estimate of untranslated code before releasing the translated program for general use. As a last resort, the systems analyst may have to search for documentation by the original programmer or inspect the code at the address locations indicated as containing plausible instructions in an attempt to verify the estimate and make a judgement whether to release the translated program for general use, or to direct the translator to translate the plausible code that is believed to contain untranslated instructions.

Preferably the scan for plausible code recognizes legal instructions in a variable-length instruction set including instructions that are contained in a variable number of addressable memory locations in the program, and the scan switches between three different scanning modes. In a first scanning mode, the entire program is scanned for legal instructions starting at each and every addressable memory location of the program. When a legal instruction is found in the first scanning mode, the scan switches to a second scanning mode of inspecting addressable memory locations immediately following the legal instruction found in the first scanning mode. The second scanning mode searches for a full block of instructions having of a series of consecutive legal instructions up to and including an execution transfer instruction. If an illegal instruction is found during this second scanning mode, then the scan switches back to the first scanning mode, starting at the addressable memory location immediately following the first addressable memory location of the legal instruction just previously found in the first scanning mode. If an illegal instruction is not found during this second scanning mode, then the scan switches to a third scanning mode which checks whether there is a known valid destination address for the execution transfer instruction at the end of the full block, and if so, checks whether there is a valid instruction beginning at the known valid destination address. A known destination address is considered invalid when it is outside of the address range of the program, or when it is in the middle of a previously-found instruction of the program. If the third scanning mode concludes that there is a valid instruction beginning at the known valid destination address, then the full block is considered to be plausible code.

Preferably the scanning for plausible code uses heuristics based upon the properties and characteristics of the specific instruction architecture, typical data structures, and system architecture associated with the program. If the instruction architecture has privileged instructions that are not permitted in user-mode programs, then during a scan for plausible code in a user-mode program, privileged instructions are considered illegal. Data structures and other areas of a program which do not include instructions are often cleared. In this case, scanning in the first scanning mode should skip over any addressable memory location containing all zeros. If the variable-length instruction architecture is highly complex, then it is rather unlikely that an instruction will be contained in a single addressable memory location. In this case, scanning in the first scanning mode should skip over any instruction contained in a single addressable memory location. If most of the character data are represented in the program by codes that are also used in the instruction architecture, then the first scanning mode should skip over strings of these codes that could represent both character data or instructions.

BRIEF DESCRIPTION OF THE DRAWINGS

Other objects and advantages of the invention will become apparent upon reading the following detailed description and upon reference to the drawings in which:

FIG. 3 is a diagram showing the preferred format of a variable length instruction from the complex instruction set;

FIG. 4 is a diagram of a particular variable length instruction for performing an addition between longwords;

FIG. 5 is a table showing the decoding of the mode information in the first byte of a specifier;

FIG. 21 is a fixed format representation of a term in a symbolic expression for a destination address that may include a constant displacement, a specified general purpose register, and an indication of direct or indirect memory access;

FIG. 22 is a fixed format representation of a term in a symbolic expression for a destination address that may include a constant displacement, a specified general purpose "base" register, a specified general purpose "index" register, a constant offset, and an indication of direct or indirect memory access;

FIG. 26 is a format for data that could be predetermined for each possible instruction opcode to assist in pushing symbolic expressions backward through instructions;

Figure 1:
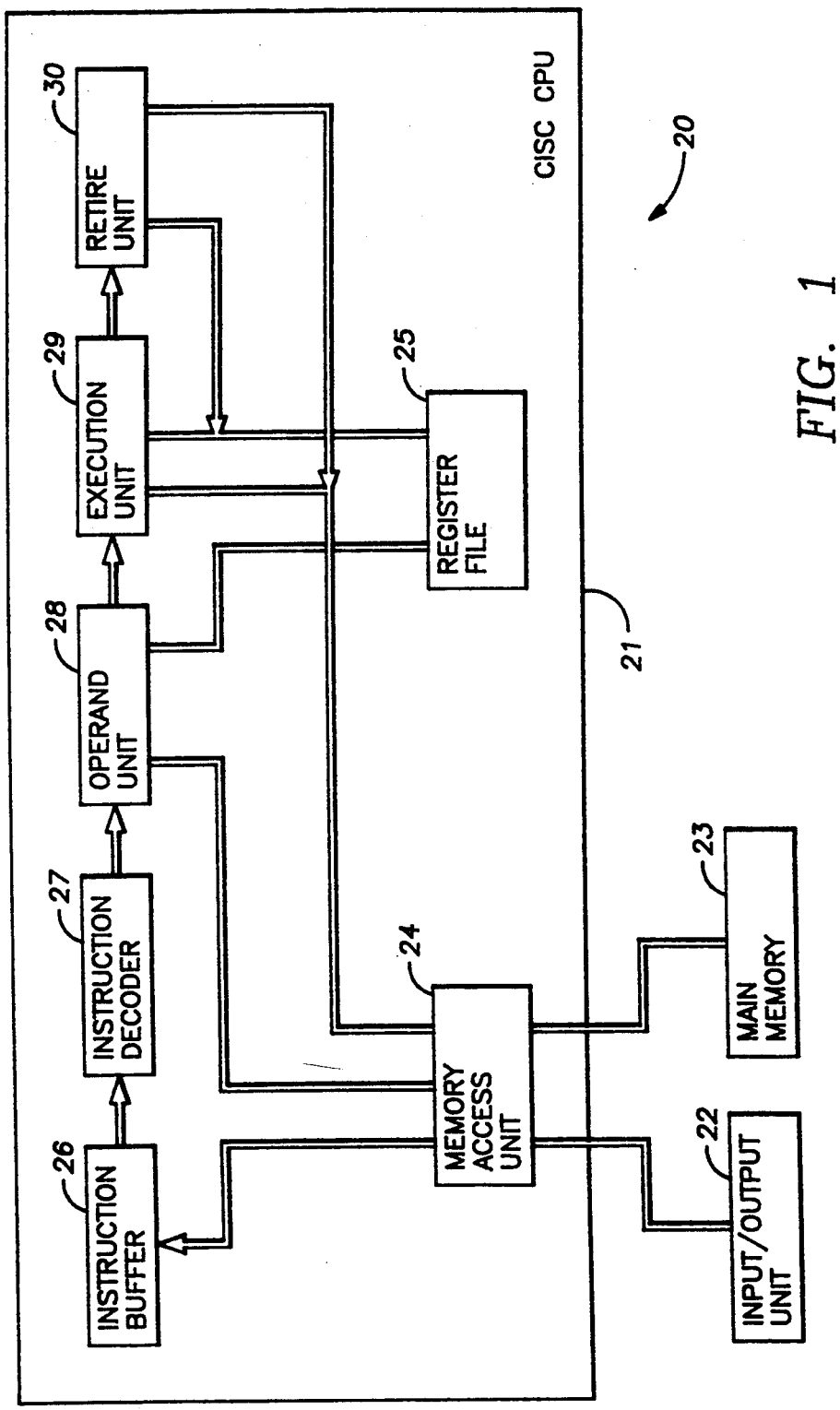
FIG. 1 is a block diagram of a CISC digital computer system having a pipelined processing unit especially constructed for processing complex instructions.

While the invention is susceptible to various modifications and alternative forms, a specific embodiment thereof has been shown by way of example in the drawings and will be described in detail herein. It should be understood, however, that it is not intended to limit the invention to the particular form disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

The preferred embodiment of the invention is advantageously employed in translating program code for a complex instruction set computer (CISC) to program code for a reduced instruction set computer (RISC).

Turning now to the drawings and referring first to FIG. 1, there is shown a complex instruction set digital computer 20 which includes a central processing unit 21, an input/output unit 22, and a main memory 23.

Both data and instructions for processing the data are stored in addressable storage locations within the main memory 23. An instruction includes an operation code (opcode) that specifies, in coded form, an operation to be performed by the CPU, and operand specifiers that provide information for locating operands. In a typical CISC instruction architecture, the first byte of each instruction contains the opcode, and the following bytes contain the operand specifiers. The instructions preferably have a variable length, and various types of specifiers can be used with the same opcode, as disclosed in Strecker et al., U.S. Pat. No. 4,241,397 issued Dec. 23, 1980, incorporated herein by reference.

The main memory 23 includes a large amount of storage, and therefore it is constructed of inexpensive but relatively slow storage devices such as dynamic random access (DRAM) memory chips. Because the CPU 21 executes instructions at a faster rate than the access time of the main memory, the CPU includes a memory access unit 24 that keeps a copy of a portion of the data and instructions in a high-speed cache memory of relatively small storage capacity. Usually the CPU obtains the data and instructions that it needs from the cache memory in the memory access unit 24, and when the required instructions or data are not found in the cache memory, the memory access unit accesses the main memory unit 23 to "refill" the cache memory with the required instructions or data.

The memory access unit 24 may also include means such as a translation buffer for translating "virtual" addresses used in the instructions to "physical" addresses used in the main memory 23. This technique permits the programmer to reference a "virtual address space" including a greater number of addressable memory locations than are provided in the main memory 23. Therefore the programmer is less constrained by limited storage capacity of the main memory 23.

To provide even faster access to data, the instructions may reference a limited number of general purpose registers included in a multi-port register file 25. Some of these general purpose registers may be assigned specific functions, for example, one general purpose register is typically used as a "program counter" and provides the address of the instruction being decoded when referenced as a source operand or specifies the address of the next instruction to be decoded when referenced as a destination operand.

The execution of an individual instruction is broken down into multiple sub-tasks that are performed by respective pipelined functional units. These pipelined functional units include an instruction buffer 26 for fetching instructions from memory, an instruction decoder 27 for decoding the fetched instructions, an operand unit 28 for fetching source operands identified by source operand specifiers, an execution unit 29 for performing arithmetic, logic, and special operations upon the source operands to obtain results, and a retire unit 30 for storing the results at memory locations or registers identified by destination operand specifiers.

For further details regarding the preferred construction of the complex instruction set digital computer 20, one may refer to Fite et al., "Decoding Multiple Specifiers in a Variable Length Instruction Architecture", U.S. Pat. No. 5,148,528, issued Sep. 15, 1992 filed Feb. 3, 1989, incorporated herein by reference.

Figure 2:
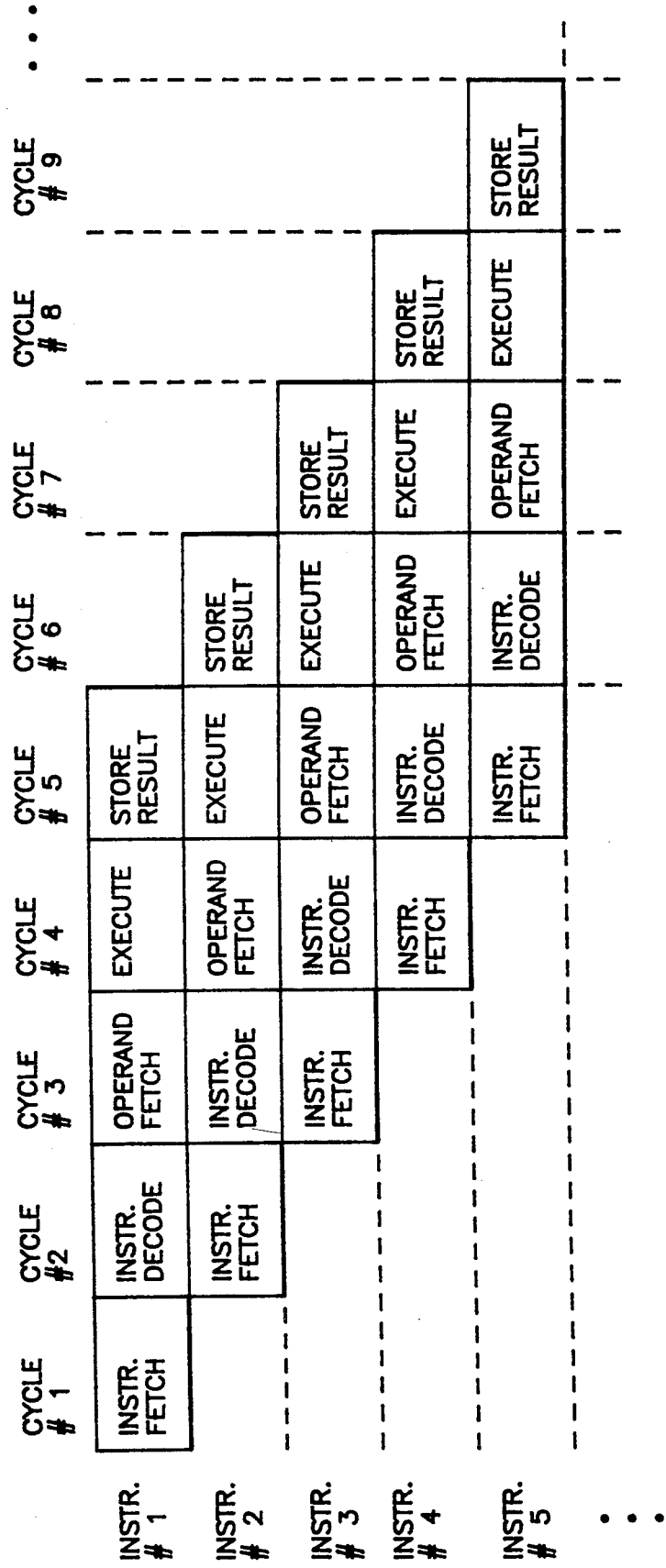
FIG. 2 is a diagram showing the state of the pipelined processing unit of FIG. 1 when simultaneously performing different tasks for a number of instructions.

Turning now to FIG. 2, there is shown a state diagram of the pipelined functional units (26–30 in FIG. 1) for an ideal situation where the digital computer (20 in FIG. 1) executes instructions at an average rate of one instruction per cycle. Generally, the following steps are performed during the execution of each instruction by respective ones of the pipelined units 26–30: instruction fetch, instruction decode, operand fetch, execute, and store result.

One cycle is the minimum time for each functional unit to perform its sub-task. A given functional unit might not perform its sub-task in a single cycle due to contention in the memory access unit (24 in FIG. 1), for example, when the memory access unit is performing a "refill" operation. Moreover, when executing particularly complex instructions, a given functional unit may require more than one cycle to perform its sub-task due to the complexity of the instruction. In any case, by the use of dedicated hardware stages, the steps can be overlapped to some degree in pipelined operation, thereby increasing the total instruction throughput.

FIG. 3 depicts a typical instruction 40 that can be processed by the central processing unit (CPU) shown in FIG. 1. This instruction corresponds to the VAX TM variable-length instruction architecture as described in Levy and Eckhouse, Jr., *Computer Programming and Architecture, The VAX*-11, Digital Equipment Corporation, (1980), incorporated herein by reference. The instruction 40 includes an operation code 41 consisting of either one or two bytes. If the first byte 42 has a value of FD hexadecimal, then it is recognized as a double-byte operation code. Otherwise, the instruction decoder (27 in FIG. 1) recognizes the operation code as including only a single byte. The instruction 40 may further include up to six specifiers following the operation code.

The operation code indicates how many specifiers are included in the instruction. The specifiers used in connection with any given operation code may have various attributes and different lengths. The attributes of a particular specifier are determined at least in part by an addressing mode in the first byte of the specifier. However, the permissible attributes of the specifier are sometimes limited by the operation code. Further, for a particular kind of addressing mode known as "immediate addressing," the length of the specifier information is determined by a "data type" specified by the specifier.

A specific variable length instruction is shown in FIG. 4. In assembler notation, this instruction is written as "ADDL3 R0,#4,L^203(R2)". In machine code, the instruction includes eight bytes generally designated 45. The first byte is an operation code of 23 hexadecimal which corresponds to the assembler mnemonic "ADDL3." The operation code indicates that a first longword operand is to be added to a second longword operand and the longword result is to be stored at a destination.

Following the operation code is a "register specifier" having a value of 50 hexadecimal. The hexadecimal digit of 5 denotes that the specifier is a register specifier, and the hexadecimal digit 0 indicates that the specified register is the R0 general purpose register in the CPU. The register specifier therefore specifies that the first source operand is the content of the general purpose register R0.

Following the register specifier is a "short literal specifier" having a value of 04 hexadecimal. The short literal specifier specifies a value of four for the second source operand.

Following the short literal specifier is the first byte of a "complex specifier" that specifies the destination of the addition operation. The hexadecimal digit E indicates a "longword displacement" addressing mode in which the following four bytes are to be interpreted as a thirty-two-bit address displacement to be added to the value of the content of a base register to obtain an address specified by the complex specifier. The hexadecimal digit 2 indicates that the general purpose register R2 is to be used as the base register. The complex specifier therefore specifies that the sum or result of the longword addition indicated by the operand code is to be stored in memory at an address computed by adding the value of 203 hexadecimal to the content of the general purpose register R2.

Turning now to FIG. 5, there is shown a decoding table for decoding the first byte of an operand specifier which is not a branch displacement. If the two most significant bits of the first byte of the operand specifier are both zero, then the operand specifier consists of the single first byte, and the six least significant bits of this byte are interpreted or decoded as specifying a six-bit value referred to as a "short literal."

If the first two most significant bits of the first byte of an operand specifier are not zero, and assuming that the byte is not part of a branch displacement, then the byte is decoded as a particular one of twelve possible register addressing modes relating to a specified one of sixteen general purpose registers R0 to R15 in the CPU. The most significant four bits of the byte (constituting a register mode field) are decoded to indicate the addressing mode, and the four least significant bits (constituting a general purpose register address field) are used to address a particular one of the sixteen general purpose registers.

If the register mode field has a hexadecimal value of four, then an "index mode" is specified in which the value of the content of the general purpose register addressed by the register address field is multiplied by the size in bytes of the operand (e.g., by 1, 2, 4, 8 or 16 for respective byte, word, longword, quadword or octaword data types) and the sum is included as a term in the address computation performed for an immediately following complex specifier; the next byte must have a register mode field with a value of 6 to F hexadecimal, and a register address field which addresses a base register for the complex specifier.

If the register mode field has a hexadecimal value of five, then the specifier is a "register specifier" in which the operand value is found in the general purpose register indicated by the register address field or, if the specifier is for the destination of the instruction, then the specifier specifies that the result is to be stored in the general purpose register indicated by the register address field.

For each of register modes 6, 7 and 8, the designated register contains the memory address for the operand. For a source operand, the operand value is read from this memory address, and for a destination operand, the result is written to this memory address. In mode 6 the designated register contains the address of the operand. In register mode 7 the content of the designated general purpose register is first decremented before computation of the address; in mode 8 the content of the designated general purpose register is incremented after the register is used to compute the address. Register mode 9 is similar to register mode 8, except that the content of the designated general purpose register specifies the address in memory at which the operand address will be found rather than the operand itself.

Modes 10 through 15 are various kinds of "displacement modes." In a displacement mode a displacement value, which may comprise a byte, word, or longword in modes 10, 12 and 14 respectively, is added to the content of the designated general purpose register to obtain the operand address. The operand is determined in a similar fashion in modes 11, 13 and 15 except that the sum of the displacement value and the content of the general purpose register identifies a memory address at which the address of the operand can be found.

In modes 8 through 15, the register address field of the first byte of the operand specifier can designate any of the general purpose registers, including register R15 which is the program counter. For modes 8 and 9, if the program counter is addressed, the value of the program counter itself is incremented which causes program execution to jump over operand data or an operand address disposed in the instruction stream. In mode 8, this special case is known as an "immediate" addressing mode, and for mode 9 it is known as an "absolute" addressing mode. Specifically, when modes 8 and 9 are decoded for any of the general purpose registers 0 through 14, the next specifier or the next operation code appears immediately following the byte designating the mode and the general purpose register. For the immediate mode, however, a number of bytes of the immediate data appear and the number of bytes is determined by the specifier's datatype.

Because of the variety and complexity of the VAX TM variable-length instructions, the digital computer 20 of FIG. 1 is very complex to achieve performance approaching the ideal of one VAX TM variable-length instruction executed per cycle. Recent advances in semiconductor processing technology and memory architecture, however, have made it possible to fabricate a single-chip central processing unit having comparable performance when executing only simple instructions. To achieve comparable performance, the so-called "reduced instruction set computer" (RISC) executes simple instructions at a rate substantially in excess of one instruction per cycle. This performance is obtained with minimum hardware complexity by imposing the requirement that all arithmetic/logic operations are performed register-to-register. In addition, complex memory accesses are not permitted; all memory accesses are register load/store operations, and there are only a small number of relatively simple addressing modes, i.e., only a few ways of specifying operand addresses. Instructions are of only one length, and memory accesses are of a standard data width, usually aligned. Instruction execution is of the direct hardwired type, as distinct from microcoding.

Figure 6:
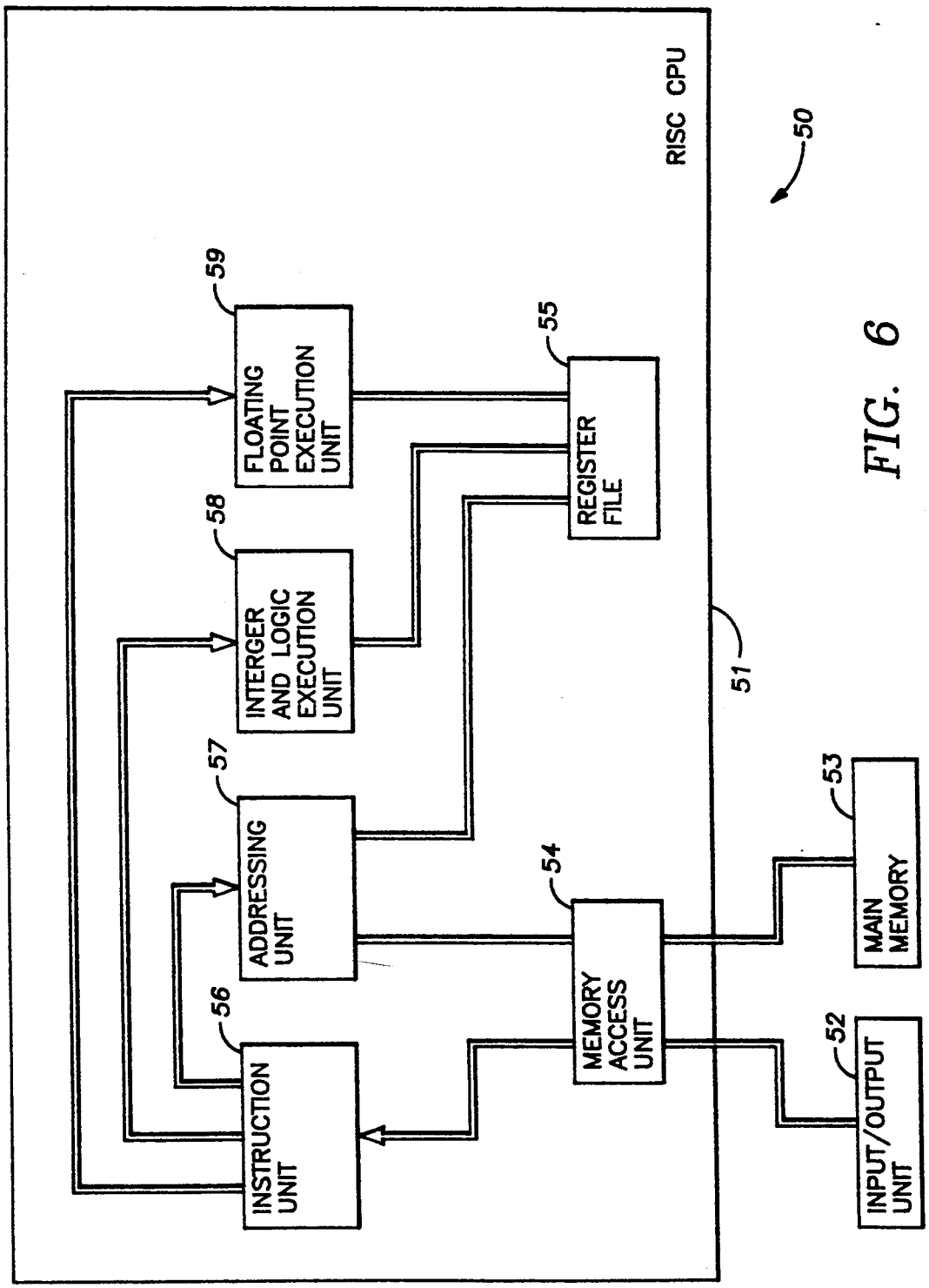
FIG. 6 is a block diagram of a RISC digital computer system.

Turning now to FIG. 6, there is shown a block diagram of a reduced instruction set (RISC) computer 50. The RISC computer 50 includes a central processing unit 51, an input/output unit 52, and a main memory 53. The central processing unit 51 includes a memory access unit 54, register file 55, and a number of functional units including an instruction unit 56, an addressing unit 57, an integer and logic execution unit 58, and a floating point execution unit 59. Because all arithmetic/logic operations are performed register-to-register, the execution units 58, 59 do not directly access the memory unit 54. Memory-to-register load operations and register-to-memory store operations are performed by the addressing unit 57.

To execute instructions at a rate substantially in excess of one per cycle, the instruction unit 56 can fetch and decode at least two instructions simultaneously when resources are available, and the addressing unit 57, the integer and logic execution unit 58, and the floating point execution unit 59 can execute three different instructions simultaneously. In a preferred implementation, for example, two instructions can be decoded and issued simultaneously when one instruction is from Column A and the second instruction is from Column B:

| Column A | Column B |
|---|---|
| Integer Operate | Floating Operate |
| Floating Load/Store | Integer Load/Store |
| Floating Branch | Integer Branch |
| | JSR |

For further details regarding the RISC computer 50 of FIG. 6, one may refer to the above-mentioned Richard L. Sites and Richard T. Witek, "Branch Prediction in High-Performance Processor," U.S. application Ser. No. 07/547,589 filed Jun. 29, 1990, herein incorporated by reference.

Figure 7:
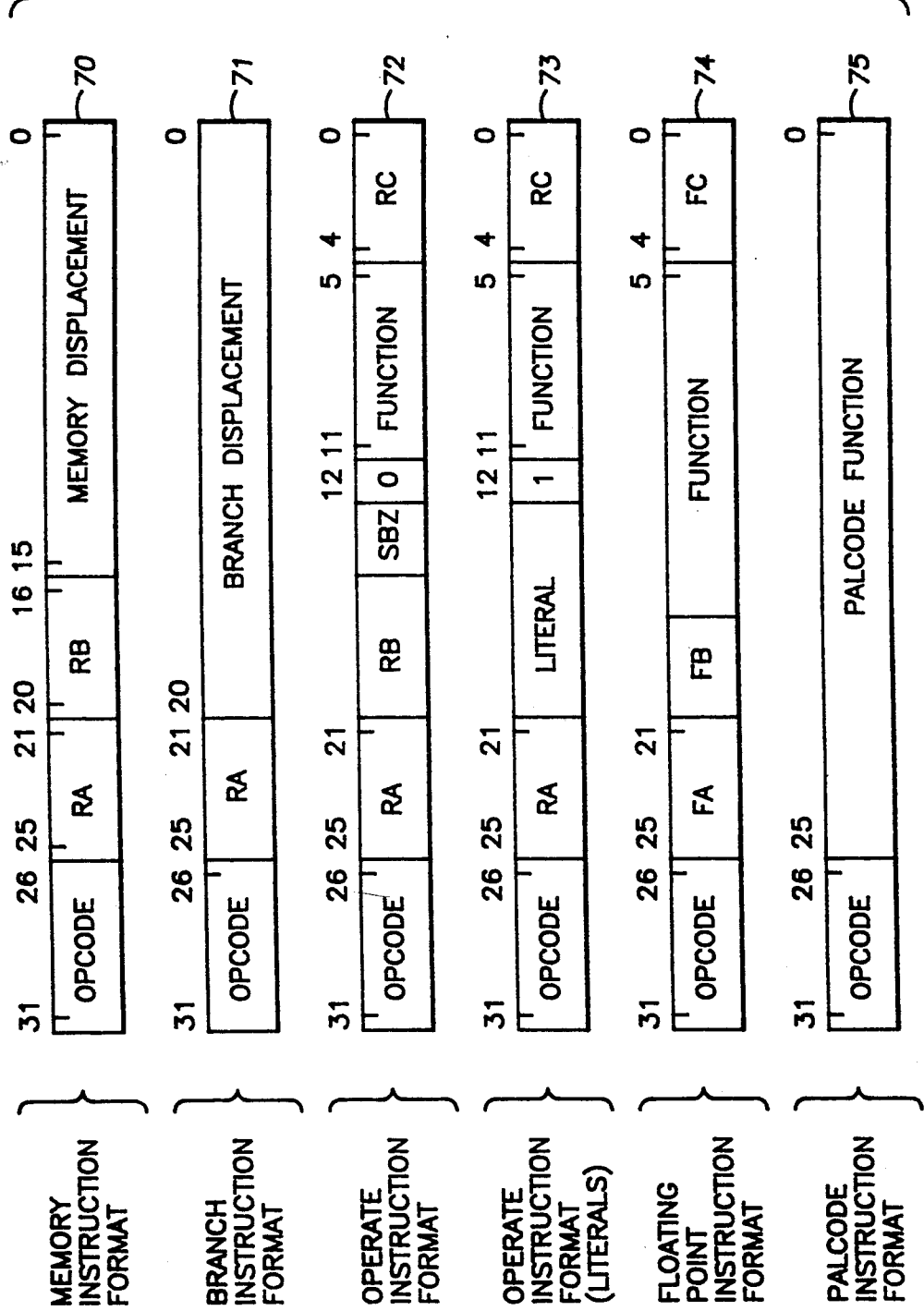
FIG. 7 is a block diagram of preferred instruction formats for instructions in the RISC instruction set.

Referring to FIG. 7, there are shown the preferred formats of the various types of instructions of the RISC instruction set executed by the computer 50 of FIG. 6. Each instruction has a fixed length of 32 bits.

A memory instruction 70 contains a 6-bit opcode in bits <31:26>, two 5-bit register address fields Ra and Rb in bits <25:21> and <20:16>, and a 16-bit signed displacement in bits <15:0>. This instruction is used to transfer data between the register file and memory, to load an effective address to a register in the register file, and for subroutine jumps. The displacement field <15:0> is a byte offset; it is sign-extended and added to the contents of register Rb to form a virtual address. The virtual address is used as a memory load/store address or a result value depending upon the specific instruction.

A branch instruction 71 includes a 6-bit opcode in bits <31:26>, a 5-bit address field in bits <25:21>, and a 21-bit signed branch displacement in bits <20:0>. The displacement is treated as a longword offset, meaning that it is shifted left two bits (to address a longword boundary), sign-extended to 64-bits and added to the updated contents of PC 33 to form the target virtual address (overflow is ignored).

Operate instructions have two different formats 72 and 73. The format 72 has three register operands, and the format 73 has two register operands and a literal. The operate format is used for instructions that perform integer register operations, allowing two source operands and one destination operand in register file 43. One of the source operands can be a literal constant. Bit-12 defines whether the operate instruction is for a two source register operation or one source register and a literal. In addition to the 6-bit opcode at bits <31:26>, the operate format has a 7-bit function field at bits <11:5> to allow a wider range of choices for arithmetic and logical operation. The source register Ra is specified in either case at bits <25:21>, and the destination register Rc at <4:0>. If bit-12 is a zero, the source register Rb is defined at bits <20:16>, while if bit-12 is a one then an 8-bit zero-extended literal constant is formed by bits <20:13> of the instruction. This literal is interpreted as a positive integer in the range 0-255, and is zero-extended to 64-bits.

Figure 8:
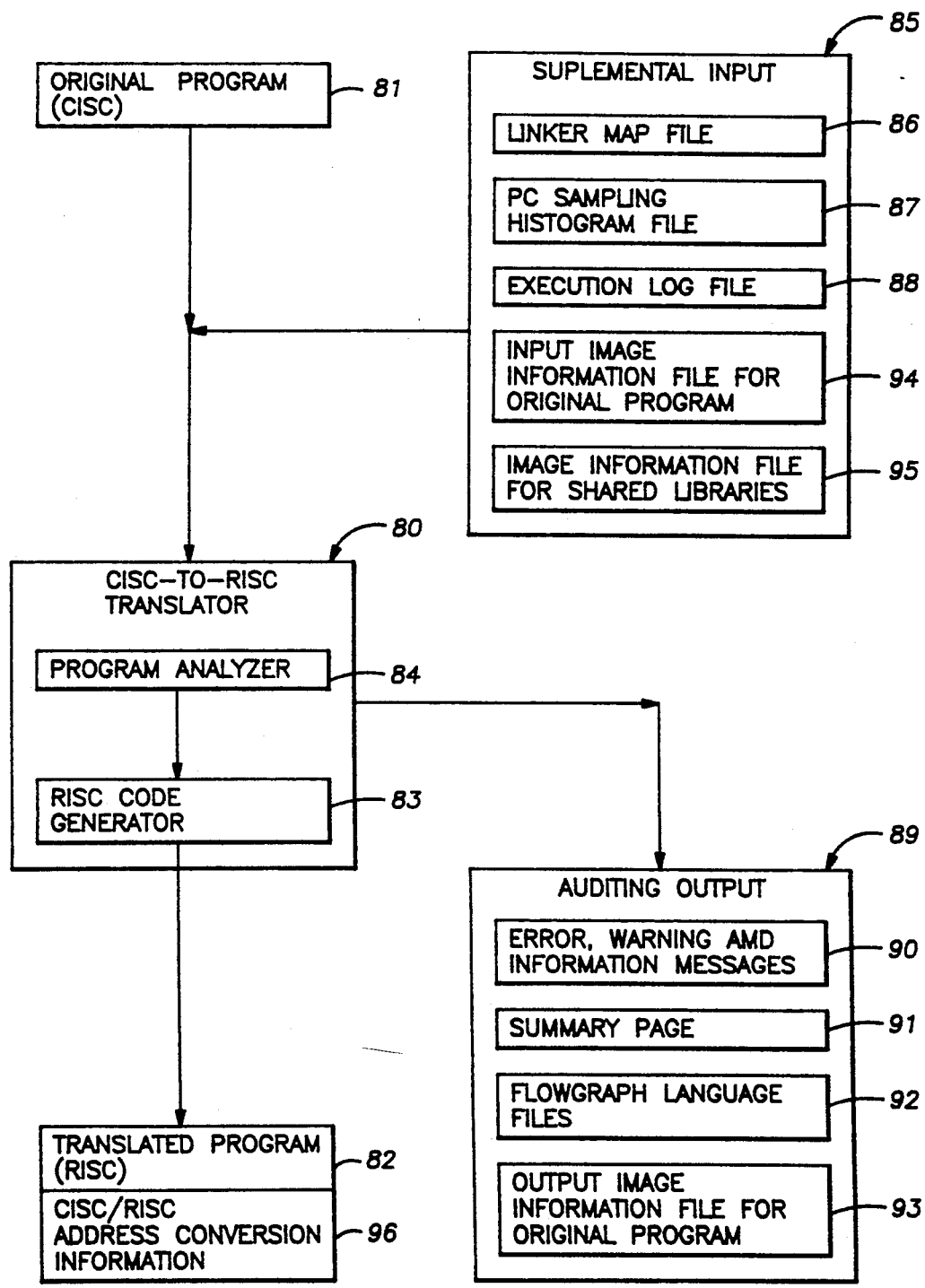
FIG. 8 is a block diagram of a translator having an analyzer and a RISC code generator for translating an original CISC program to a translated program having RISC instructions.

FIG. 8 also illustrates the floating point operate instruction format 74, used for instructions that perform floating point register to floating point register operations. The floating point operate instructions contain a 6-bit opcode at bits <31:26> as before, along with an 11-bit function field at bits <15:5>. There are three operand fields, Fa, Fb and Fc, each specifying either an integer or a floating-point operand as defined by the instruction; only the registers 13 are specified by Fa, Fb and Fc, but these registers can contain either integer or floating-point values. Literals are not supported. Floating point conversions use a subset of the floating point operate format 74 and perform register-to-register conversion operations; the Fb operand specifies the source and the Fa operand should be reg-31 (all zeros).

The last instruction format 75 is used for privileged architecture library (PAL or PALcode) instructions, which specify extended processor functions. In these instructions a 6-bit opcode is present at bits <31:26> as before, and a 26-bit PALcode function field <25:0> specifies the operation. The source and destination operands for PALcode instructions are supplied in fixed registers that are specified in the individual instruction definitions.

The six-bit opcode field <31:26> in the instruction formats of FIG. 7 allows only $2^6$ or sixty-four different instructions to be coded. Thus the instruction set would be limited to sixty-four. However, the "function" fields in the instruction formats 72, 73 and 74 allow variations of instructions having the same opcode in bits <31:26>.

The preferred embodiment of the present invention more particularly concerns a translator for translating programs for the CISC computer 20 of FIG. 1 to programs for the RISC computer 50 of FIG. 6. A major difficulty that must be addressed by the translator is that it is not always possible to translate all of the instructions in the original CISC program. One reason that translation is not always possible is that the CISC architecture permits CISC programs to be executed from "read-write" memory areas so that the programs may modify themselves during execution. The RISC architecture, however, requires programs to be executed from "read only" memory areas. Although CISC program instructions to be executed from "read-write" memory areas cannot be translated to CISC instructions, they can be interpreted on the RISC computer during execution time, at the expense of a severe penalty in execution speed. Fortunately, very few CISC programs modify themselves during execution. Many CISC programs that have program instructions in "read-write" memory areas, for example, do not actually modify themselves.

A more typical reason for failing to translate all of a CISC program is the difficulty of finding all of the CISC instructions to be translated. To run a CISC program, only the starting address of the program need be known. Although one may parse the instructions beginning at the starting address, the CISC program usually will include at least one execution transfer instruction, such as a "Jump" or "Call" instruction, having a computed destination address. Although the destination address is easily computed at execution time, it could be entirely indeterminate at translate time, for example, because the destination address is computed based on program input data. In the typical case, however, the present invention provides techniques for resolving, at translate time, a majority of the computed destination addresses.

Turning now to FIG. 8, there is shown a block diagram of a CISC-to-RISC translator 80 and its associated input and output images and data structures. The translator 80 receives an original program 81 having CISC instructions and generates a corresponding translated program 82 having RISC instructions. In association with the translated program 82, the translator 80 generates address conversion information 96, which correlates addresses of CISC instructions in the original program with addresses of RISC instructions in the translated program.

In addition to a RISC code generator 83, the translator 80 includes a program analyzer 84 that analyzes the original program 81 to separate instructions from data, to trace program flow for RISC code optimization, and to detect CISC instructions that specify behavior that cannot be reproduced by the RISC instruction architecture.

The program analyzer 84 may reference supplemental input 85 to find the location of instructions in the original program. The supplemental input 85 may include, for example, a linker map file 86 generated when the original program 81 was created by linking together a number of component images. In this case the linker map will identify entry points to instructions in the original program, and provide names for the entry points. These names are useful for making messages and other output of the translator more readable.

The supplemental input 85 may include a program counter (PC) sampling histogram file 87 that might have been generated to identify frequently executed instructions in the original program. If a PC sampling histogram file is available, then the program analyzer 10 may use it to ensure that an attempt is made to translate CISC instructions at every program counter address having a sampling frequency greater than zero; i.e., every program counter address corresponding to an instruction that was executed at the time that the PC sampling histogram file was generated.

The supplemental input 85 may also include an execution log file 88 containing the addresses in the original program of instructions that were not translated in a previous translation, but which were interpreted by the interpreter during execution of the previously translated program. As further described below in connection with FIGS. 9 and 11, the execution log file is generated, for example, during interpretation of the previously untranslated code, and it includes pairs of the origin addresses in the original program of instructions which transfer execution to the untranslated code, and the destination addresses in the original program where the untranslated code is located. The translator uses the information identifying the pairs of origin and destination addresses to translate the previously untranslated instructions in the original program. The origin addresses are used to identify the execution paths that were not discovered during prior translation of the original program. As further described below, identification of these execution paths may permit the program analyzer 84 to discover additional execution paths that were not taken during execution of the previously translated program or interpretation of the untranslated portions of the original program. Preferably this feedback of information from execution to re-translation is performed after each execution of the translated program so that virtually all of the instructions in the original program will eventually be located and translated.

The program analyzer 84 also generates auditing output 89 including error, warning and information messages 90; a summary page 91 showing a memory map of the original program 81 identifying regions of the instructions that were found and the location of entry points; flowgraph language files 92 that define a flowchart of the translated portions of the original program 81; and an output image information file 93 for the original program.

An image information file contains information about the interface characteristics or properties of predefined entry points in an image. The translator 80 generates an output image information file 89 for the original program 81 when the original program is first translated. During retranslations, the information input file for the original program can be used as an input file 94, and it will be updated during retranslation based upon additional instructions and execution transfer paths discovered by the program analyzer 84.

Image information files are used by the program analyzer 84 to resolve references to other images and to generate the appropriate linkage. For example, when the original program 81 calls library routines, the supplemental input 85 should include image information files 95 for these shared library routines. Preferably the image information file is an ASCII file that is easily edited by the programmer to add or correct information.

Figure 9:
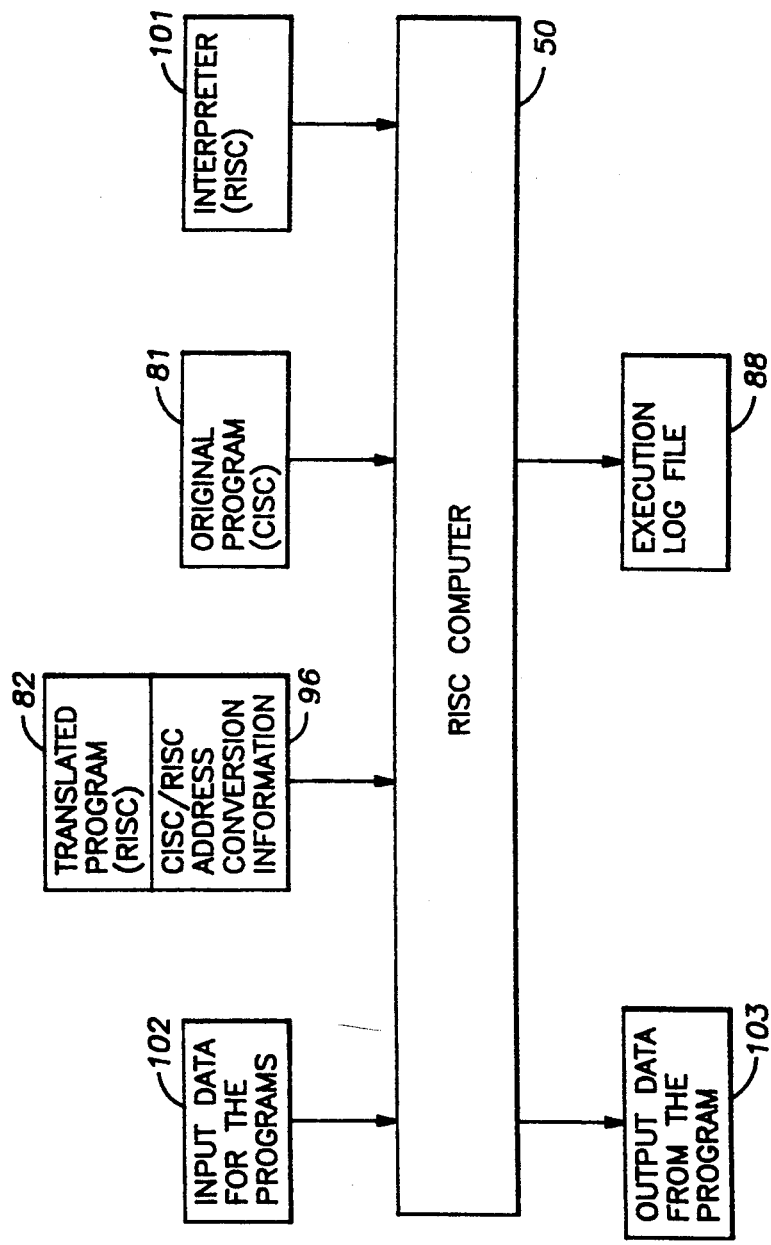
FIG. 9 is a block diagram showing data and program input and data output from the RISC computer when execution is shared between a partial RISC translation of an original CISC program and an interpreter for interpreting untranslated portions of the original CISC program.

Turning now to FIG. 9, there is shown a block diagram of the images and data files used when executing the translated program 82 on the RISC computer 50. In addition to the translated program 82 and its associated address conversion information 96, the RISC computer 50 uses as input a copy of the original program 81, an interpreter 101 that is written in RISC code for interpreting CISC instructions, and data input 102 for the original and translated programs. The interpreter 101 is called upon to interpret untranslated instructions in the original program 81, so that the original program 81 serves as data input for the interpreter. The address conversion information 96 also serves as data input to the interpreter 101, and the interpreter uses this information when passing execution back to the translated program at appropriate times. The data output from the RISC computer includes output data 103 from the original and translated programs, and the execution log file 88, which is output data from the interpreter.

Figure 10:
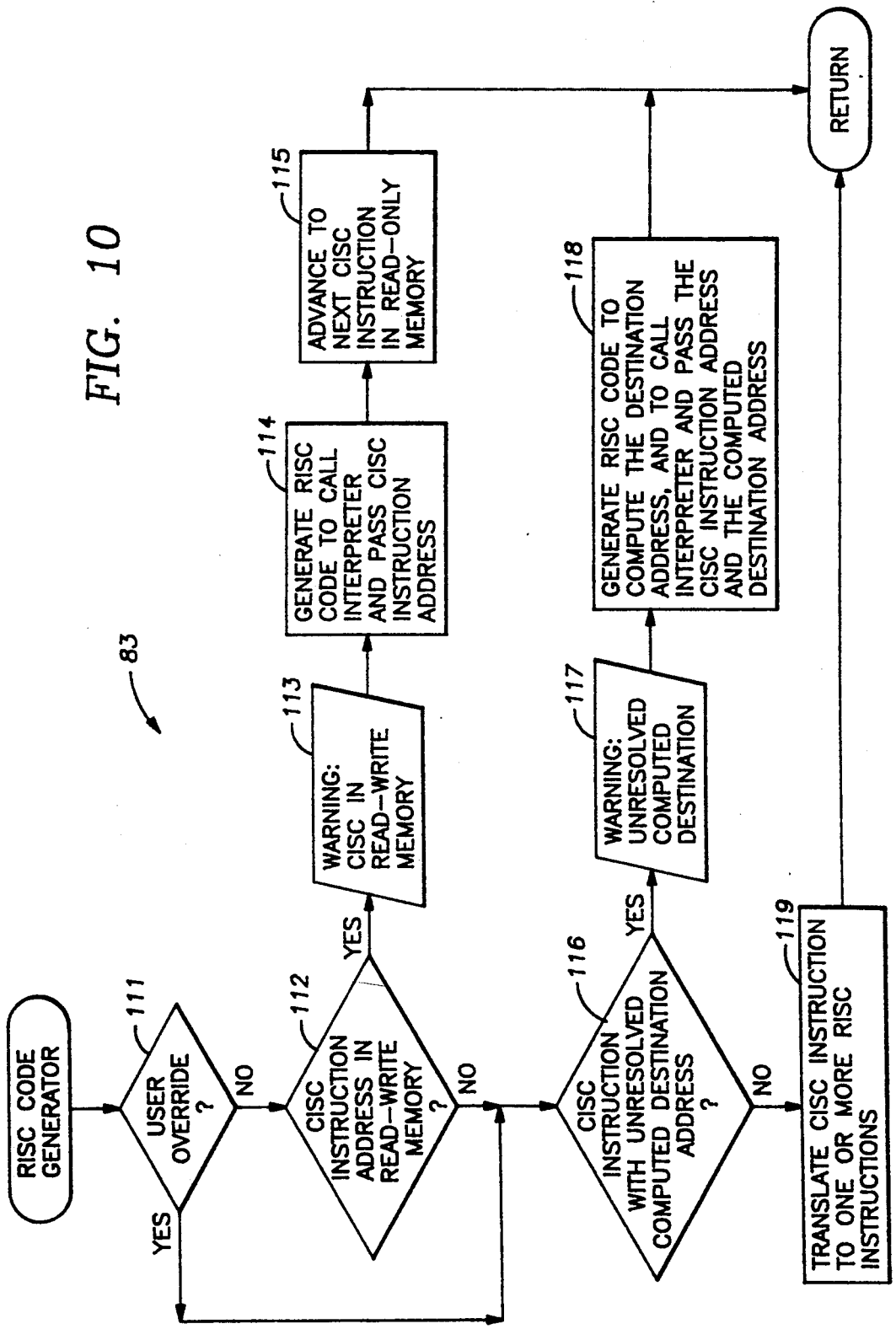
FIG. 10 is a flowchart of steps in a RISC code generator of FIG. 8 that call the interpreter used in FIG. 9.

Turning now to FIG. 10, there is shown a flowchart of steps in the RISC code generator 83 that generate calls to the interpreter when CISC instructions are not translated prior to execution time. As noted above, code in "read-write" memory areas usually should not be translated because the program might modify the code during execution. The user may, however, believe that program will not modify the code during execution, and therefore the user may wish to have code in read-write memory translated to avoid the severe performance penalty associated with code interpretation. Therefore the user may set a software override switch, and in step 111 the RISC code generator 83 tests the override switch to decide whether to translate a CISC instruction in a "read-write" memory area. If the override switch is not set, then in step 112 the RISC code generator 83 checks whether the CISC instruction is in a read-write memory area. In this case, the code generator issues a message in step 113 to warn the user that the CISC instruction must be interpreted, and therefore a performance penalty will result. Then in step 114 the code generator generates RISC code to call the interpreter and pass the CISC instruction address as a parameter. Finally, in step 115 the code generator advances to the next CISC instruction that is found in a "read-only" memory area, in order avoid translating CISC instructions that will be interpreted during the call to the interpreter.

The RISC code generator cannot generate code for CISC instructions that cannot be located in the original program. The RISC code generator, however, can recognize execution transfer instructions in the original program that have unresolved computed destination addresses, and therefore generate RISC code that calls the interpreter to interpret the untranslated CISC instructions at execution time. In step 116 the RISC code generator checks whether the CISC instruction has an unresolved computed destination address. If so, then in step 117 the user is warned that the interpreter must be called to interpret untranslated CISC instructions, and in step 118 the code generator generates RISC code to compute the destination address, and to call the interpreter and pass the address of the CISC execution transfer instruction and the computed destination address as parameters.

In step 119, the code generator generates RISC code for a CISC instruction which does not have an unresolved computed destination address. This is done by translating the CISC instruction to one or more RISC instructions that have the same effect as the CISC instruction. This code translation is made more efficient by using information from the program analyzer (84 in FIG. 8) about execution transfers and register usage in the program. The RISC computer (50 in FIG. 6), for example, preferably has subroutine call and return instructions which reference a return address in a specified general purpose register, and the RISC computer provides a large number of general purpose registers. Therefore it is inefficient to translate CISC subroutine call and return instructions into RISC instructions which emulate stack operations in cases where register could be used instead.

There is also an anomalous case of CISC instructions which reference the program counter directly as a source operand. In the preferred construction of the RISC computer, the program counter cannot be referenced directly as a source operand, although the program counter value can be computed by decrementing the return address provided by a subroutine call instruction. However, the program counter value in this case will be the program counter of the RISC computer, which is referenced to the RISC code, and not the program counter of the CISC computer, which is referenced to the CISC code. An excessive amount of overhead would be required to maintain in a general purpose register a constantly changing value corresponding to the CISC program counter. Therefore the program analyzer (84 in FIG. 8) will attempt to resolve references to the program counter for execution transfers in terms of relative jumps in the program, but will not attempt to translate code that uses the value of the program counter for any other purpose.

Figure 11:
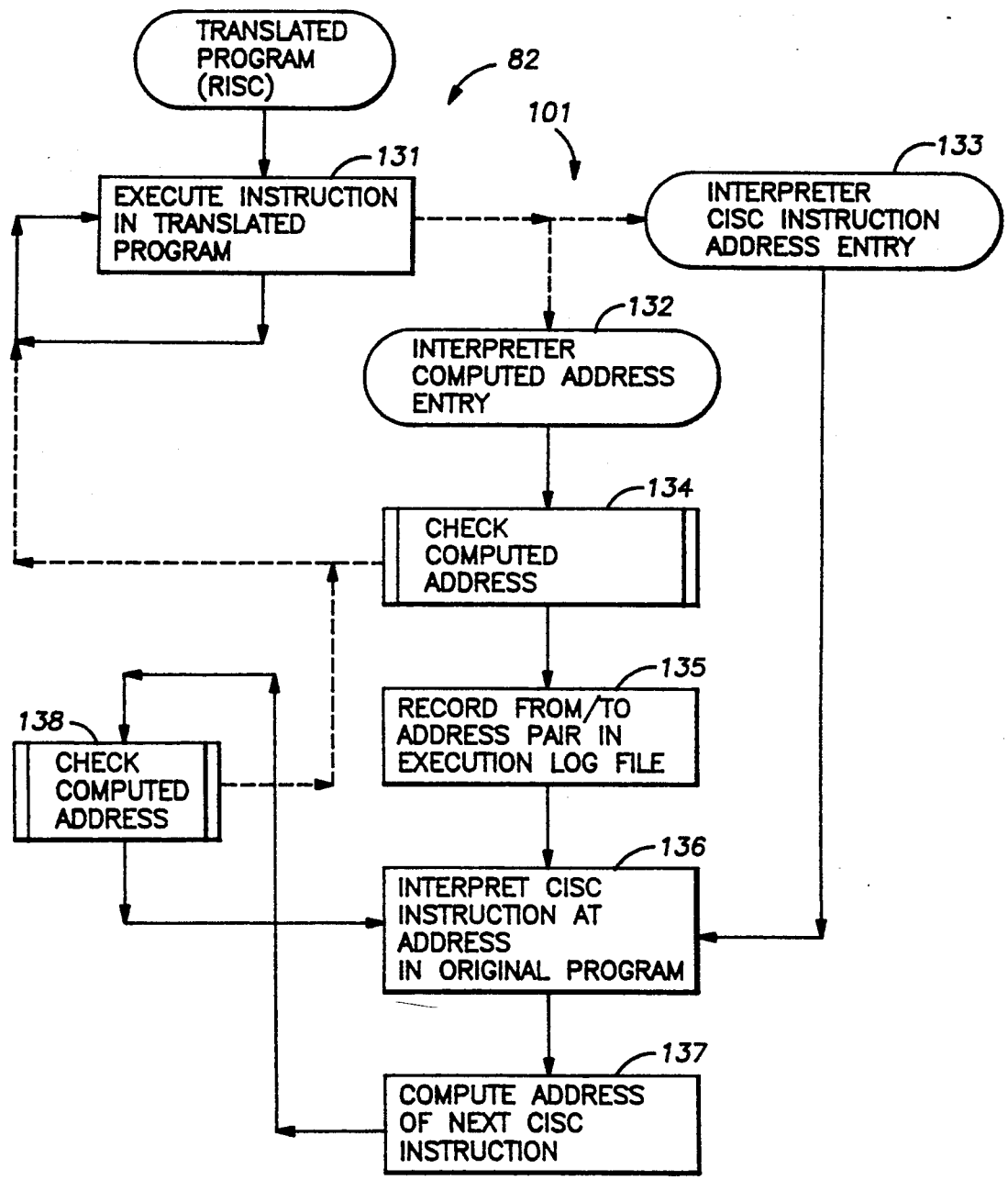
FIG. 11 is a flowchart of the interpreter and its operation when execution is shared with the partial RISC translation as shown in FIG. 9.

Turning now to FIG. 11, there is shown a flowchart of the interpreter and its interaction with execution of the translated program. In step 131, instructions in the translated program 82 (or operating system routines called by the translated program) are executed until the interpreter is called. As shown, the interpreter is entered at a first entry point 132 when called to interpret a CISC instruction at a computed destination address, and is entered at a second entry point 133 when called to interpret a CISC instruction in a "read-write" area of memory.

A computed destination address might not necessarily be in an untranslated portion of the original program. Therefore, in step 134, the computed address is checked to determine whether execution should continue in the interpreter, or whether execution should return to an entry point in the translated program or somewhere else.

When the computed destination address is in the original program but does not correspond to an entry point in the translated program it is desirable to log the destination address in the execution log file (88 in FIG. 8) together with the address of the execution transfer instruction having the destination address. This is done in step 135. During retranslation, the program analyzer (84 in FIG. 8) reads the information in the execution log file to locate untranslated code, for the case where the computed destination address does not correspond to a translated CISC instruction, or to identify a new execution transfer path in the translated program, for the case where the computed destination address corresponds to a translated CISC instruction but not an entry point in the translated program.

In step 136, the interpreter interprets the CISC instruction at the address in the original program. A general purpose register in the RISC computer is allocated to reproduce the contents of a corresponding register in the CISC computer. This set of allocated registers defines a model of the state of the CISC computer. The interpreter program reads the opcode of the CISC instruction and performs a table look-up to determine the number of specifiers to decode and the address of a program routine for the opcode. Then the interpreter decodes each specifier. Literal and register source operands are transferred to general purpose registers allocated as source operand registers. Complex specifiers are decoded and the specified operands are fetched from memory and transferred to the general purpose registers allocated as source operand registers. Then the program routine for the opcode is executed. Finally, the destination specifier is decoded, and the result is transferred to the specified destination.

In step 137 the address of the next CISC instruction in the original program is computed. This computation is based upon the instruction interpreted in step 136. The next CISC instruction follows the prior CISC instruction unless the prior instruction transfers execution, in which case the address of the next CISC instruction is the destination address of the prior instruction.

In step 138 the computed address is checked to determine whether execution should continue in the interpreter, or whether execution should return to an entry point in the translated program or somewhere else. Execution in the interpreter continues in step 136. In addition, step 136 is the initial step from the entry point 133.

Figure 12:
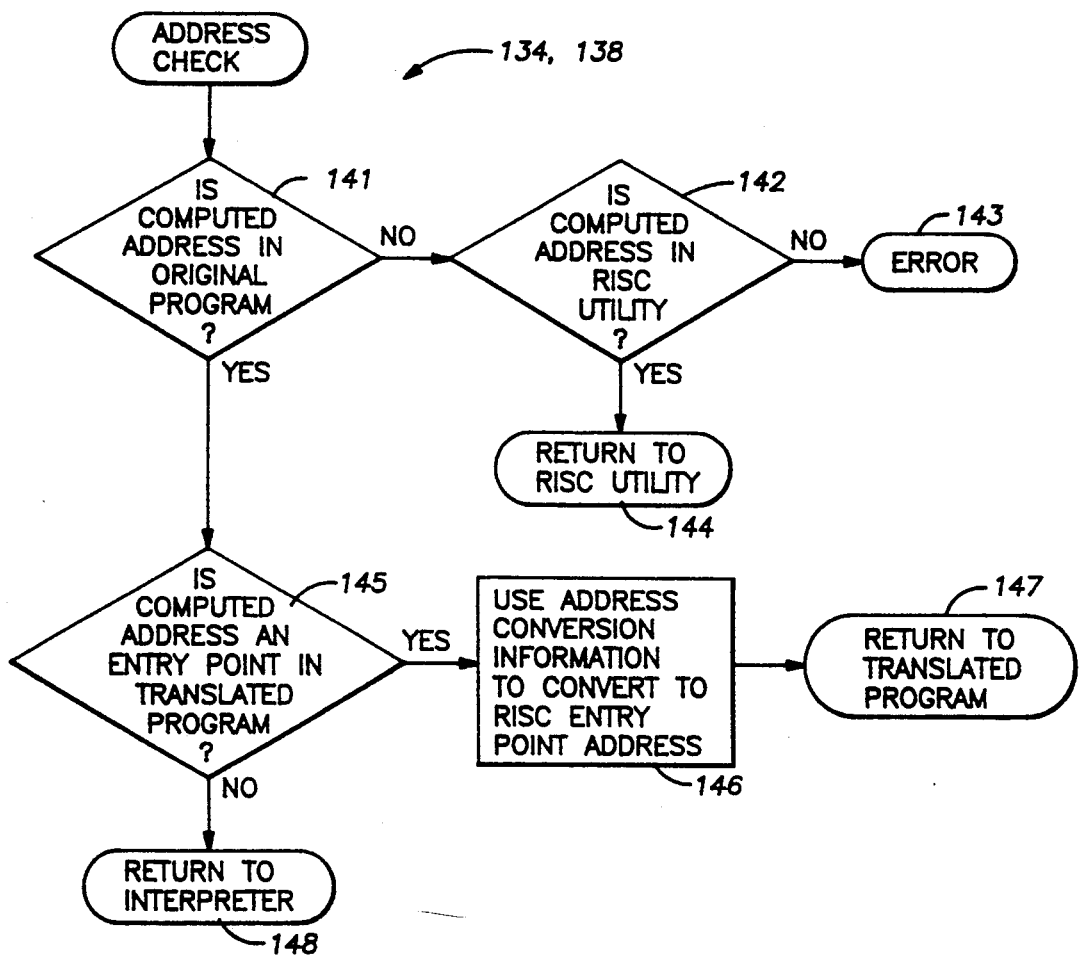
FIG. 12 is a flowchart of an address checking routine that determines when execution is passed from the interpreter to the partial RISC translation.

Turning now to FIG. 12, there is shown a flowchart of the address check routine used in steps 134 and 138 of FIG. 11. In step 141 the computed address is compared to the beginning and ending addresses of the original program to determine whether it is in the original program. If the destination address is outside of the original program, then the computed destination address, for example, could be the entry point of an operating system routine for the operating system of the CISC computer (20 in FIG. 1). The operating system of the RISC computer (50 in FIG. 6) may or may not have a corresponding routine. Therefore in step 142, the computed destination address is validated, for example, by look-up in a table of CISC destination addresses having corresponding entry points in the RISC operating system. If the computed destination address is invalid, the error is reported and execution is terminated in step 143. Otherwise, in step 144, execution is transferred to the entry point of the RISC operating system routine corresponding to the computed destination address.

When step 141 determines that the computed destination address is in the original program, it is possible that the computed destination may correspond to a translated CISC instruction in the original program. But even in this case, it may be desirable to interpret the CISC instruction because it may be desirable for translation to assume that the CISC program has only certain predefined entry points so that the translator can translate blocks of CISC instructions rather than individual instructions in order to generate more optimum RISC code. In any case, the interpreter must know the correspondence between CISC instruction addresses and corresponding entry points in the translated program if execution is ever to return from the interpreter to the translated program. This correspondence is provided by the address conversion information (96 in FIG. 8) associated with the translated program. Preferably this address conversion information is provided by a conversion table of the CISC addresses and corresponding entry points in the translated program. Therefore, in step 145, the interpreter checks whether the computed destination address corresponds to an entry point in the translated program, for example, by look-up in the conversion table. When the computed destination address corresponds to an entry point in the translated program, the interpreter uses the address conversion information to covert the computed CISC address to the RISC entry point address in step 146, for example, by reading the corresponding RISC entry point address from the conversion table. In step 147, execution returns to the entry point in the translated program. Otherwise, in step 148, execution returns to the interpreter.

Figure 13:
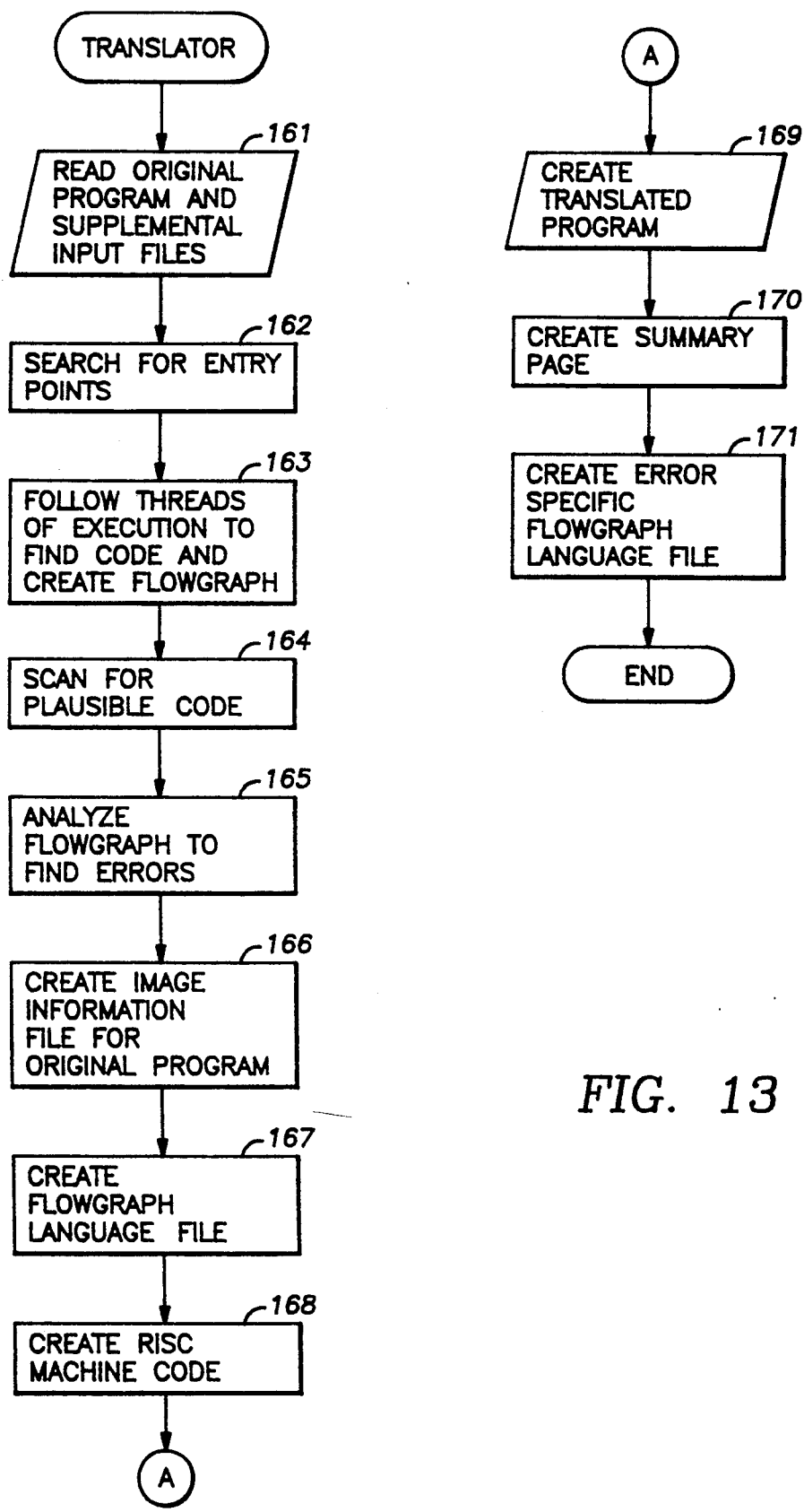
FIG. 13 is a flowchart of the operation of the translator of FIG. 8.

Turning now to FIG. 13, there is shown a flowchart of the steps performed by the translator 80. In the first step 161, the original program and the supplemental input files are read into memory. Then in step 162 the translator searches for entry points in the original program. This is further described below with reference to a specific example for the original program organization shown in FIG. 14.

In step 163 the translator follows threads of execution from the entry points in order to locate instructions in the original program and to generate a flowgraph of the program. The flow graph identifies "basic blocks" of instructions and execution paths interconnecting the basic blocks. Each basic block is a sequence of contiguous instructions that has a single known entry point at the beginning of the basic block. Execution is transferred only to the beginnings of the basic blocks, and execution is transferred only from the ends of the basic blocks. The generation of the flowgraph is further described below with reference to FIGS. 18 and 19.

In step 164 the translator scans the original program for plausible code. The result of such a scan is useful for quantifying the number of plausible instructions in the original program for comparison to the number of instructions located by the translator. The result of the comparison, for example, is an estimate of the "percentage of code found" computed as 100 times the bytes of known code divided by the sum of the bytes of known code and the bytes of plausible code. This estimate can be used by a systems analyst in choosing a porting strategy for the original program or for monitoring or augmenting the performance of the translator. If the translator is unable to translate a high percentage of the instructions, then the systems analyst may run a number of test cases upon the translated program and employ feedback of information from execution to re-translation to reduce the indicated estimate of untranslated code before releasing the translated program for general use. As a last resort, the systems analyst may have to search for documentation by the original programmer or inspect the code at the address locations indicated as containing plausible instructions in an attempt to verify the estimate and make a judgement whether to release the translated program for general use, or to direct the translator to translate the plausible code that is believed to contain untranslated instructions. The preferred method of scanning for plausible code is described further below with reference to FIGS. 29 and 29.

In step 165 the flowgraph is analyzed to find possible errors indicated by deviations from typical programming practices and standard conventions. In a typical program, for example, a data item is pushed on a stack so that it can be popped off at a later time, without regard to how many other data items are pushed on and popped off the stack by intervening instructions. If the number of pushes do not cancel the number of pops in the intervening instructions, then errors will be caused by improper programming of the intervening push and pop instructions. If the intervening instructions include separate paths that branch apart and rejoin at an intervening node, and the improper programming occurs in one of the paths, then the improper programming will also cause the calculated stack depth to be different for the two paths when they join at an intermediate node. This is especially likely to cause an error if the node is an RSB subroutine return instruction. Therefore, one of the error checks performed with the aid of the flowgraph is to calculate the stack depth at all paths from the main entry points of the original program, and to check whether the calculated stack depth is the same whenever these paths rejoin. If not, the translator issues a warning message that says: "Stack depths don't match on all incoming paths at VA=%X", where VA is the virtual address of the node in the original program.

The flowgraph is also analyzed for compliance with typical programming conventions of the CISC instruction architecture. For the VAX TM architecture, for example, a "return mask" is used in connection with procedure calls (CALLS and CALLG instructions) to indicate which registers to load during a return. If the return masks are different depending on the path to the return instruction, then there probably was a programming error. The translator issues a warning: "Return Masks don't match on all incoming paths VA=%X". In addition, if a RET instruction is found that may be executed with different return masks, that instruction must be translated as a call to the interpreter so that the interpreter will inspect the return mask to determine the particular registers to load during the return.

Another calling convention associated with the procedure calls is that register and condition code bits are to be set by the procedure before they are used in the procedure, rather than using register values or condition codes that might be set by the calling routine. If a deviation from this calling convention is found, the translator issues the warning: "Possible uninitialized variable(s) at call entry VA=%X: %s". The "%s" in this message stands for a list of the possible uninitialized variables that were found. Other deviations from coding conventions of the VAX TM instruction architecture include a failure to align the stack on longword boundaries (which causes a severe performance penalty for the RISC code), the use of a RET instruction to return from a JSB, and the use of an RSB instruction to return from a CALLS or CALLG. The translator analyses the flowgraph for these deviations and issues warning messages identifying the particular deviation and a corresponding address.

To reduce the amount of required searching through the flowgraph, the analysis of the flowgraph for possible errors also performs propagation of resources used in each basic block. Each basic block uses various resources, such as the stack, general purpose registers, and condition codes. To deduce the behavior of subroutines, their resource usage is propagated back to their calling routines. This information is used to terminate the search for the setting of a register used in a subroutine called by a CALLS or CALLG instruction, and this information is also used later during RISC machine code generation (step 168) to avoid needless generating of condition code or register values that are never used. Moreover, the consistency checks can be performed by comparing the resources for the basic blocks. For example, the "return mask" warning is generated when a basic block has two or more preceding basic blocks and the return masks for the preceding basic blocks are different, and the "stack depth" warning is issued when a basic block has two or more preceding basic blocks whose stack depth changes are different. A final scan over all of the basic blocks is used to uncover any failure to align the stack on longword boundaries (i.e., a stack change for a basic block that is not divisible by four bytes), the use of a RET instruction to return from a JSB, and the use of an RSB instruction to return from a CALLS or CALLG.

In step 166 the image information file for the original program is created, using the information about the resources used in each basic block. The image information file, for example, consists of an image header, which identifies the image name and version of the image being described, followed by a series of image property records (one per line) each of which attaches a particular property to an offset in that image. Each property record consists of an image offset followed by the property name, optionally followed by a comma-delimited list of attribute values. The attribute values are specific to particular properties. An image offset is a representation of the offset in the image to which the property applies. It may consist of a symbol (which could be defined by other image information file records) +/−the hexadecimal offset value. Either the symbolic name or the offset value may be omitted (but not both).

The properties and their defined attributes preferably include:

| Property Name | Interface Properties | |
|---|---|---|
| | Attributes | Interpretation |
| absolute_ok | | specifies RISC operating system support for entry point |
| jmpentry | symbolic name | defines a JMP entry point and name |
| callback | parameter number | defines a CALL to a procedure parameter |
| callentry | symbolic name | defines a CALL entry point and name |

-continued

| Property Name | Interface Properties | |
|---|---|---|
| | Attributes | Interpretation |
| caselimit | integer | specifies maximum number of cases |
| delta_sp | integer | specifies change in stack pointer by routine |
| image | identification | identifies the image that the image information file describes |
| jmpback | parameter number | defines a JMP to a procedure parameter |
| jsbentry | symbolic name | defines a JSB entry point and name |
| no_standard_return | | specifies no standard return |
| sets | list of registers | specifies registers set by routine |
| symbol | symbolic name | attaches a symbolic name to an offset |
| uses | list of registers | specifies registers used by routine |

An informal representation of the syntax of an image information file is shown below.

```
<WHITESPACE>       ::= non-null sequence of tabs and spaces
<COMMA>            ::= [<WHITESPACE>] ',' [<WHITESPACE>]
<NL>               ::= newline
<comment line>     ::= ';' any text <NL>
<IIF file>         ::= <IMAGE_ID> <IMAGE_PROPERTIES>
<IMAGE_ID>         ::= <WHITESPACE> 'image' <IMAGE_NAME> <COMMA>
                       <VERSION> <NL>
<IMAGE_PROPERTIES> ::= <IMAGE_OFFSET> <PROPERTY> [<ATTRIBUTE>,...] <NL>
<IMAGE_OFFSET>     ::= [<SYMBOL>] ('+'|'−') [<OFFSET>]
```

Comment records (lines beginning with ';') may occur anywhere in the file and are ignored by the translator.

An example of an image information file is shown below, for an image named "VAXCRTL":

```
; comments
  image VAXCRTL, "VO5-001"
+000000 jsbentry    "C$MAIN"
+000000 uses "AP FP SP RSB"
+000000 sets "R0 R1 R2 R3 R4 R5 R6 R7 R8 R9 R10 AP SP N Z V C"
```

This image information file provides the translator with the following information about VAXCRTL. VAXCRTL+0 (i.e., the first memory location in the image, at an offset of zero from the beginning of the image) is marked as a JSB entry with the name C$MAIN. From this information, the translator can confirm that the JSB is proper, and can insert the name VAXCRTL:C$MAIN into flowgraphs. VAXCRTL+0 is also marked as using VAX TM registers AP, FP, and SP, and the VAX TM instruction RSB. From this last piece of information, the translator can legitimately continue parsing VAX instructions at the return point, just after a calling instruction in a calling image.

VAXCRTL+0 is also marked as setting VAX TM registers R0 ... R10, AP, and SP, and the VAX condition code bits NZVC. From this information, the translator can infer, for example, that a 15 test of R0 after the calling instruction refers to the value left in R0 by C$MAIN, not to an earlier value put in R0 by the calling image itself.

The following example shows an image information file for a library file, LIBRTL, that has numerous entry points:

```
; comments
    image LIBRTL, V05-000
    +000000 jsbentry LIB$AB_ASC_EBC
    +000000 jsbentry LIB$AB_EBC_ASC
    +000200 jsbentry LIB$AB_UPCASE
    +000300 callentry LIB$ANALYZE_SDES
    +0004F0 callentry LIB$SIGNAL
    +0004F8 callentry LIB$STOP
    LIB$STOP no_standard_return
    +000500 callentry LIB$SIG_TO_RET
    +000508 callentry LIB$SKPC
```

In step 167 of FIG. 13, a flowgraph language file is created for the translated program. This flowgraph language file can then be used as input to flowgraph program that will send commands to a laser printer to draw a flowgraph of the translated program. The flowgraph program, for example, may also receive an optional scale parameter that controls the size of the printed flowgraph, and an optional "code block" parameter that may specify the address of a particular block of code to be printed on a page with other blocks to which it is connected. The flowgraph consists of different kinds or shapes of blocks, arcs interconnecting the blocks, and instructions printed in assembler notation in each block. Each basic block of instructions found by the translator has a corresponding block in the flowchart.

The flowgraph language file contains a definition of the kinds of blocks in the flowgraph, the interconnections between the blocks, and the instructions (in ASCII, assembler notation) that go into each block. The flowgraph language file is created from an internal binary data structure that includes a data block or record defining each basic block of instructions found by the translator. Each data block or record contains the starting address (in the original program) of the basic block of instructions, the length of the basic block in bytes, the kind of the block, an "epoch number" attribute used to indicate whether the block has been included in a particular search, a list of addresses of "successor" data blocks, and a list of addresses of "predecessor" data blocks. A data block can be created dynamically and easily inserted or removed from the data structure by inserting or deleting references to the data block in its successor and predecessor blocks, and the data structure is easily searched or scanned in either a forward or backward manner by successive references to the successors or predecessors.

There are five possible kinds of blocks used in the flowgraph, and each kind of block has a distinctive shape. The kinds of blocks include CALLx entries, JSB entries, "normal" blocks, CALLx placeholders, and JSB placeholders. "CALLx" refers to a procedure call, which is made by a CALLS or CALLG instruction in the VAX TM instruction architecture.

In the printed flowgraph, a CALLx entry block is hexagonal and contains the name of the block, the name of the procedure if known, and the call mask in hex. The name of the block consists of the address (in the original program) of the fist byte of the block in hex followed by "_CALL". A CALLx entry block is reached via a CALLS or CALLG instruction. In the VAX TM instruction architecture, the main entry point of the original program is a CALLx entry block; this main entry point is called by the operating system to run the program.

In the printed flowgraph, the JSB entry block is oval and contains the name of block, and the name of the subroutine if known. The name of the block consists of the address (in the original program) of the first byte of the block in hex followed by "_JSB". A JSB entry point is reached via a JSB, BSBB, or BSBW instruction. JSB entries are typically used in macro code.

In the printed flowgraph, a normal block is rectangular and contains the name of the block and all of the instructions within the block. The name of block is the address (in the original program) of the first byte of the block in hex. A normal block is reached via the normal flow of execution or via an execution transfer from a branch, case, jump, or return instruction.

In the printed flowgraph, a CALLx placeholder block is dashed hexagonal and contains the name of the block, and the name of the called procedure if known. The name of the block consists of the address (in the original program) of the first byte of the called procedure in hex (if known at translate time, or else zero), followed by "_" and a "call number" of the placeholder for the called procedure. A Callx placeholder block represents the flow in and out of a procedure and any recorded side effects for each call of that procedure. If a procedure is called from five different places, there will be five different placeholder blocks with five different call numbers for those calls (in addition to a CALLx entry block for the procedure).

In the printed flowgraph, a JSB placeholder block is dashed oval and contains the name of the block, and the name of the subroutine if known. The name of the block consists of the address (in the original program) of the first byte of the subroutine in hex (if known at translate time, or else zero), followed by "_" and a unique "call number" of the placeholder for the called subroutine. A JSB placeholder block represents the flow in and out of a subroutine and any recorded side effects for each call of that subroutine.

In a preferred form of the flowgraph language, there are three basic operators: graph (G), block (B) and arc (A). Each line of the flowgraph language file starts with one of these operators; a semicolon, indicating that the line contains a comment; a blank, indicating that alphanumeric data in the line to be included in a block defined by a previous line having a block operator; an H followed by a block name, indicating that a named block is to be highlighted; or a C followed by the names of two blocks, indicating that the two blocks are to be connected with a wide dotted line, for example to highlight a path including an error.

A line beginning with the operator G delimits a new graph, and may include alphanumeric text that is printed as a heading for the graph.

A line beginning with the operator B also includes a name (such as a hex address) for a block of code, followed by a letter code indicating the kind and shape of the block (e.g., A=normal, B=CALLx entry, C=JSB entry, D=CALLx placeholder, E=JSB placeholder). An optional numeric scale factor may immediately follow the operator B.

A line beginning with the operator A specifies a directed arc from a first-named block to a second-named block, and after the two block names, a letter code indicates the style of the arc (e.g., A=normal branch drawn with a solid line, B=true branch drawn with a dotted line).

Figure 15:
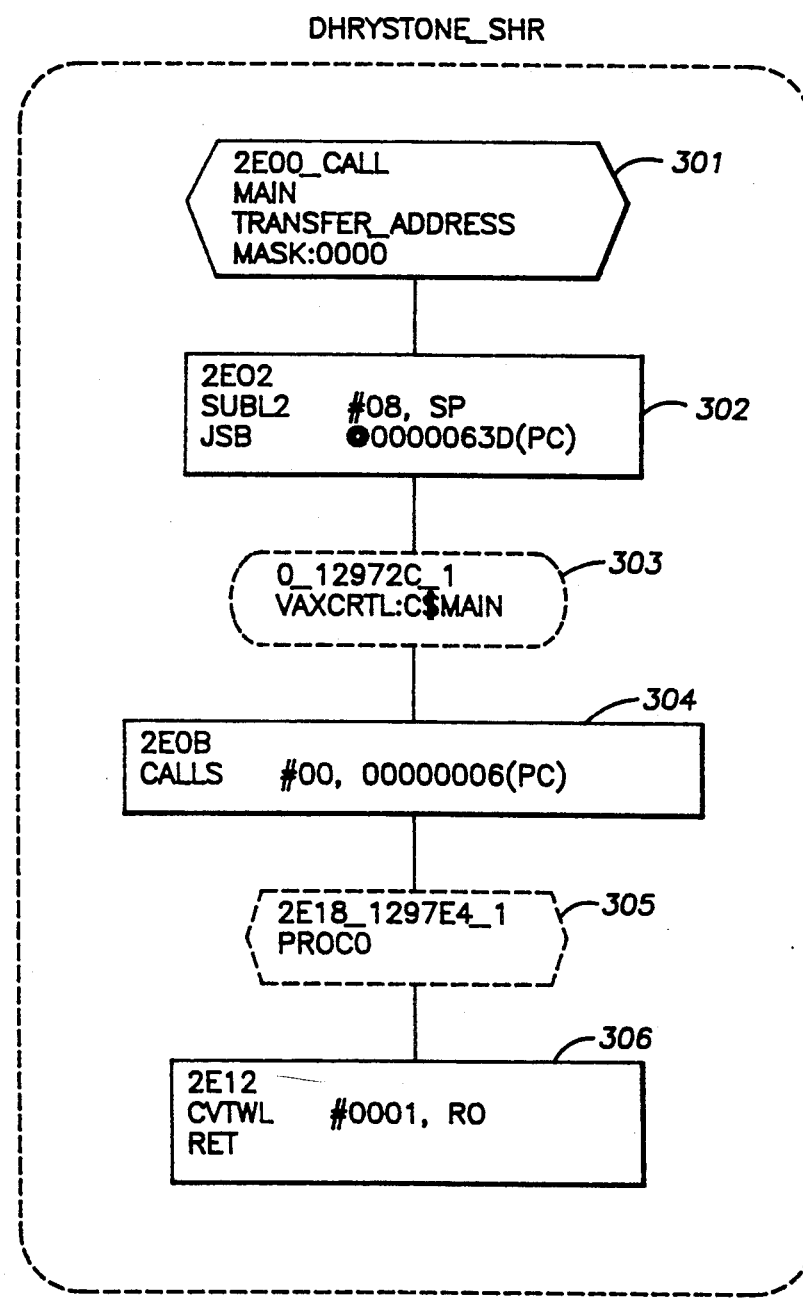
FIG. 15 is a flowgraph of the original CISC program.

The following is an example of a flowgraph language file for printing the flowgraph in FIG. 15:

```
;       FLOWGRAPH LANGUAGE FILE FOR
;       DHRYSTONE_SHR
;
G       DHRYSTONE_SHR
B       2E00_CALL B
        2E00_CALL
        main
        Transfer_address
        mask:0000
A       2E00_CALL 2E02 A
B       2E02 A
        2E02
        SUB2    #08, SP
        JSB     @0000063D(PC)
A       2E02 0_12972C_1 A
B       0_12972C_1 E
        0_12972C_1
        VAXCRTL:C$MAIN
A       0_12972C_1 2E0B A
B       2E0B A
        2E0B
        CALLS   #00, 00000006(PC)
A       2E0B 2E18_1297E4_1 A
B       2E18_1297E4_1 D
        2E18_1297E4_1
        Proc0
A       2E18_1297E4_1 2E12 A
B       2E12 A
        2E12
        CVTWL   #0001, R0
        RET
```

In step 168 of FIG. 13, the translator receives the basic blocks of instructions from the original program, and generates corresponding RISC machine code. The CISC instructions are translated one at a time into RISC instructions that will reproduce the same results and condition codes. Preferably each CISC instruction is translated into a corresponding sequence of RISC instructions including in sequence four groups of instructions. The first group has instructions that fetch source operands and place them in temporary storage. The instructions in the second group operate upon the source operands to produce results in temporary storage. The instructions in the third group update the contents of memory or registers and are subject to possible exceptions. Finally, the instructions in the fourth group are those that update the contents of memory or registers and are free of possible exceptions. For further details regarding the translation of the CISC instructions to RISC instructions, one may refer to the above-cited related application by Scott Robinson and Richard Sites entitled "Improved System and Method of Preserving Instruction Granularity for Translated Program Code."

In step 169 of FIG. 13, the translator creates the translated program by placing the RISC machine code into a program image format that is recognized by the operating system of the RISC computer. In association with this translated program image, the translator also generates a mapping between the address of each basic block of CISC instructions in the original program and the address of the corresponding basic block of RISC instructions in the translated program.

In step 170 of FIG. 13, the translator creates a summary page, which graphically illustrates where the translated code is located in the program image. The summary page is further described below with reference to FIG. 14.

Figure 16:
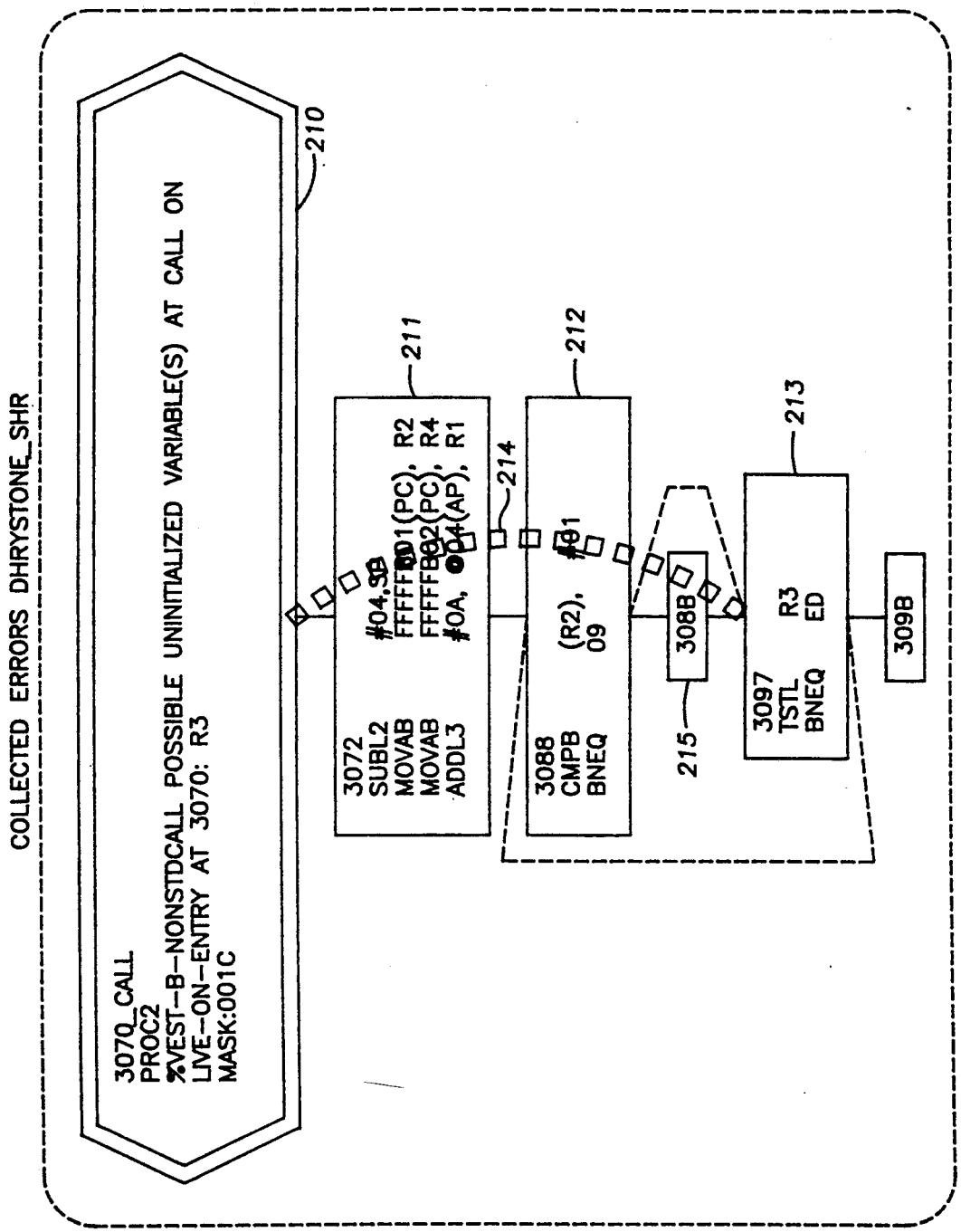
FIG. 16 is an error-specific flowgraph of the original CISC program.

Finally, in step 171 of FIG. 13, the translator may create flowgraph language files for printing flowgraphs of subroutines having errors that were located in step 165 during analysis of the program flowgraph. An example of an error-specific flowgraph is shown in FIG. 16. The error-specific flowgraph has enlarged blocks 210, 211, 212, and 213 along the path where the error was traced, and a heavy dotted line 214 along an arc over the path where the error was traced. The error indicated in FIG. 16 is an uninitialized variable (general purpose register R3) being used in a procedure. The heavy dotted line 214 connects the block 210 at the beginning of the procedure to the block 213 where the uninstantiated variable was first used. This error was not discovered prior to being revealed by the translator because during execution of the original program, execution apparently never followed the indicated error path around block 215.

Figure 14:
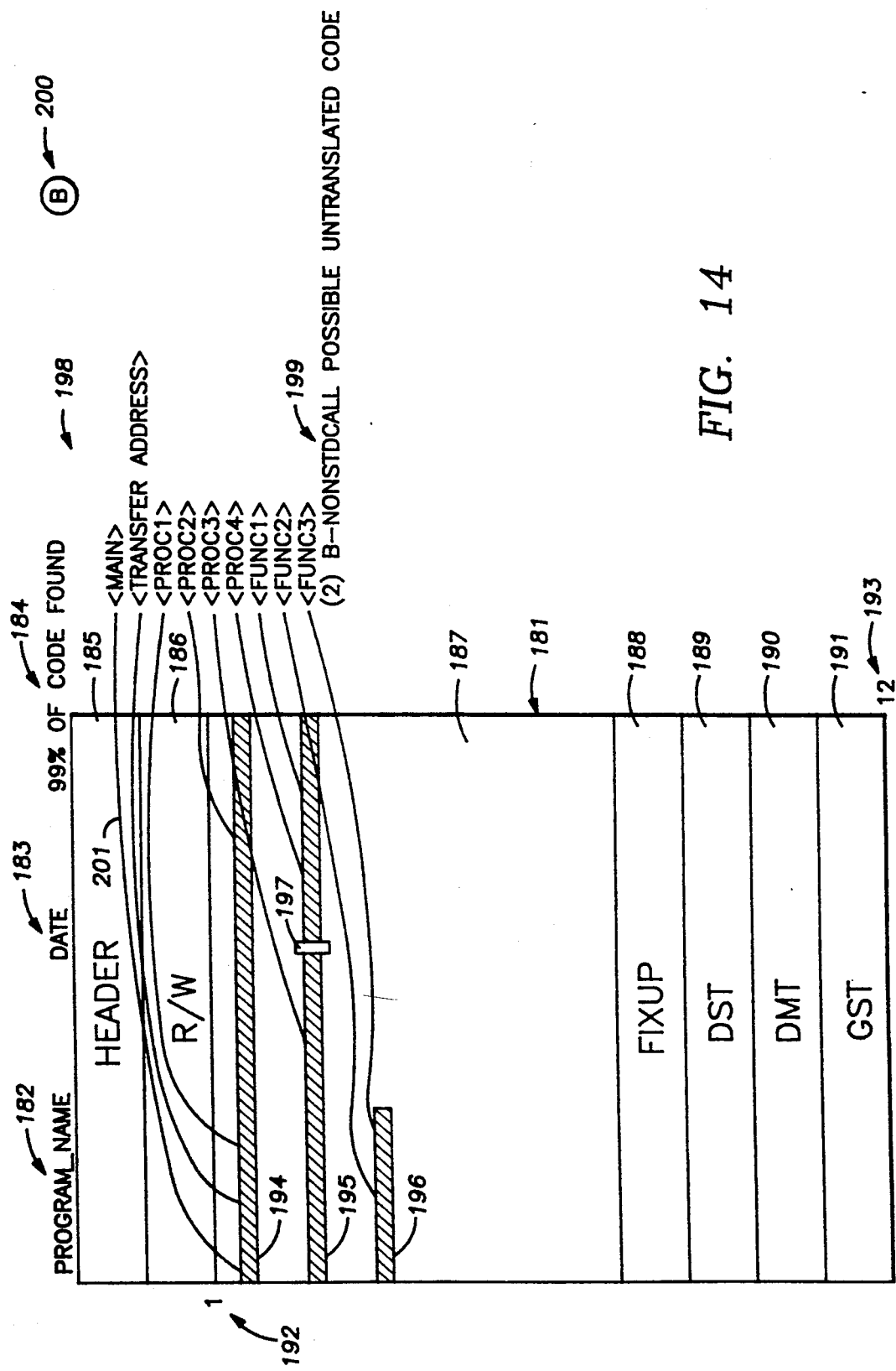
FIG. 14 is a summary page generated by the translator of FIG. 8 and including a memory map of the original CISC program having been translated.

Turning now to FIG. 14, there is shown a summary page of the kind generated in step 170 of FIG. 13. As shown in FIG. 14, the summary page includes a memory map 181 of the original program. At the top of the memory map, there is an annotation including the program name 182, the date 183 when the original program was created, and the percentage 184 of code found during the translation.

The memory map 181 shows the organization of a typical program using the VAX TM instruction architecture and VMS TM operating system. The program includes a header 185, a read/write image section 186, a number of read-only sections 187, a fixup vector section 188, a debug symbol table (DST) 189, a debug module table (DMT) 190, and a global symbol table (GST) 191 The number 192 of disc blocks per line of the memory map is printed at the upper left of the memory map, and the total number 193 of disc blocks in the memory map is printed at the lower right of the memory map. In this example, there is one disk block per line, and 12 disc blocks total. The translated code is indicated by narrow bands 194, 195 and 196 in the read-only section 187. These narrow bands are made up of a short vertical line for each byte of code that is translated. Plausible code is indicated by a wider band 197.

To the right of the memory map 181, the summary page lists up to 100 entry points that are defined by the image format of the original program. During step 161 of FIG. 13, the translator parses the command line of switches and the file name at the beginning of the original program, and reads the original program into memory. The in step 162 of FIG. 13, the translator searches for the entry points defined by the image format of the original program. The translator looks at the first few and last few bytes of the first disc block to see if it is a header for a translatable VAX TM /VMS TM program image. If so, the translator parses the rest of the header, looking for image section descriptors (ISDs), and organizing the disk blocks into the described image sections, such as the images sections 185–191 shown in the memory map 181 of FIG. 14. If a VAX TM /VMS TM fixup vector is present, the translator parses it to determine addresses in the original program that are indirect references to other images.

To find entry points that are defined by the image format of the original program, the translator scans the image header 185 for entry points but ignores debugger entry points. The translator then scans, when present, the debug symbol table (DST) 189 and, when present, the global symbol table (GST) 191, to find CALL entries and SYMBOL entries. Validity checks are performed on each possible CALL entry point, such as insuring that the CALL mask is valid, the mask is followed by legal code, and the code does not contain privileged instructions. The legal code check decoded the code through three layers of basic blocks from the call mask. SYMBOL entries are ignored when the symbols are flagged by the linker as being absolute references, because absolute references are typically constants. Otherwise, a SYMBOL entry might be a JSB entry point or a mislabeled CALL entry point. The code from the entry point is decoded and the legal code check just described is performed assuming that the entry point is a CALL entry, and if this legal code check is passed, the entry point is deemed to be a CALL entry. If the legal code check is not passed, then a similar legal code check is performed to test whether the entry point is a JSB entry.

The summary page of FIG. 14 lists up to 100 of the entry points 198 that are defined by the image format of the original program. To show the locations of the entry points in the program code, an arc 201 is drawn from each of the entry points 194 to a corresponding position in the memory map 181. Below the list of entry points, the summary page includes a summary 199 of messages from the translator, listed in decreasing order of severity, from fatal to informational. The number of times each message is given is shown in parentheses. Finally, in the upper right-hand corner of the summary page, the translator gives a letter grade of the translation, ranging from A to F, indicating quality ranging from full translation, translation with warnings, partial translation, partial translation with possibly severe errors, partial translation with missing runtime facilities, to no successful translation at all.

To locate most of the instructions in the original program, it is necessary to follow threads of execution from the entry points that are defined by the image format of the original program. The threads of execution are followed by decoding the sequence of instructions beginning at each entry point and building a flowgraph as the instructions are decoded. To build the flowgraph, each instruction is decoded to determine its length, and to determine the next instruction or instructions in the sequence. The length of the instruction is determined by referencing a table giving the number of specifiers for each opcode, and then inspecting the specifiers to determine their lengths.

Because the CISC instructions must also be decoded for generating the RISC code, the translator may save the results of the decoding for building the flowgraph. These results could be in an intermediate code format that simplifies the analysis of the instructions during error checking with the aid of the flowgraph, and also simplifies the generation of the RISC code. The intermediate code format may provide fixed data formats for similar instructions so that the operand specifiers are in readily accessible memory locations. The fixed data formats may also provide attributes that aid in the generation of efficient RISC code and, when necessary, calls to the interpreter. One kind of intermediate code format that could be used is described below in Appendix A to the present specification. Memory space limitations, however, may preclude the use of an intermediate code representation for long programs.

Figure 17:
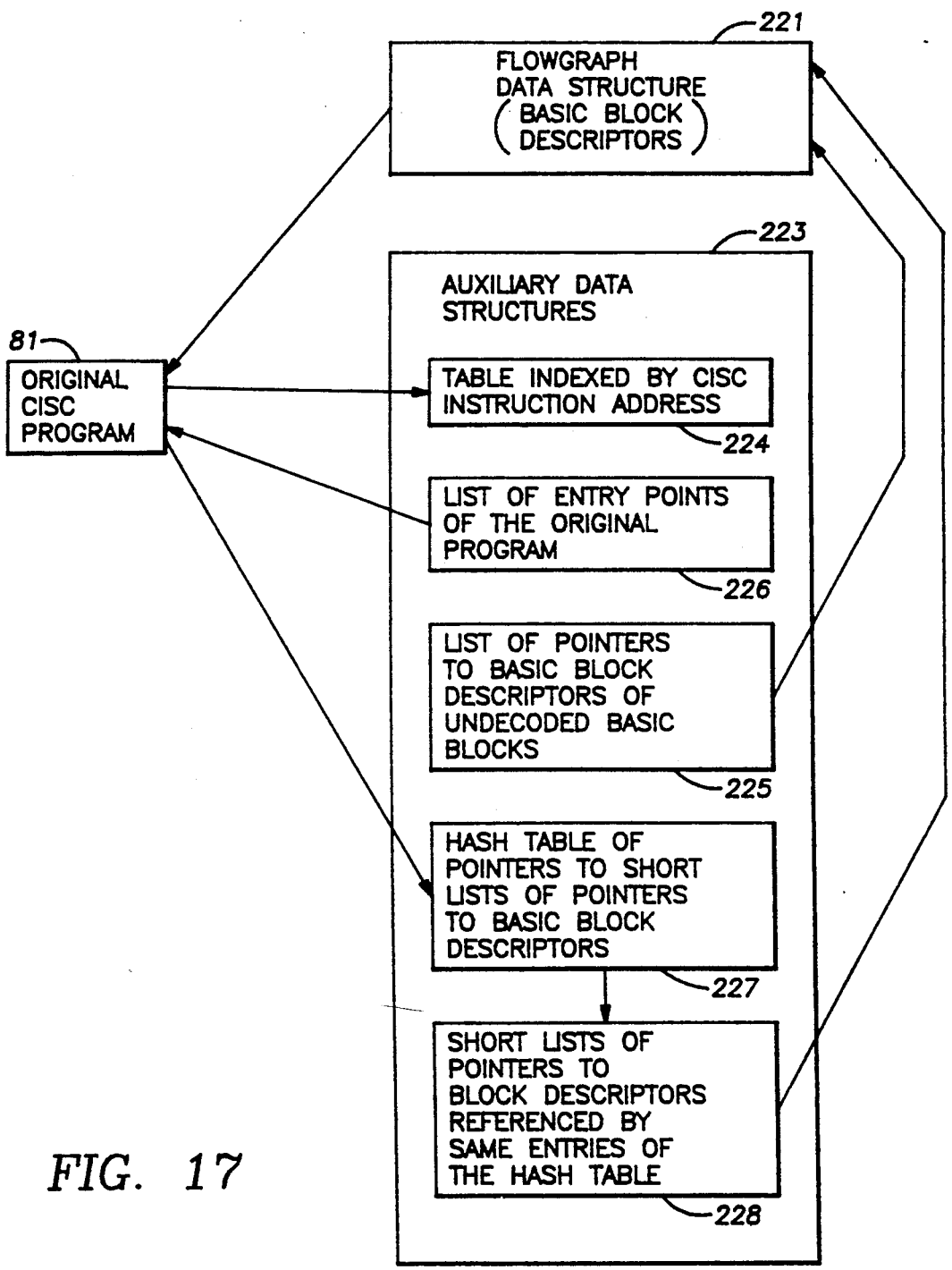
FIG. 17 is block diagram of data structures used by the analyzer of the translator for automatic generation of flowgraphs from machine code.

Turning now to FIG. 17, there are shown the data structures used for building the flowgraph. The flowgraph data structure 221 was described above; it is a list of basic block descriptors, each of which is linked to all of its predecessors and successors.

To assist in the generation and analysis of the flowgraph, it is desirable to reference and maintain a number of auxiliary data structures 223. During the building of the flowgraph data structure 221, and later during the scan for plausible code, for example, it is desirable to know quickly whether a given address is (1) an address of neither a decoded instruction nor the beginning of a block; or (2) the address at the beginning of a basic block (hereinafter referred to as a "block entry point"); or (3) the address of a decoded instruction that is in the middle of a block; or (4) the address of a byte in the middle of a decoded instruction. For this purpose the auxiliary data structures 223 include a table 224 indexed by CISC instruction address.

An entry in the table 224, for example, is a longword packed with sixteen pairs of bits encoding the four mutually-exclusive states of each CISC address just mentioned. For a given CISC address in a first register, a second register is loaded with a mask having its four least significant bits set, the four least significant bits of the address are transferred into the second register by a logical AND of the first and second registers, and the second register is left-shifted by one bit position to provide a shift count. The first register is right-shifted by four bit positions to provide an index into the table 224, and the entry from the table is loaded into the first register. The first register is then rotated by the number of bit positions indicated by the shift count, to right-justify the pair of bits for the given CISC address. The pair of bits is then masked out by a logical AND of the second register with a mask having its two least-significant bits set.

When building the flowgraph, it is necessary to follow one path at a time, even when it is known that there are other paths that have not been followed to terminal instructions. Moreover, sometimes the path being followed will merge with a partially followed path. Therefore it is desirable for the auxiliary data structures 223 to include a list 225 of pointers to the basic block descriptors of undecoded blocks. At the start of building the flowgraph, for example, basic block descriptors of undecoded blocks are created for each of the known entry points of the original program. These known entry points are collected in a list 226 prior to building the flowgraph.

For VAX/VMS ™ programs, the known program entry points are entry points for CALLx procedure calls, so they are represented in the flowgraph by CALLx basic block descriptors. A CALLx basic block descriptor is created for each program entry point. The list 225 is initially loaded with pointers to the CALLx basic block descriptors of the program entry points. Moreover, the entries in the table 224 for the program entry points are initially set to indicate the beginnings of the basic blocks.

When a look-up in the table indicates that a given CISC address is the start of a block or a decoded instruction in a block, it is often desirable to quickly find the basic block descriptor of the block. If there were no limit to memory space, this could be done by a table of pointers to the basic block descriptors indexed by CISC address. Due to memory space limitations, however, it is preferable to use a hash table 227 to short lists of pointers 228 to the basic block descriptors in the flowgraph data structure 221. Moreover, it is desirable for the hash table to be indexed by, for example, the sixteen least significant bits of the address of the first instruction in the block. To find the basic block descriptor for a basic block starting at a given CISC address, for example, the hash table 227 is indexed by the sixteen least significant bits of the given CISC address to obtain a pointer to one of the short lists 228 of pointers to the basic block descriptors. For each pointer in this short list, the pointer is used to fetch the starting address attribute of the basic block descriptor, and this starting address is compared to the given CISC address. When a match occurs between the addresses, the desired basic block descriptor is found. To find the basic block descriptor including any given address (such as the address of an instruction in the middle of a basic block), the table 224 is scanned in a direction of decreasing numerical address until the address of the beginning of the block is found, and then the address of the beginning of the block is used to find the basic block descriptor with reference to the hash table 227 and the short lists 228 of pointers to the basic block descriptors.

Each time that a basic block descriptor is allocated for a newly-created basic block, the address table 224, the hash table 227, and one of the short lists 228 are updated. A two-bit entry indicating the start of the block is written into the table 224 by indexing the table, for example to obtain a longword, and setting the two-bit entry in the longword by a masking operation. Mask for the masking operation, for example, are obtained by indexing a table of masks with the least significant four bits of the CISC address of the start of the basic block. Then a pointer to one of the short lists of pointers 228 is obtained by indexing the hash table 227 with the sixteen least significant bits of the CISC address of the start of the basic block. Finally, a pointer to the basic block descriptor of the new block is added to the short list indicated by the pointer obtained by indexing the hash table 227.

Figure 18:
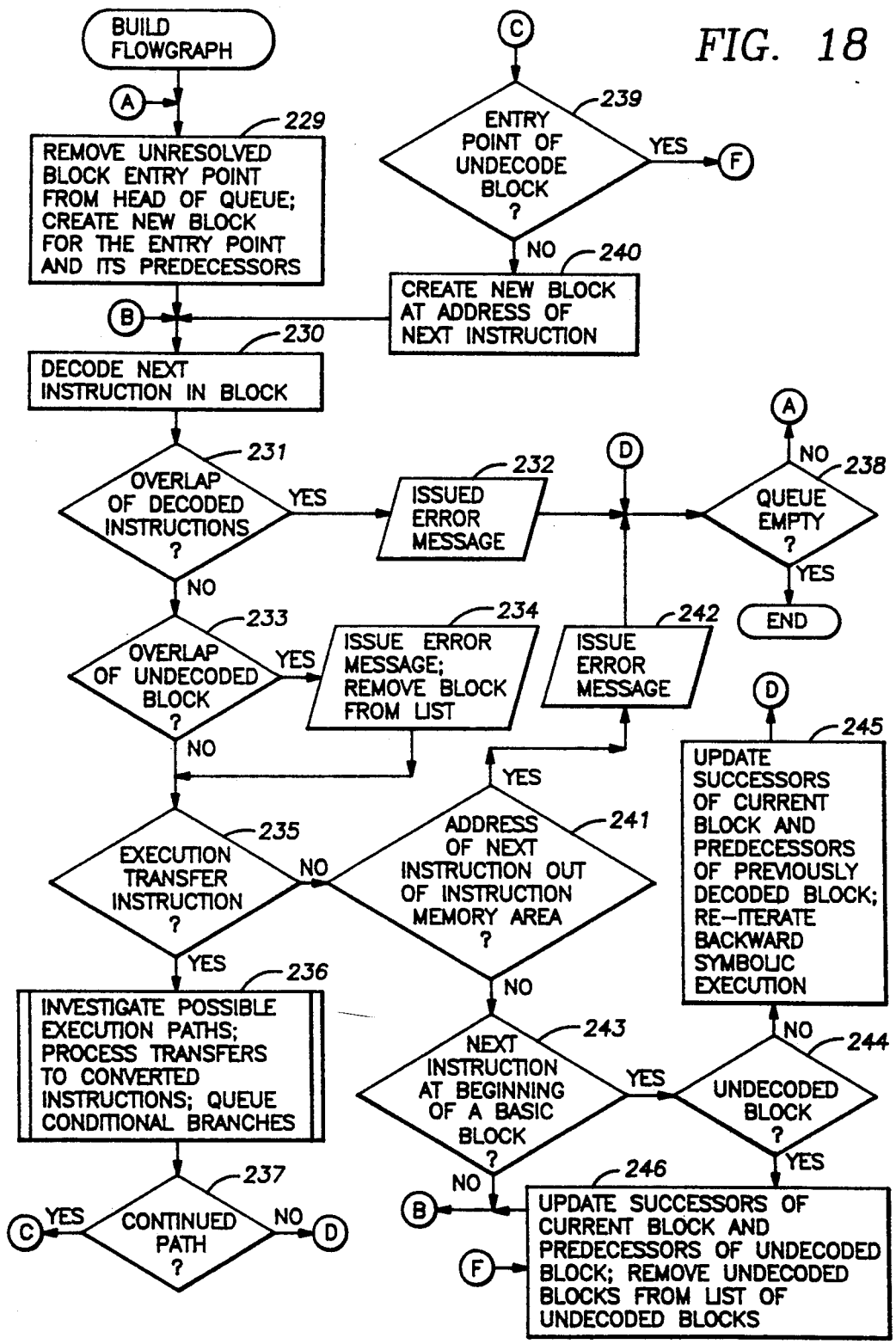
FIG. 18 is a flowchart of a procedure used by the analyzer for the automatic generation of flowgraphs from machine code.

Turning now to FIG. 18, there is shown a flowchart of the procedure for building the flowgraph data structure. In the first step 229, the undecoded basic block at the head of the list (225 in FIG. 17) is removed from the list, a basic block descriptor in the flowgraph data structure (224 in FIG. 17) is allocated, and the basic block descriptor is set to indicate a block entry point equal to the unresolved entry point and predecessors equal to the predecessor or predecessors of the unresolved entry point. Next, in step 230, the next instruction in the basic block, which begins at the block entry point, is decoded, and the address table (224 in FIG. 17) is updated. Then in step 231, during decoding of the instruction, the address table (224 in FIG. 17) is indexed to determine whether the instruction being decoded overlaps a previously decoded instruction. If so, then in step 232 an error message is generated, and the path is abandoned; another path is searched if the list (225 in FIG. 17) of undecoded basic blocks is not empty, as tested in step 238. In step 233 the look-up in the address table (224 in FIG. 17) also indicates whether the decoded instruction overlaps an undecoded basic block. If so, there is an error because the block entry point of the undecoded basic block would be in the middle of an instruction. In this case, the error is reported in step 234, and the undecoded basic block is removed from the list (225 in FIG. 17) of pointers to undecoded basic blocks under the assumption that the unresolved block entry is erroneous. At this point one instruction has been added to the flowgraph.

An execution transfer instruction will always cause the termination of a basic block. This condition is checked in step 235. When an execution transfer instruction is found, the next instruction for each of the possible execution paths of the instruction is investigated in step 236. A path back to previously decoded instructions is linked up to the entry point of an existing block or, when the path is directed to the middle of an existing block, the existing block is split into two blocks so that the path will always end at a block entry point. Otherwise, the investigation may conclude that the path should be terminated or should be followed. If there is more than one path to be followed, then the highest priority path is selected as a "continued path" and the addresses at which the other paths should be followed are queued as undecoded basic blocks with the basic block descriptor for the execution transfer instruction added to the list of predecessors in the each of the basic block descriptors of the undecoded basic blocks. For a conditional branch instruction, for example, the execution path in address sequence (i.e., the straight-line path) is the high priority "continued path" and the destination address of the execution transfer or "true branch" is queued. The manner in which each possible execution path is investigated in step 236 is described further below in connection with FIG. 19. If none of the possible execution paths are to be continued, as checked in step 237, then in step 238 the list of undecoded basic blocks is checked to determine if there are any other paths to follow. If not, the flowgraph is finished. Otherwise, execution loops back to step 229 to start following the path from the block entry point of the next undecoded basic block in the list of undecoded basic blocks (225 in FIG., 17). If step 237 decides that there is a continued path, then in step 239 execution branches either to step 246 if the path continues in an undecoded basic block, or otherwise to step 240. (Step 263 in FIG. 19 as described below will have already checked whether the path continues in a decoded basic block, so that step 240 is reached only when the path continues to an undecoded instruction.) In step 240 a new basic block is created for the next instruction, the list of predecessors for the new basic block is set to initially include a pointer to the basic block containing the execution transfer instruction, and a pointer to the new basic block is added to the list of successors in the basic block descriptor of the basic block containing the execution transfer instruction. In step 246, a pointer to the basic block containing the execution transfer instruction is added to the list of predecessors for the undecoded basic block, a pointer to the undecoded basic block is added to the list of successors for the basic block containing the execution transfer instruction, the pointer to the undecoded basic block is removed from the list of undecoded basic blocks, and decoding begins in step 230 for the undecoded basic block; if decoding of the next instruction is successful, the basic block descriptor of the undecoded basic block is updated to indicate that it has been decoded.

When step 235 finds that an instruction in a block is not an execution transfer instruction, then the path is followed to the next instruction in address sequence. It is possible that this path may have to be terminated because it goes out of the predefined instruction memory area. Depending on the user's choice, the predefined instruction memory area may be defined as a read-only memory area, or in any case the predefined instruction memory area is limited to the memory area allocated for the entire original translated program. Therefore, in step 241, execution branches to step 242 where the error is reported, and the path is discontinued. Execution then continues in step 238 to look for a new path to follow.

The basic block will also end when the next instruction in address sequence runs into another basic block, which is a successor block. This condition is checked in step 243, by indexing the address table (224 in FIG. 17) with the address of the next instruction. In step 244 the basic block descriptor of the successor block is accessed to determine whether the successor block is either a decoded basic block or an undecoded basic block. If it is an undecoded successor block, then in step 246 a pointer to the basic block containing the last decoded instruction is added to the list of predecessors for the undecoded basic block, a pointer to the undecoded basic block is added to the list of successors for the basic block containing the last decoded instruction, the pointer to the undecoded basic block is removed from the list of undecoded basic blocks, and decoding begins in step 230 for the undecoded basic block; if decoding of the next instruction is successful, the basic block descriptor of the undecoded basic block is updated to indicate that it has been decoded. Otherwise, if the successor block is a decoded block, then in step 246 a pointer to the successor block is added to the list of successors in the basic block descriptor of the block containing the last decoded instruction, and a pointer to the block containing the last decoded instruction is added to the list of predecessors in the basic block descriptor of the successor block. Execution then continues in step 238 in to look for a new path to follow.

Figure 19:
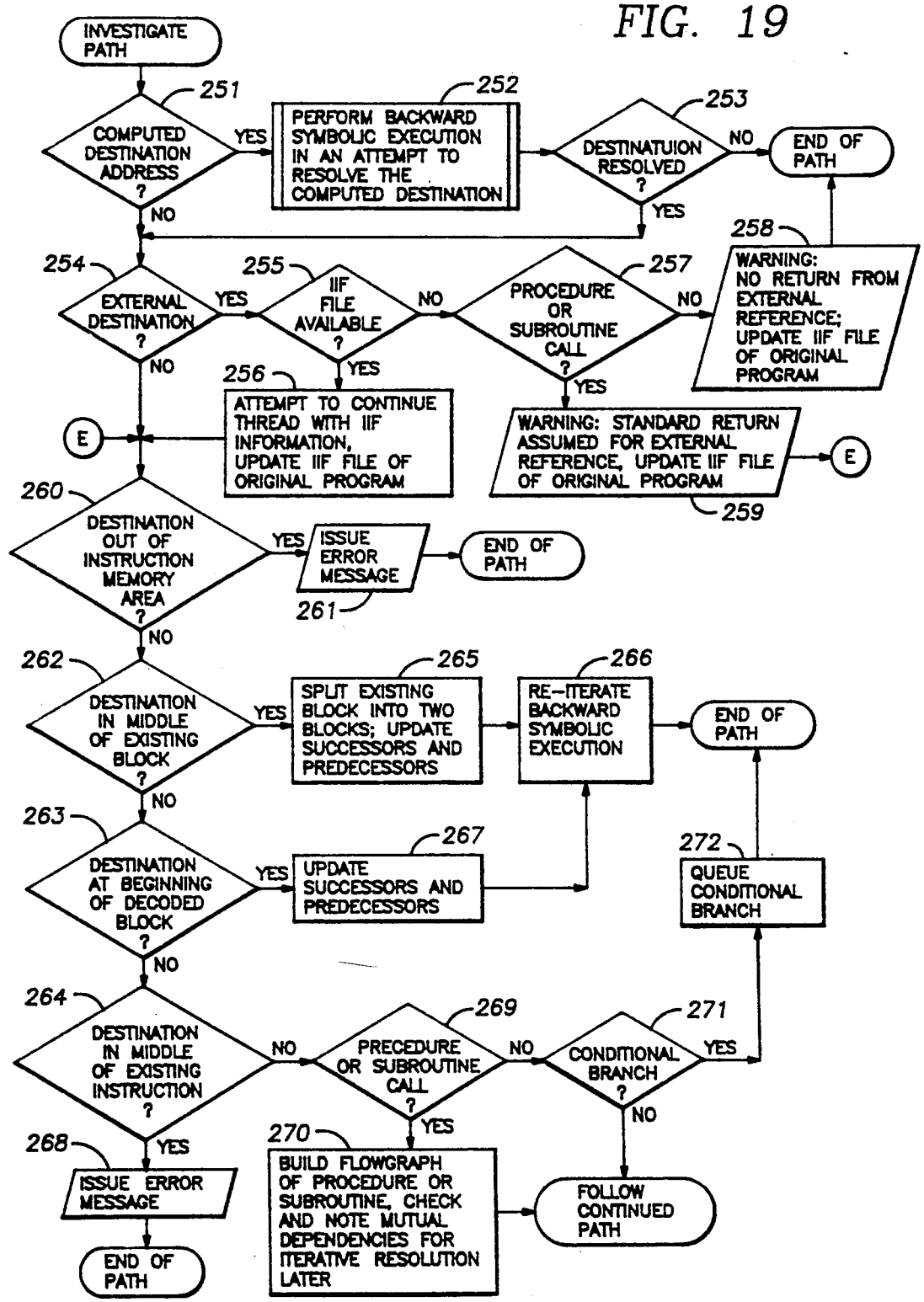
FIG. 19 is flowchart of a procedure used by the analyzer for investigating paths from execution transfer instructions during the automatic generation of flowgraphs from machine code.

Turning now to FIG. 19, there is shown a flowchart of a procedure followed in step 236 of FIG. 18 for investigating the next instruction in one of the paths from an execution transfer instruction. In the first step 251 of FIG. 19, the execution transfer instruction is inspected to determine whether it has a computed destination address. If it does, then in step 252 a process of backward symbolic execution is performed in an attempt to resolve the destination. This process is particularly useful for resolving procedure and subroutine calls. If the destination is not resolved, as checked in step 253, the investigation of the path terminates, because the next instruction in the path is not known and will not be determined until the interpreter is called at execution time. In the process of backward symbolic execution, the computed destination address is resolved by a backward search from the execution transfer instruction through the flowgraph to find at least one prior instruction which is used to resolve the computed destination address to an address value that is fixed with respect to the addresses of the instructions in the program. The process of backward symbolic execution is further described below in connection with FIG. 20.

Continuing now in step 254, the path being investigated will have a known destination address. This destination address is compared to the limits of the memory allocated to the original program, and if it is outside those limits, the destination is considered to be an external reference, such as an operating system routine. In step 255 a search is made for an image information file containing information about the external reference. If such an image information file is available, then it is inspected in step 256 to determine the destination or destinations where the path will continue from the external reference. If the external reference is a procedure or subroutine, it is desirable to create a "placeholder" block to hold information about behavior of the subroutine or procedure call. The subroutine or procedure may have abnormal behavior such as not returning, returning to 4(SP), or modifying the caller's registers. This abnormal behavior should be indicated in the image information file, and used if possible to determine the return path or paths from the external program. In addition, it is desirable to record in the image information file for the original program information about the call, such as the external destination address, the call type, the number of parameters, and any definite values for the parameters. Definite values for the parameters, for example, might be found by backward symbolic execution from the call instruction. This information about the call could be used in a process of iterative translation of multiple programs, as described below with reference to FIGS. 31 to 33.

If an image information file is not found for an external reference, then in step 257 the opcode of the execution transfer instruction is inspected to decide whether the external reference is a subroutine or procedure. If the execution transfer instruction is not a subroutine or procedure call, then in step 258 a warning is issued indicating that no return was assumed for the external reference, information about the call is recorded in the image information file for the original program, and investigation of the path is terminated with the conclusion that the path cannot be followed. If the execution transfer instruction is a subroutine or procedure call, then in step 259 a warning is issued indicating that a standard return is assumed for the external reference, and information about the call is recorded in the image information file for the original program. It is also desirable to create a "placeholder" block at this point in the flowgraph to hold the information that is assumed about the effects of the subroutine call. Investigation of the path is continued assuming that the destination of the path is the next instruction in address sequence following the execution transfer instruction.

At step 260, the destination of the path being inspected has been resolved to a destination within the memory area allocated to the original program. In step 260 the destination is compared to the limits of the memory area allocated to the instructions in the original program. In the usual case, the memory area allocated to the instructions in the original program is a read-only memory area, such as the area 187 shown in the memory map 181 of FIG. 14. If the destination is outside of this memory area, then an error message is issued in step 261 and the path is abandoned.

At step 262, the destination could be in the previously decoded instructions, where it could be terminated. To check for this condition, the table (224 in FIG. 17) is indexed with the destination, and the table entry is inspected to see whether the address is in the middle of a previously decoded instruction, or whether the address is the address of a previously decoded instruction, or an instruction at the beginning of a basic block; if not, the destination is at the middle of an existing block. These operations perform the tests in steps 262, 263, and 264 of FIG. 19.

If step 262 determines that the destination is in the middle of an existing block, then in step 265 the existing block is split into two blocks by the creation of a new block having as predecessors the existing block and the block containing the execution transfer instruction. In addition, all of the successors of the existing block are transferred to new block, the basic block descriptor of the existing block is also updated to indicate the shorter block length, a pointer to the new block is added to the list of successors in the basic block descriptor of the block containing the execution transfer instruction, and the table of instruction addresses is updated to reflect the change in the existing block. Next, in step 266, backward symbolic execution is re-iterated for any computed destination addresses in the new block and in any block in the line of successors of the new block in order to attempt to resolve additional destinations by backward symbolic execution back through the path being investigated. This completes the investigation of the path.

If step 263 determines that the destination is at the beginning of a decoded block, then in step 267 a pointer to the block including the execution transfer instruction is added to the list of predecessors in the basic block descriptor of the existing block, and a pointer to the existing block is added to the list of successors in the basic block descriptor of the block including the execution transfer instruction. Backward symbolic execution back through the path under investigation is reiterated in step 266 for any computed destination addresses in the existing block and the line of successors from the existing block. This completes investigation of the path.

If step 264 determines that the destination is in the middle of an existing instruction, then an error message is issued in step 268, and the investigation of the path is finished.

If step 264 does not determine that the destination is in the middle of an existing instruction, then in step 269 the opcode of the execution transfer instruction is inspected to determine whether it is a procedure or subroutine call. If so, then in step 270 the path is followed into the procedure or subroutine. If the subroutine is not already translated, it is translated. In any case, a "placeholder" block is created in the flowgraph to store information about the effects of the particular procedure or subroutine call. If the subroutine is not already translated, the procedure or subroutine is analyzed to insure that it does not modify the return address or saved registers on the stack. The analysis may reveal the presence of "callbacks", as further described below with respect to steps 372 and 373 in FIG. 24. If the subroutine call found in step 269 occurs to an entry point for which a callback is noted, then backward symbolic execution (as described below with reference to step 374 in FIG. 24) should be attempted to discover the address of the routine and translate it.

In step 271, the opcode of the execution transfer instruction is again inspected to determine whether the path under investigation is a conditional branch. If not, then the path is followed. Otherwise, in step 272, an undecoded block is created for the destination address of the execution transfer for a conditional branch instruction, and a pointer to the basic block descriptor of the new block is placed in the list of undecoded blocks.

The VAX ™ instruction set includes a peculiar "CASE" instruction that is more complex than conditional branch instructions. It is theoretically possible to have a CASE instruction whose number of destinations is only known at runtime, but such an instruction is untranslatable; therefore, the analyzer should mark it as "untranslatable" so that the code generator will generate a call to the interpreter to interpret the CASE instruction. In the usual situation, the number of destinations for the CASE instruction will be known at translate time. All but one of these destinations can be queued in step 236 of FIG. 18, while the path can be continued from the remaining destination. A recurring problem, however, is that sometimes one of a multiplicity of destinations specified for the CASE instruction is irrelevant because it is never taken during execution. In this situation, the displacement for the irrelevant destination is usually zero. Therefore, in step 236 of FIG. 18, a special test should be made for the CASE opcode and a zero displacement path. If this condition is found, that CASE target is marked "untranslatable" so that it is interpreted at execution time. Another recurring problem with the CASE instruction is that sometimes the irrelevant path is the "fall-through" path to the next instruction in address sequence. In this situation the "fall-through" path might not contain translatable code, which will cause parsing and conversion errors in step 230 of FIG. 18. If parsing and conversion errors occur, then the translator should issue an error message and discontinue following the thread (by continuing execution in step 238). For formulating the error message, the translator could look for a CASE statement preceding the instruction for which the parsing or conversion error occurred, and when found, diagnose the error as probably due to the CASE statement. Moreover, when discovered, these problems with the CASE statement may be recorded in the image information file generated by the translator for the original program.

A flowgraph generated by the procedure of FIGS. 18-19 is shown in FIG. 15. For a program named "DHRYSTONE", the initial entry point is at <main>, which has an address of 2E00 in the original program. The first two bytes are a VAX ™ call mask, 0000, specifying that no extra registers are to be saved when DHRYSTONE is called, and that the exception-enable bits IV and DV (integer and decimal overflow) are to be off (the default for C programs). In FIG. 15, this information is included in the first basic block represented by the hexagon symbol 301 for a procedure call.

The next 9 bytes are a single basic block consisting of two instructions, a SUBL2 (subtract longword) followed by a JSB (jump to subroutine). In FIG. 15, this information is shown in the second basic block represented by the rectangle 302 for a "normal" block.

Upon encountering the JSB instruction, the translator performs a look-up of an image information file, turns the reference into offset 0 in the image VAXCRTL, and looks in the file for information associated with the offset 0. The translator finds a normal return, and usage and setting of registers. Using this information, the translator builds a placeholder block, represented by the dashed oval 303 for a JSB placeholder, and (because of the uses JSB property) connects the placeholder to a new basic block starting just after the JSB instruction, at address 2E0B. This basic block consists of a single CALLS instruction, and is represented by the rectangle 304. The translator calculates the destination address as 2E18, and finds that it is a procedure (Proc0) within the DHRYSTONE image, but the procedure has not yet been examined. The translator creates a placeholder for the procedure call, represented in the flowgraph as a dashed hexagon 305. Because the procedure has not yet been examined, the translator continues parsing instructions in the procedure, beginning at address 2E18. Eventually the translator decodes a RET in the procedure, indicating a normal return to address 2E12 in the main routine.

The translator continues parsing beginning at 2E12, and finds a CVTWL (convert word to longword) instruction and a RET (return) instruction, which are included in a basic block represented in the flowgraph by a rectangle 306. The RET instruction terminates the main routine, so that the translator must continue with some other entry point in the DHRYSTONE program.

Figure 20:
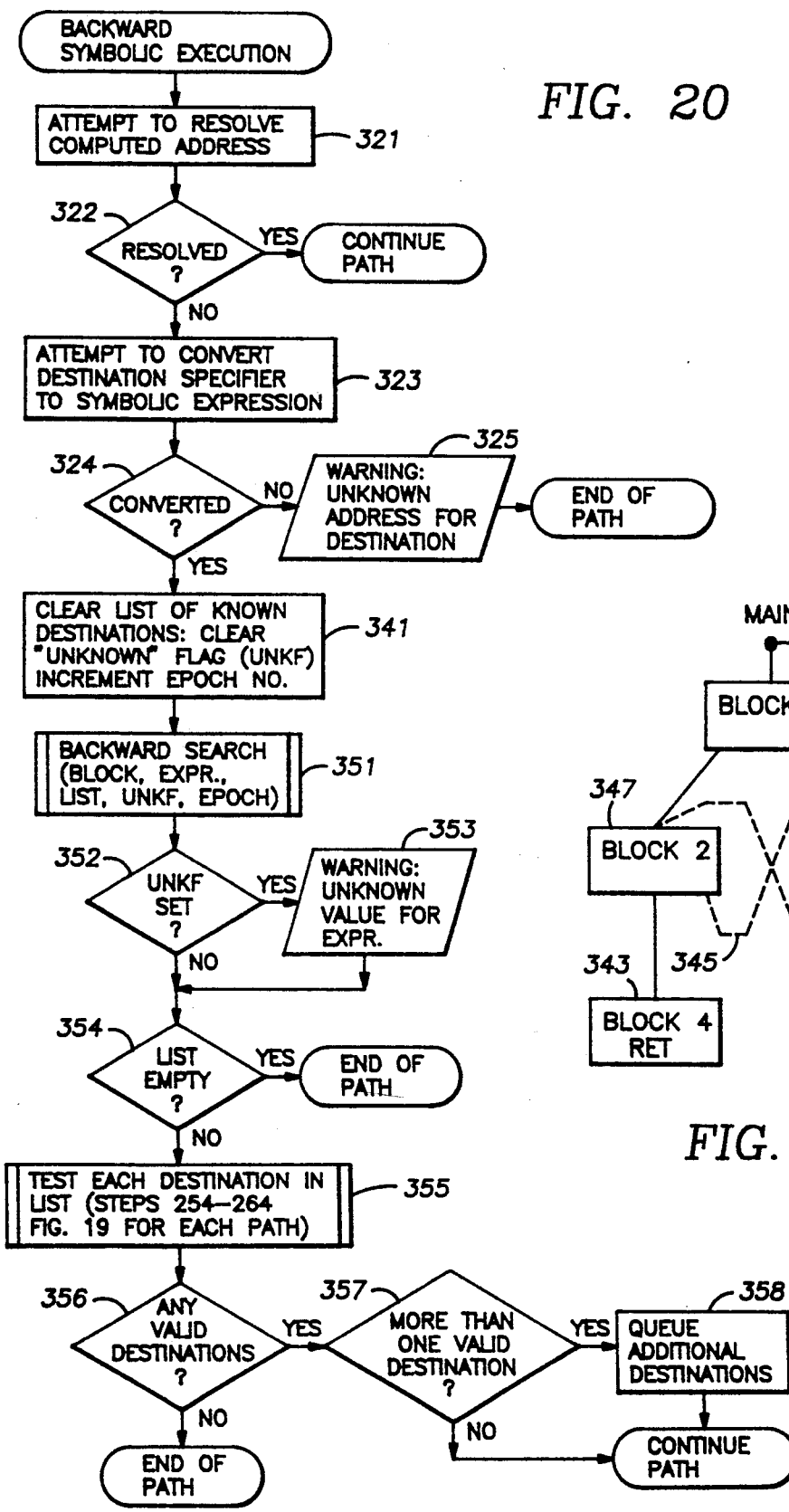
FIG. 20 is a flowchart of a procedure used by the analyzer for performing backward symbolic execution in an attempt to find values of a computed destination address prior program execution.

Turning now to FIG. 20, there is shown a flowchart of a procedure for performing backward symbolic execution. In the process of backward symbolic execution, the destination address for the execution transfer instruction is represented by a symbolic expression, and the expression is successively modified to reflect the effect of each prior instruction. For example, suppose the execution transfer instruction is "JMP R6+4" which transfers execution to the absolute address computed by adding four to the contents of a general purpose register R6. The computed destination address, for example, is represented symbolically as "R6+4". Suppose that in the backward direction through the program, the next instruction that references R6 is "MOVAB 4(R5),R6" which adds 4 to the contents of a general purpose register R5 and puts the sum into R6. Then the symbolic expression "R6+4" is pushed back through the prior "MOVAB 4(R5),R6" instruction to obtain the modified expression "R5+8". The modified expression has the same value before the prior instruction as the symbolic expression has after the prior instruction.

The process of backward symbolic execution continues until either the computed destination address is resolved to an absolute or image-relative address, or a prior instruction is reached which affects the value of the computed destination address but for which backward symbolic execution is not permitted. Backward symbolic execution is not permitted, for example, for certain instructions (such as XORB2 R1,R2) for which backward symbolic execution is unable or unlikely to resolve the computed destination address. In this case it is convenient to reduce the computed destination address to a symbolic value of "UNKNOWN" to indicate the possibility of missing code. Permitting symbolic execution for only a limited set of instructions (such as additions, subtractions, loads, and stores involving general purpose registers), however, allows the resolution of a large fraction of the computed destination addresses found in typical programs.

When invoked in step 252 of FIG. 19, backward symbolic execution begins in step 321 of FIG. 20. In step 321, an attempt is made to convert the computed destination of the execution transfer instruction (recognized in step 235 of FIG. 18) to a predefined format of a symbolic representation of the destination address. The computed destination operand of an execution transfer instruction, for example, could have at least the following forms, which are indicated in the table below by their assembler notation, with the name of their corresponding addressing mode.

DESTINATION OPERANDS FOR A COMPUTED DESTINATION ADDRESS

| | | |
|---|---|---|
| 1. | (Rn) | Register Deferred |
| 2. | −(Rn) | Autodecrement |
| 3. | (Rn)+ | Autoincrement |
| 4. | @(Rn)+ | Autoincrement Deferred |
| 5. | disp(Rn) | Byte Word Longword Displacement |
| 6. | disp(PC) | Byte Word Longword Relative |
| 7. | @disp(Rn) | Byte Word Longword Displacement Deferred |
| 8. | @disp(PC) | Byte Word Longword Relative Deferred |
| 9. | (Rn)[Rx] | Register Deferred Indexed |
| 10. | −(Rn)[Rx] | Autodecrement Indexed |
| 11. | (Rn)+[Rx] | Autoincrement Indexed |
| 12. | @(Rn)+[Rx] | Autoincrement Deferred Indexed |
| 13. | disp(Rn)[Rx] | Byte Word Longword Displacement Indexed |
| 14. | @disp(Rn)[Rx] | Byte Word Longword Displacement Deferred Indexed |

Although indexed addressing is commonly used for addressing tables and arrays, it is not commonly use for specifying a destination address for an execution transfer. Therefore one preferred format for symbolic expressions to represent destination addresses in a format capable of representing all but the indexed addressing modes. Such a format is shown in FIG. 21. It includes a memory access flag 326 for indicating deferred addressing, a register number 327, and a longword displacement 328. The format may also include a register flag 329 that can be set to indicate that the register number 327 is valid, so that the format may also represent a longword constant. The register flag, for example, is set during step 321 of FIG. 20 and is reset if and when the process of backward symbolic execution finds a value for the contents of the register indicated by the register number and adds that value to the longword displacement. The address value indicated by the format in FIG. 21 is that value obtained by adding the displacement to the contents of the register when the register flag is set, or is the value of the displacement when the register flag is not set, and when the memory access flag is set, the sum or value is used as a address to fetch the address value from memory.

Shown in FIG. 22 is a more complex format for a symbolic expression capable of representing all of the addressing modes associated with computed destination addresses. This format includes a memory access flag 331, an index register flag 332, an index register number 333, a scaling constant 334, a base register flag 335, a base register number 336, and a longword displacement 337. The address value indicated by this more complex format is the value of the displacement, plus the value of the base register when the base register flag is set, plus the scaling constant times the value of the index register when the index register flag is set, and when the memory access flag is set, the sum is used as an address to fetch the address value from memory. The more complex format of FIG. 22 would improve backward symbolic execution for finding destination addresses for execution transfer instructions that do not use indexed addressing modes, because it would permit the process of symbolic execution to account for the effects of more opcodes in the instruction set. For example, the format n FIG. 21 is incapable of representing the effect of a complement instruction upon the register specified by the register number. The format of FIG. 21, however, could use a signed offset number, and the effect of a complement instruction upon the index register specified by the index register number could be accounted for by complementing the offset number.

To account for the effects of an even greater number of instruction operations, the symbolic expression could use a variable length format such as an alphanumeric character string including one or more numeric constants; one or more register designators for designating the contents of each general purpose registers such as R1, R2, R3, . . . , R15; arithmetic operators such as + and *; and a memory access function @(x) representing the contents of memory at the address x, so that the value of the expression would be that value represented by applying the rules of algebra. A longword displacement deferred specifier such as @7(R1)[R4] is therefore represented as @(4*R4+R1+7). The offset constant of 4 for the index register R4 is determined by the longword mode of the specifier; the offset constant would be 2 for a word mode, and 1 for a byte mode. An offset constant of 1, however, would not need to be included in the character string. Other algebraic rules of simplification would apply, such as: x+A+B, where A and B are numeric constants, should be simplified to x+C, where C=A+B; x+Ry+Ry should be simplified to x+2*Ry; and @(z)+@(z)+x should be simplified to 2*@(z)+x.

In step 321, an attempt is made to resolve the destination address for the execution transfer instruction by inspecting its destination specifier. This can be done for the relative and relative deferred addressing modes. In the relative addressing mode, the address of the next instruction (i.e., the updated value of the program counter) is added to the displacement to provide the desired destination address. In the relative deferred addressing mode, the address of the next instruction is added to the displacement to obtain an absolute address, and the contents of memory at this absolute address (which should be in the fixup memory area 188 in FIG. 14) are fetched to provide the desired destination address. In step 322, when the destination address is resolved, execution branches back to continue following the path in step 237 of FIG. 18.

When the destination address is not resolved in step 321, then in step 323 an attempt is made to convert the destination specifier for the execution transfer instruction to a symbolic expression that, when evaluated at the beginning of the instruction, represents the value of the destination address. This is in contrast to the evaluation of the destination specifier itself, which occurs at the end of the instruction.

For all but the autodecrement modes, the assembly language notation for the destination specifier converts directly by matching to the terms in the symbolic expression. For the autodecrement mode, the base register content is decremented by 1, 2, 4, 8 or 16 depending on the data-type of the instruction opcode before the base register content is used in evaluating the destination specifier. Therefore, when an autodecrement destination specifier is converted, the displacement constant in the symbolic expression is −1, −2, −4, −8 or −16 depending on the data-type of the opcode of the execution transfer instruction. Moreover, if the instruction architecture would permit autodecrement source specifiers in an execution transfer instruction, then for each autodecrement source specifier using the same base register as a register included in the destination specifier, the displacement constant in the symbolic expression would need to be decremented by −1, −2, −4, −8 or −16 depending on the data-type of the opcode of the execution transfer instruction to account for the effect of each such autodecrement specifier.

In step 324, execution branches to step 325 when the destination specifier cannot be converted to a symbolic expression. This occurs, for example, when the fixed format of FIG. 21 is used for the symbolic expressions, and the destination specifier has an indexed addressing mode. In step 325 a warning is issued indicating that the execution transfer instruction has an unknown destination.

When the destination specifier is converted to a symbolic expression, some variables are initialized in step 341 to preform backward symbolic execution to search for possible destination values for the symbolic expression. A list for receiving definite values is cleared, and a flag for indicating the presence of at least one unknown value is cleared. In addition, an "epoch" number is incremented.

Figure 23:
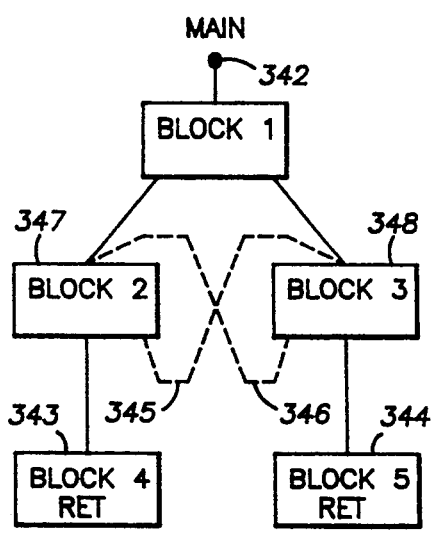
FIG. 23 is a schematic representation of a flowgraph of a main program routine illustrating an indirect program loop including execution transfer paths shown by dashed lines.

The epoch number is used to mark each block for which symbolic execution has passed, in order to prevent infinite loops through the flowgraph. The possibility of infinite loops is illustrated by the flowgraph shown in FIG. 23. The flowgraph is drawn as a hierarchical data structure. The flowgraph, for example, has an main entry point 342, and execution terminates at return instructions in terminal blocks 343, 344. Although there are no direct loops from the ends to the beginnings of any one block, there are paths 345 and 346 interconnecting intermediate blocks 347 and 348, which could cause infinite loops during hierarchical searches. A forward hierarchical search, for example, is typically performed by calling a routine which begins searching a block at its beginning, and if and when the end of the block is reached, the routine recursively calls itself for each successor of the block; conversely, a backward hierarchical search is typically performed by calling a routine which begins searching a block at is end, and if and when the beginning of the block is reached, the routine calls itself for each predecessor of the block. The presence of the paths 345 and 346 would cause either of these search routines to get caught in infinite loops, because the intermediate blocks 347, 348 would be alternately and repetitively searched.

To prevent infinite loops during a forward or backward search, an "epoch number" is incremented prior to a search, and each time that the search routine is entered for a block, the "epoch number" is compared to an "epoch number attribute" for the block. A match between the "epoch number" and the "epoch number attribute" indicates that the block has already been reached during that search, and therefore should not be repeated.

Returning now to FIG. 20, in step 351 a backward search is initiated for possible values of the symbolic expression by calling a search routine in FIG. 24, as further described below. Then in step 352 the "unknown" flag is inspected, and if it is set, a warning message is issued in step 353 to warn of possible unknown values for the symbolic expression. In step 354 the list of definite values is inspected; if it is empty, the end of the path from the execution transfer instruction has been reached, and execution continues in steps 237 and 238 of FIG. 18 in an attempt to follow another path. Otherwise, in step 355, each definite value in the list is tested in the manner previously described above for steps 254 to 264 to insure that it is a valid destination. As described above in connection with FIG. 27, however, some of these tests could be performed before the definite value is placed on the list so that the test can take into account the particular manner in which the definite value was obtained. Then step 356 checks whether any of the definite values in the list are valid. If not, the end of the path from the execution transfer instruction has been reached, and execution continues in steps 237 and 238 of FIG. 18 in an attempt to follow another path. Otherwise, step 357 checks whether the list includes more than one valid destination. If so, all but one are placed in the list of undecoded blocs (225 in FIG. 17), and the path is continued beginning at the remaining valid destination in steps 237 and 239 of FIG. 18.

Figure 24:
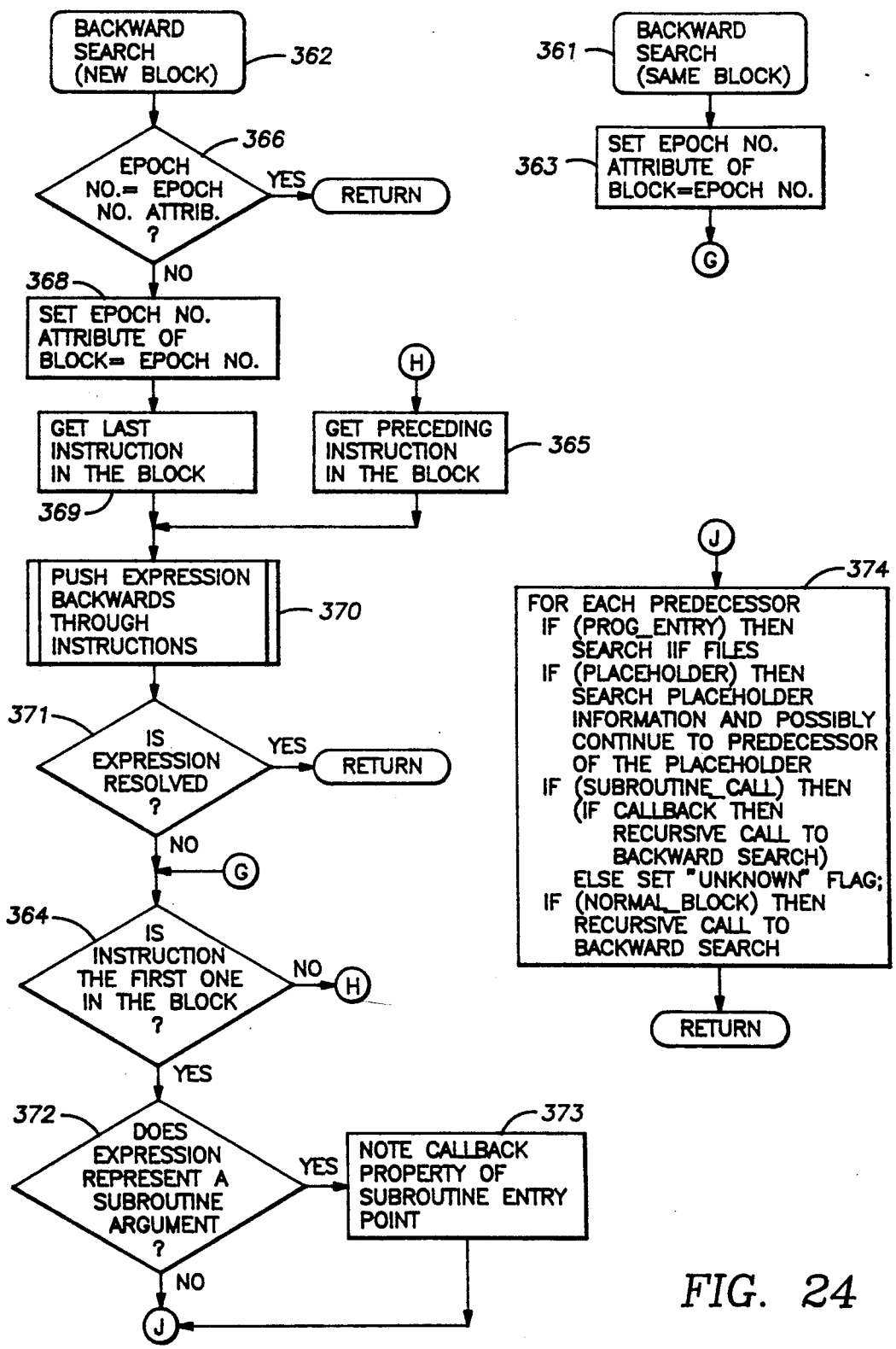
FIG. 24 is a flowchart of a procedure used in backward symbolic execution for searching a basic block in an attempt to find values for a given symbolic expression.

Turning now to FIG. 24, there is shown a flowchart of the backward search routine called in step 351 of FIG. 20. This routine has two entry points. A first entry point 361 is called to begin a new backward search at a specified instruction address in a specified block. A second entry point 362 is called to continue the backward search beginning at the end of a specified block.

The first entry point 361 is called by step 351 of FIG. 20 to begin a new backward search at the instruction address of the execution transfer instruction; in this case a first step 363 sets the epoch number attribute of the current block containing the execution transfer instruction equal to the epoch number for the new search. Then in step 364 the search in the current block is terminated if the current instruction address is the address of the first instruction in the block, which may occur if the block consists only of the execution transfer instruction. Otherwise, in step 365, the current instruction address is changed to the instruction address of the preceding instruction. These last two steps 364, 365 are easily done by indexing the table (224 in FIG. 17).

When the second entry point 362 is called to continue the search at the end of a specified block, the epoch number is compared in step 366 to the epoch number attribute of the block. When a new block is created, the epoch number attribute of the new block is set equal to the current value of the epoch number, which is incremented at the beginning of a new search. Moreover, the epoch number is, for example, a longword, so that each time it is incremented, it provides a unique value for each search during the translation of a given program. Therefore, in step 366, the epoch number of the current search will be equal to the epoch number attribute of the current block only if the current block has already been included in the current search. To avoid an infinite loop in the search process and due to the reduced likelihood of finding any additional possible values, searching of the current block is terminated if the current block has already been included in the current search.

When the search is to continue from step 366, the epoch number attribute of the current block is set equal to the epoch number in step 368. Then in step 369 the current instruction address is set equal to the address of the last instruction in the block. At this point the search process in FIG. 24 is the same regardless of whether the search routine is called from the first entry point 361 or the second entry point 362.

In step 370 the expression is "pushed" backward through the current instruction in an attempt to resolve the expression, as further described below with reference to FIG. 25. If the expression is resolved, as tested in step 371, the search of the current block is terminated by returning from the backward search routine. If the expression is not resolved, then steps 364, 365, 370 and 371 are repeated to successively push the expression backward through the instructions in the block until the expression is resolved or until the beginning of the block is reached.

When step 364 finds that the expression has been pushed to the beginning of the block, step 372 checks whether the expression represents a subroutine argument. For the VAX TM architecture, an expression represents a subroutine argument when is in the form "@(R12+C)" where C is a constant. A call to an address specified by an argument of the subroutine is known generally as a "callback", which is a call to a procedure or function parameter. The "callback" is more particularly referred to as callback, jsbback, or jmpback, depending on the opcode of the execution transfer instruction. When the "callback" is found, in step 373 the property is noted in the image information file for the original program for use later for resolving any conflicts due to mutual dependencies between different programs, as described below with reference to FIGS. 31-33. A significant number of callbacks have been found, for example, in VMS TM system service routines and compiled BASIC programs.

Finally, in step 374, the search for possible values for the symbolic expression is continued by searching predecessors of the current block. If the predecessor is defined as a program entry point (i.e., a call from an external image), then information about parameter values from at least one calling program image is required in order to investigate whether any values for the symbolic expression might be determined by the calling program. Therefore image information files available to the translator are searched for information about parameter values that are passed to the program entry point.

If the predecessor is a placeholder, then placeholder information about the effects of the procedure or subroutine call will be referenced to determine whether those effects resolve the symbolic expression, in which case no further search of the predecessor is needed, or whether the procedure or subroutine call has no effect or a known effect on the symbolic expression, in which case backward symbolic execution can be continued to the predecessor of the placeholder. The placeholder information, however, may indicate that the subroutine affects the symbolic expression but in an unknown way. In this case backward symbolic execution could be performed beginning from each possible return in the subroutine that is in the line of succession from the entry point defined by the placeholder.

When the predecessor is a subroutine call from a call statement in the image, then a search is made in the calling routine only when the "callback" property was noted in step 373. For VAX/VMS TM programs, it is especially desirable to perform this search for a CALLS procedure call because in such a case the symbolic expression might be easily resolved from an instruction that pushes the callback parameter on the stack. Also, the validity of the search into the calling routine can be checked by comparing the callback parameter number N, where the symbolic expression is "@(R12+N)" or @N(AP) in assembler notation, to the number of parameters M actually put on the stack by the CALLS statement; this number M may be a short literal specifier of the CALLS instruction. Just before the CALLS statement, the procedure parameter is on the stack at a memory location of (N−4)SP. Therefore the effect of the CALLS operation upon the symbolic expression is accounted for by substituting SP for AP and subtracting 4 from the expression displacement when the expression is pushed through the CALLS instruction. At the address of the CALLS instruction, the symbolic expression to resolve is "@(R14+(N−4))". The search may be initiated by a recursive call to the second entry point 362 of the backward search routine of FIG. 24, after saving information that is needed by the backward search to continue the search of other predecessors when execution returns. The call and return could be coded as follows:

```
PRED_BLOCK ← PREDECESSORS(BLOCK, PTR1)
...
IF PRED_BLOCK(TYPE) = CALLX THEN
    (IF CALLBACK THEN
        (FOR EACH PREDECESSOR OF PRED_BLOCK:
            CALLING_BLOCK ← PREDECESSORS
            (PRED_BLOCK, PTR2)
            IF CALLING_BLOCK(LAST_INSTR) =
            CALLS THEN
                (PUSH(BLOCK, EXPR, PTR1,
                PRED_BLOCK, PTR2)
                BLOCK ← CALLING_BLOCK
                CALL BACKWARD_SEARCH
                POP(BLOCK, EXPR, PTR1, PRED_BLOCK,
                PTR2))
            ELSE SET UNKNOWN_FLAG)
    ELSE SET UNKNOWN_FLAG)
ELSE SET UNKNOWN FLAG
```

If a predecessor is a normal block, then it can also be searched recursively as follows:

```
IF PRED_BLOCK(TYPE) = NORMAL THEN
    PUSH(BLOCK, EXPR, PTR1)
    CALL BACKWARD SEARCH
    POP(BLOCK, EXPR, PTR1)
```

After all of the predecessor blocks are inspected or searched, the backward search routine is finished, and execution returns.

Figure 25:
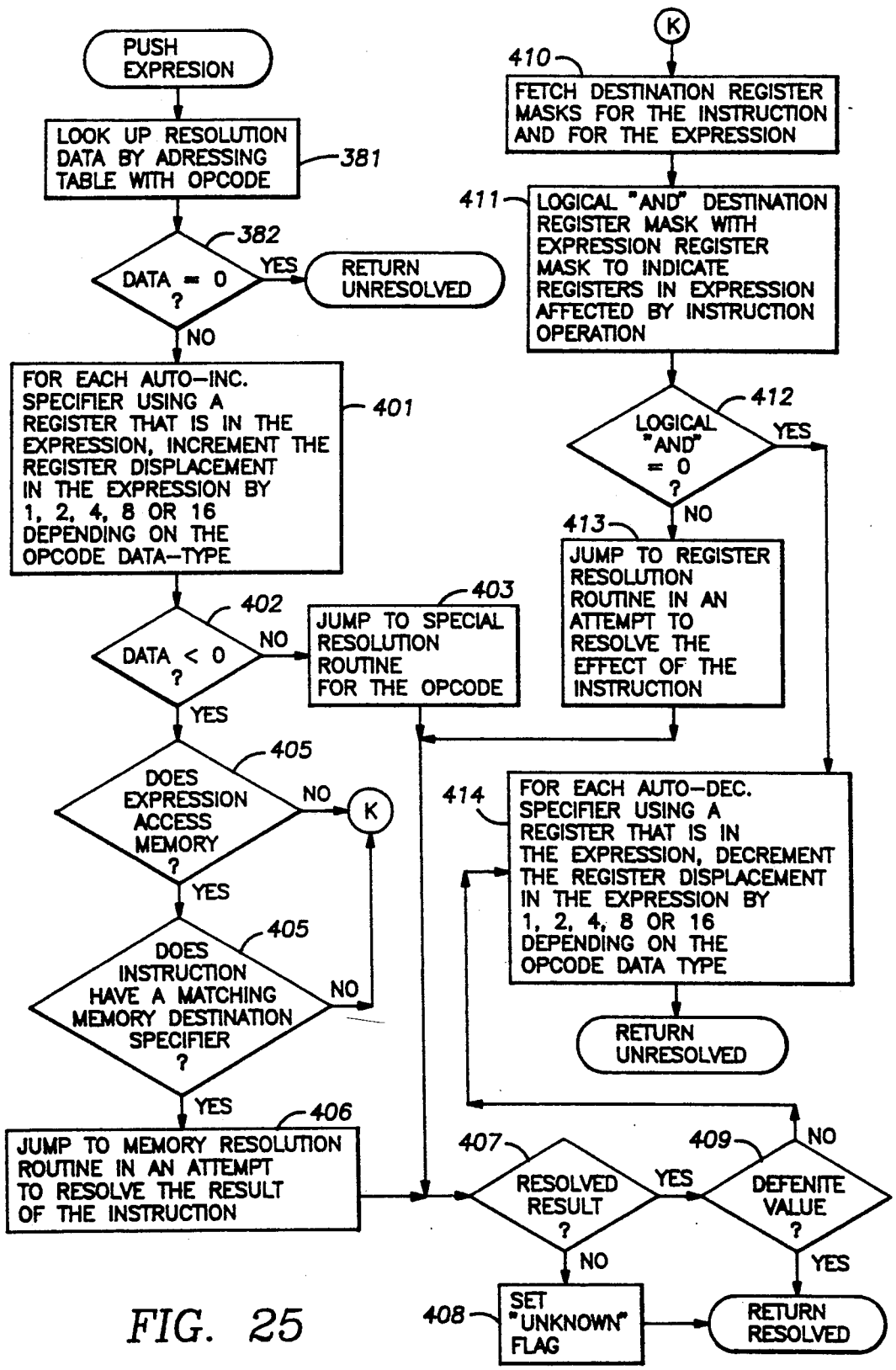
FIG. 25 is a flowchart of a procedure used in backward symbolic execution for pushing a given symbolic expression backward through an instruction in order to modify the symbolic expression so that the modified expression would represent the same value during program execution just prior to execution of the instruction as the given symbolic expression would represent just after execution of the instruction.

Turning now to FIG. 25, there is shown a flowchart of a routine for "pushing" a symbolic expression backward through a prior instruction to obtain a modified expression having the same value before the instruction as the symbolic expression has after the prior instruction. This routine, for example, is called in step 370 of FIG. 24. This process is highly dependent on the instruction opcode. Instruction opcodes that do not directly affect the contents of memory or the general purpose registers other than the program counter do not affect the value of a symbolic expression including only constants, register designators, and a memory access function. The changing value of the program counter in the usual case does not affect the value of the symbolic expression because before pushing the expression, the expression does not have any register designator designating the program counter, and if the process of pushing the instruction through the expression would tend to add to the expression a register designator designating the program counter, it is removed by substituting a definite address value. Instruction opcodes that are known to directly affect the contents of the general purpose registers or memory but which affect them in an indeterminate manner terminate the process with the finding of a symbolic value of "UNKNOWN".

Due to the complex way in which may opcodes affect the contents of the general purpose registers and memory, it is desirable to pre-store information regarding the effects of each opcode in a decoding table addressed by the opcode. The decoding table could include the starting address of a separate routine written for each opcode. For the sake of illustration, however, the following description will show the common aspects of routines for opcodes that perform similar functions, and therefore the decoding table organization in FIG. 26 includes a number of routines and opcode information that could be used by a more general procedure to branch off along various paths to perform specific actions for each opcode. It should be understood that such a general procedure could be expanded into a separate routine for each opcode by considering the paths taken in the general routine for each opcode.

In the first step 381 in the flowchart of FIG. 25, the decoding table is addressed to obtain an entry in the table. In step 382 the entry is compared to zero to decide whether the instruction, by virtue of its opcode alone, cannot have any possible effect upon the value of any permissible symbolic expression. If not, execution returns with the expression unresolved.

A possible format for the decoding table is shown in FIG. 26. Encoded into a longword table entry 386 is a displacement to a special resolution routine for opcodes having unusual effects, a displacement 387 to a memory reference resolution routine for the opcode, a displacement 388 to a register resolution routine for the opcode, and encoded information 389 about the data type and operands implied by the opcode. The encoded data for the opcode, for example, includes an implied register destination code 391, a data type code 392, a flag 393 to indicate an implied auto-decrement of the stack pointer, a flag 394 to indicate an implied memory operation, and a flag 395 to indicate an implied auto-increment of the stack pointer. The implied register code, for example, has a value of 0 in the usual case, a value of 1 to indicate that R0 and R1 are affected, a value of 2 to indicate the R0 to R3 are affected, and a value of 3 to indicate that R0 to R5 are affected. The data type code indicates either byte, word, longword, quadword, or octaword.

Returning now to the flowchart in FIG. 25, the expression is pushed backward through the sequence of intermediate operations for the instruction. In reverse order, these intermediate operations are auto-increment, opcode operation, and auto-decrement. In step 382 the instruction is scanned for any auto-increment specifiers. For each express and implied auto-increment specifier using a register Rx that is designated in the expression, the register designator Rx in the expression is replaced by Rx+C where C is 1, 2, 4, 8 or 16 depending on whether the opcode data-type is byte, word, longword, quadword, or octaword, respectively, and the expression is simplified, where possible, by the multiplication and addition of constants. For example, if the expression is "@(R1+R7+4)+@(R3+3)+R1+R6+7", the instruction includes an auto-increment specifier "(R1)+", and the opcode data-type is quadword, then the expression is changed to "@(R1+R7+12)+@(R3+3)+R1+R6+15".

In step 402, execution branches to a special register resolution routine in step 403 when the value of the data from the decoding table is not negative. To jump to the special resolution routine, for example, the following code could be used:

MOVB 3(R1),R2; R1 contains TABLE+4*OPCODE
    ADDL PC,R2,R2
    JMP R2

An example of a special register resolution routine is the routine for CALLS described above with respect to step 374; if $N \leq M*4$, where M is number of parameters specified by the CALLS instruction, "R14−4" is substituted for the occurrence of R12 in the expression "@(R12+N)" and the expression is simplified to obtain "@(R14+(N−4))", otherwise a value of "unknown" is returned.

In step 404 execution branches to step 405 when the expression has a memory access operation. In step 405 an attempt is made to match the argument of each memory access function to the address of the express or implied memory destination specifier for the instruction. If it is possible for a match to occur such that the value of the memory access operation is affected, then execution branches to step 406. In step 406, execution jumps to a memory resolution routine for the instruction opcode; the displacement to the memory resolution routine for a particular opcode, for example, is the "displacement for memory resolution routine" (387 in FIG. 26) in the decoding table.

The memory resolution routines include routines for opcodes with implied memory destinations, and routines for opcodes which may use express memory destination result specifiers. Opcodes with implied memory destinations, for example, include PUSHAB and PUSHL, which push an address or longword, respectively, upon the stack. The implied memory destination specifier for either PUSHAB x or PUSHL x is 0 (SP), which specifies a destination address that is certain to match to a memory reference argument of the form "R14". When a match is certain, the following substitutions are made in the symbolic expression: substitute x for the matching "@(R14)" term, and substitute "R14−4" for all R14 register designators.

An example of an opcode that may be found in an instruction having an express memory destination specifier is a data transfer instruction such as MOVL x,y where y is the memory destination specifier. In this case the result x of the instruction is substituted for y in each matching memory reference argument in the expression. If the instruction is MOVL R1,8(R2) and the expression is "@(R2+8)+R1+7", for example, then the expression is changed to 2*R1+7.

The matching of express memory destination specifiers to memory function arguments is also dependent on the opcode data-type. Instructions having quadword or octaword data-types, for example, may match to more than one longword. The instruction CLRQ (Rx), for example, has a quad-word data type, and its memory destination specifier matches to "@(Rx)" and "@(Rx+4)" with the memory function being reduced to zero in each case. Also of interest is a possible match when there is a mis-alignment of addresses from longword address boundaries; an example of this situation is the matching of the instruction CLRL (Rx) to "@(Rx+1)", in which only one byte of the desired longword address is resolved to a definite value of zero.

A design choice arises in step 406 when it is possible but not certain for the address specified by a memory destination specifier to match the argument of a memory operation in the expression. An example of this situation is where the memory destination specifier is (R1) and the expression has a memory access function @(R2); a match would occur if the previous instruction were MOVL R1,R2. The memory destination specifier could be converted to another symbolic expression representing the memory destination address specified by the memory destination specifier, and backward symbolic execution could be performed in an attempt to convert this other symbolic expression to a form that is certain to match or not match the arguments of the memory operations in the expression. Performing backward symbolic expression simultaneously for multiple expressions representing different destination addresses, however, complicates the search because additional epoch numbers and epoch number attributes are required for each different destination address. Therefore it would be desirable to limit the extent of any search for multiple symbolic expressions, for example, by limiting it to one additional symbolic expression, or by limiting the search to one additional symbolic expression in the current block and its predecessors that are different from the current block. In any case, if a match is possible but it is concluded that the match is not certain, then the result of step 406 in FIG. 25 is to resolve the result, but not to a definite value. Execution therefore branches in step 407 to step 408 where the "unknown" flag is set, and execution returns.

A symbolic expression may also be resolved to a result of "unknown" where it is difficult or impossible to represent the effect of the instruction in the format of the symbolic expression. An example of this situation is an exclusive-or operation. Unless the prior instructions are performing a swap of the contents of two registers, the effect of the exclusive-operation will be indefinite. A swap of registers R1 and R2, for example, could be coded as:

| XORL2 R1,R2 | ; R2 ← R1 XOR R2 |
| XORL2 R2,R1 | ; R1 ← R2 XOR R1 |
| XORL2 R1,R2 | ; R2 ← R1 XOR R2 |

In step 409 execution branches depending on whether step 406 resolves the expression to a definite value. An expression can be resolved to a definite value when all register designators with the exception of the program counter designator are eliminated from the expression. Therefore, whenever a register designation is removed or changed in a resolution routine, an attempt is made to resolve the expression to a definite value. This can be done by calling a routine such as the one described below with reference to FIG. 27.

When step 404 determines that the expression does not include a memory access function or when step 405 determines that the instruction does not have a memory destination specifier that could possibly match, then it is possible that the instruction may affect the contents of the general purpose registers. In the usual case, an instruction may affect the contents of the general purpose registers when it has an express register direct destination specifier, or when it has certain implied register direct destination specifiers. When an instruction has an express register direct destination specifier, however, it may affect registers other than the expressly specified register when the opcode data-type is quadword or octaword.

Due to the rather complicated way in which the contents of registers are affected by instructions, a decoding table could be used in which register usage masks are pre-stored for the various possible combinations of opcode register usage, data-type and destination register number. The register usage mask could be fetched for the instruction and used to quickly determine whether the instruction can possibly affect the symbolic expression. For the encoding of opcode register usage information 389 shown in FIG. 26, for example, the address for the register decoding table could be formed from the byte of opcode register usage by checking whether a register direct destination is specified for the instruction, and if so, appending the destination register number to the data type to form an index to the table of register usage masks. Each register usage mask is a word having bits set to indicate registers that are affected, and bits cleared to indicate registers that are not affected by the instruction. Also in step 410, a register usage mask for the symbolic expression is formed from a word by setting bits to indicate register designators used in the symbolic expression. Assuming, for example, that the most significant bit position is set or cleared to indicate the presence of R15 and the least significant bit position is set or cleared to indicate the presence of R0, then the register usage mask for the expression "@(R3+4)+R12+R4+3" would be $0001000000001100_2$.

In step 411 a logical AND is computed between the destination register mask of the instruction and the register usage mask for the symbolic expression to result in a register conflict mask indicating the register designators in the expression that may be affected by the instruction. In step 412 this register conflict mask is compared to zero to decide whether a register resolution routine for the particular instruction opcode should be used. If so, in step 413 the register resolution routine determines whether the symbolic expression should be modified to account for the effect of the instruction opcode to possibly resolve the expression to a definite value, or whether the effect is indefinite so that the expression should be resolved to a value of "unknown". If the instruction is a CLRL or CLRQ instruction, for example, each occurrence of each register designator indicated by the register conflict mask is removed from the symbolic expression. For a MOVL Rx,Ry instruction, the register designator for register Rx is substituted for each occurrence of the register designator Ry in the symbolic expression. For a MOVQ Rx,Ry instruction, however, each register Rz designated by the register conflict mask is replaced with the register designator R[z+y−x]. In other words, Rx is substituted for Ry, but Rx+1 is also substituted for Ry+1.

If the expression is not resolved by the one of the resolution routines, then in step 414 the symbolic expression is "pushed" through any auto-decrement operations that may affect the registers designated in the symbolic expression. For each express and implied auto-decrement specifier using a register Rx that is designated in the expression, the register designator Rx in the expression is replaced by Rx+C where C is −1, −2, −4, −8 or −16 depending on whether the opcode data-type is byte, word, longword, quadword, or octaword, respectively, and the expression is simplified, where possible, by the multiplication and addition of constants.

Although the "pushing" of expressions through instructions has been described generally with respect to complex expression formats and complex instructions, the process of backward symbolic execution has been found to be very useful for resolving computed destination addresses in VAX/VMS TM programs even though the simple expression format of FIG. 21 is used and the resolution routines resolve a value of "unknown" unless the instruction is MOVAB, PUSHAB, MOVL, PUSHL, CLRL, CLRQ, or CALLS.

Figure 27:
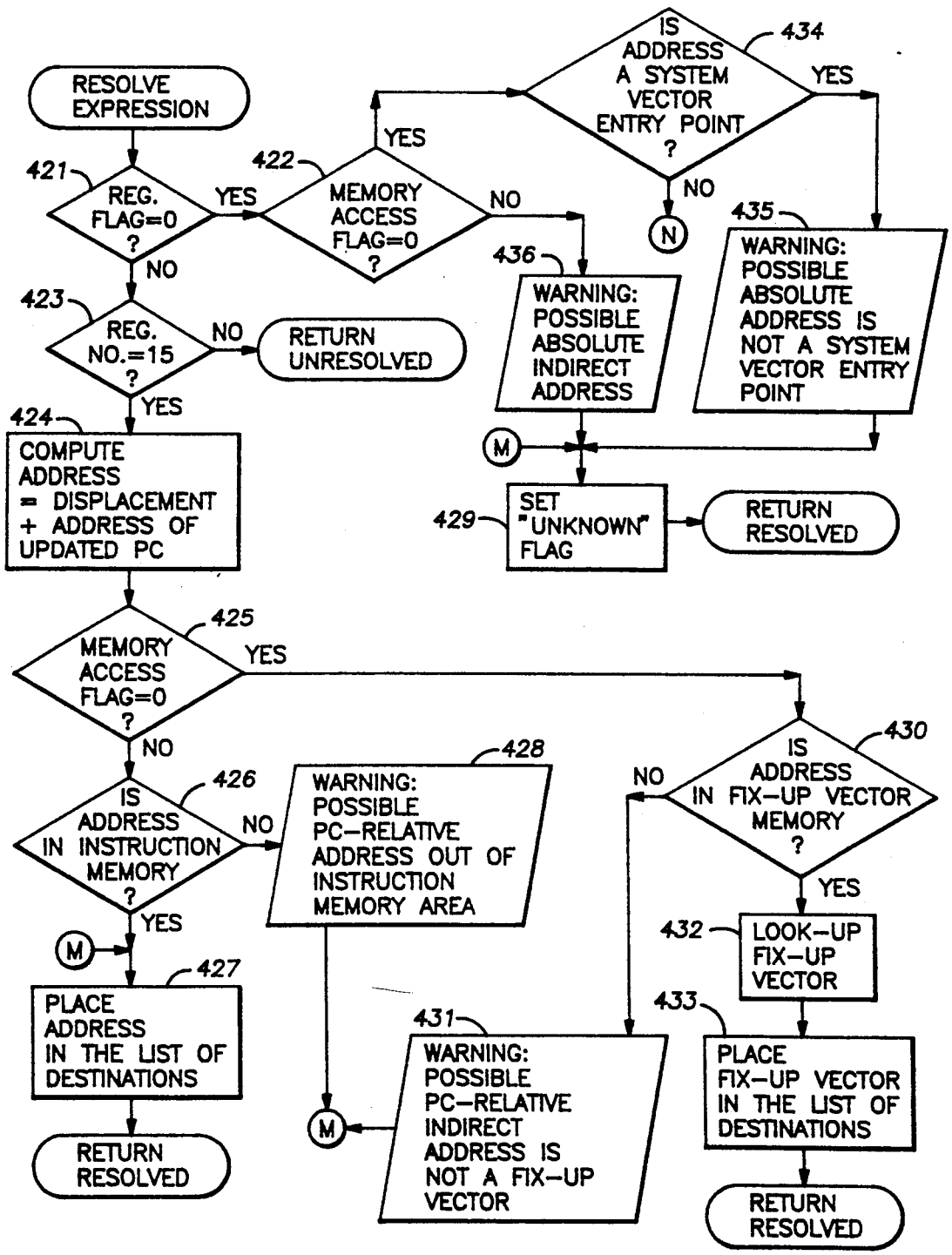
FIG. 27 is a flowchart of a routine for checking whether the pushing of a symbolic expression through an instruction has converted the expression to a form that represents a definite address in the computer program or in the operating system of the computer, and whether that address represents a permissible destination for the transfer of program execution.

Turning now to FIG. 27, there is shown a flowchart of a routine for resolving a term in a symbolic expression. The term, for example, is represented in the fixed format of FIG. 21.

In the first step 421 execution branches to step 42 if the register flag is set; otherwise execution continues to step 423. In step 423 the register number is compared to 15. Unless the register number is 15 and therefore designates the updated value of the program counter, the expression cannot be resolved. Therefore execution returns when the register number is not 15; otherwise, execution continues to step 424.

In step 424 the destination address is computed as the sum of the displacement and the value of the updated PC. In the VAX TM instruction architecture, the process of symbolic execution may add a PC register designator R15 to a symbolic expression when the current instruction has an express source specifier of register direct mode specifying the PC. In this case the value of the updated PC is the address of the byte immediately following the specifier that specified the PC in the current instruction.

In step 425 the memory access flag is inspected. If the memory access flag is not set, then the address should be a possible destination of the execution transfer instruction in the original program. For a VAX/VMS TM program, such a PC-relative address should be in the instruction memory area (187 in FIG. 14) of the program. This is checked in step 426, and if the address is found to be in the instruction area, the address is placed on the list of destinations in step 427, and execution returns with the expression resolved. Otherwise, a warning message is issued in step 428. In addition, because an address outside of the instruction memory address is considered invalid, it is not added to the list of destinations. Instead, the "unknown" flag is set in step 429, and execution returns with the symbolic expression resolved.

Execution branches to step 430 when the destination is a PC-relative indirect address. In a VAX/VMS TM program, a PC-relative indirect address is considered valid only when it is a fix-up vector contained in the fix-up vector area (188 in FIG. 14) of program memory. If the address computed in step 424 falls in the fix-up vector area of program memory and is included in the list or table of defined fix-up vectors, then in step 432 the addressed fix-up vector is read from memory and in step 433 the fix-up vector is placed in the list of destinations, and execution returns with the symbolic expression resolved. If the address computed in step 424 does not fall in the fix-up vector area of program memory or is not found in the list or table of predefined fix-up vectors, then a warning is issued in step 431, the "unknown" flag is set in step 429, and execution returns with the symbolic expression resolved.

If the register flag was found to be clear in step 421 and the memory access flag is also found to be clear, then the destination is an absolute address. For VAX/VMS ™ programs, an absolute address is considered valid only when it is a predefined system vector entry point. Therefore in step 434 a look-up is performed in a list or table of predefined system vector entry points. If the address is a predefined system vector entry point, then in step 427 it is added to the list of destinations, and execution returns with the symbolic expression resolved. Otherwise, in step 435 a warning is issued, in step 429 the "unknown" flag is set, and execution returns with the symbolic expression resolved.

If step 422 finds that the memory flag is set, then the destination indicated by the symbolic expression is an absolute indirect address. In a VAX/VMS ™ program, such an address is considered to be invalid. Therefore, in step 436 a warning is issued, in step 429 the "unknown" flag is set, and execution returns with the symbolic expression resolved.

Figure 28:
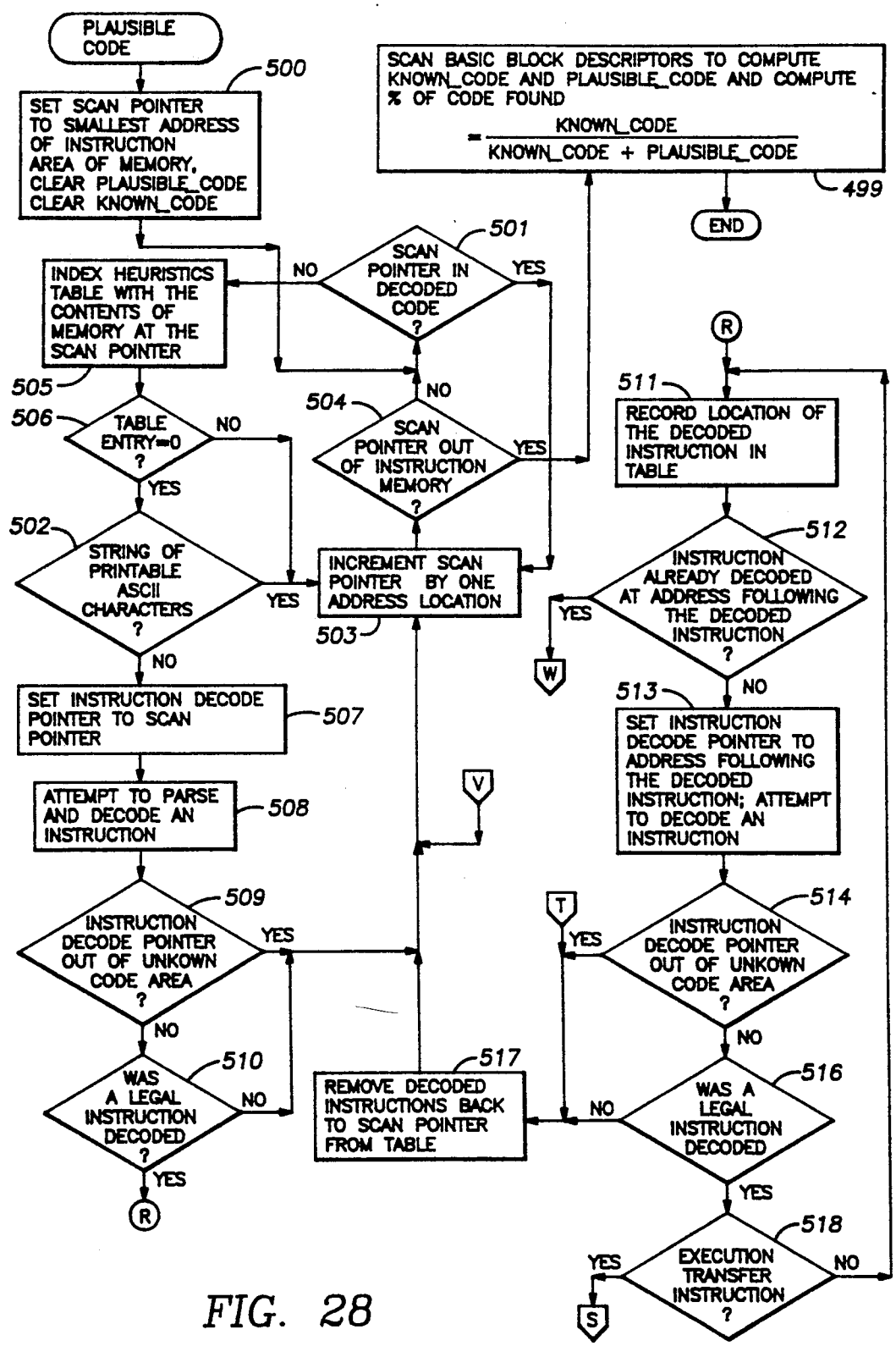
FIGS. 28 and 29 together comprise a flowchart of a procedure including three scanning modes for finding plausible program code in unknown code areas of program memory.
Figure 29:
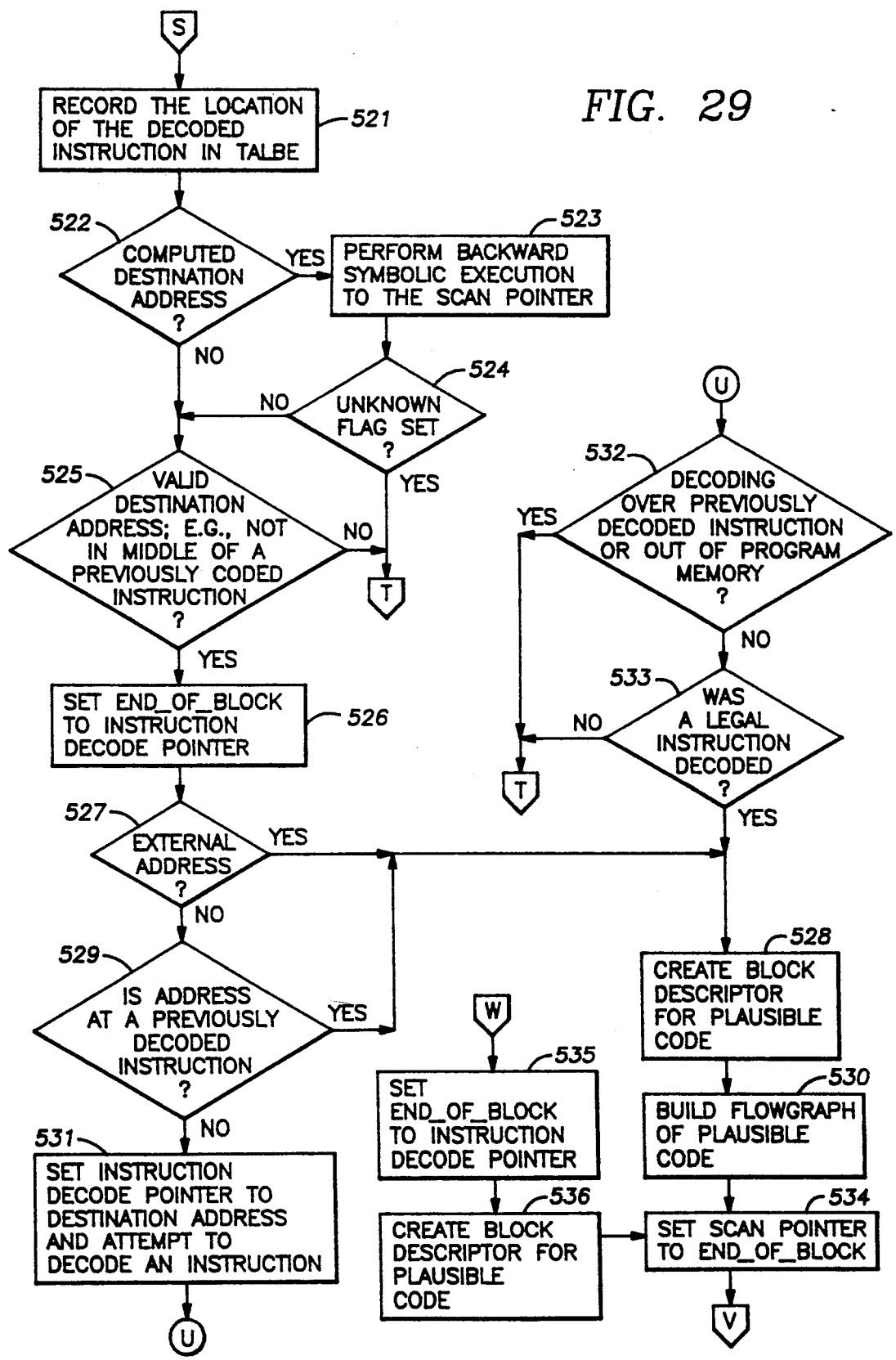

Turning now to FIGS. 28 and 29, there is shown a flowchart of a procedure that performs the scan for plausible code introduced above with reference to step 164 in FIG. 13 and the instruction memory area 187 of the program memory map 181 in FIG. 14. The result of this scan is to identify "plausible code" areas (197 in FIG. 14) in the instruction memory area (187 in FIG. 14). In particular, the procedure in FIGS. 28 and 29 scans areas of the instruction memory area (187 in FIG. 14) that do not include the areas (194, 195, 196) of memory including decoded instructions that are included in the blocks of the flowgraph. The decoded instructions that are included in the blocks of the flowgraph are more succinctly called "known code". The areas of the instruction memory area (187 in FIG. 14) that do not include known code will be referred to as "unknown code areas". The procedure in FIGS. 28 and 29 therefore scans the "unknown code areas" to find "plausible code". During the scan for plausible code, a flowgraph of the plausible code is built. When the scan for plausible code is finished, in a final step 499 of FIG. 28, the total number of bytes of known code (KNOWN_CODE) is computed by adding together the values of the "byte length" attribute in the basic block descriptors for all of the basic blocks in the flowgraph of known code, and the total number of bytes of plausible code (PLAUSIBLE_CODE) is computed by adding together the values of the "byte length" attribute of the basic block descriptors for all of the basic blocks in the flowgraph of plausible code. Then the percentage of code found is computed according to:

%_CODE_FOUND=KNOWN_CODE/(-KNOWN_CODE+PLAUSIBLE_CODE)

Preferably the scan for plausible code recognizes legal instructions in a variable-length instruction set including instructions that are contained in a variable number of addressable memory locations in the program, and the scan switches between three different scanning modes. In a first scanning mode (steps 500 to 510 in FIG. 28), the unknown code area is scanned for legal instructions starting at each and every addressable memory location in the unknown code area. When a legal instruction is found in the first scanning mode, the scan switches to a second scanning mode (steps 511 to 518 in FIG. 28) of inspecting addressable memory locations immediately following the legal instruction found in the first scanning mode. The second scanning mode searches for a full block of instructions having of a series of consecutive legal instructions up to and including an execution transfer instruction. If an illegal instruction is found during this second scanning mode, then the scan switches back to the first scanning mode, starting at the addressable memory location immediately following the first addressable memory location of the legal instruction just previously found in the first scanning mode. If an illegal instruction is not found during this second scanning mode, then the scan switches to a third scanning mode (steps 521 to 536 in FIG. 29) which checks whether there is a known valid destination address for the execution transfer instruction at the end of the full block, and if so, checks whether there is a valid instruction beginning at the known valid destination address. A known destination address is considered invalid when it is outside of the address range of the program, or when it is in the middle of a previously-found instruction of the program. If the third scanning mode concludes that there is a valid instruction beginning at the known valid destination address, then the full block is considered to be plausible code.

In the first step 500 in FIG. 28, a scan pointer for the first scanning mode is set to the smallest address in the instruction area of memory, and the variables PLAUSIBLE_CODE and KNOWN_CODE cleared. Then scanning begins in step 501. The table (224 in FIG. 17) is indexed by the scan pointer to determine whether the scan pointer points to known code. If so, then the scan pointer is successively incremented in step 503 until either the pointer falls outside the instruction area of memory as tested in step 504, causing the search for plausible code to end, or until the scan pointer points to unknown code. When the scan pointer points to unknown code, execution continues in step 505.

In step 505 the contents of the memory location addressed by the scan pointer are fetched and used as index to a heuristics table having an entry which is compared to zero to determine whether the first scanning mode should skip the memory location addressed by the scan pointer. When scanning for VAX ™ instructions, for example, each addressable location holds a byte of data, and the heuristics table in this case includes 256 different entries.

The heuristics table is pre-programmed based upon the properties and characteristics of the specific instruction architecture, typical data structures, and system architecture associated with the program.

If the instruction architecture has privileged instructions that are not permitted in user-mode programs, then the privileged instructions are skipped in step 506 (or otherwise considered illegal in step 510, if they cannot be detected by look-up in the heuristics table because they cannot be uniquely identified by the contents of a single addressable memory location).

Data structures and other areas of a program which do not include instructions are often cleared. In this case, scanning in the first scanning mode should skip over any addressable memory location containing all zeros.

If the variable-length instruction architecture is highly complex, then it is rather unlikely that an instruction will be contained in a single addressable memory location. The VAX ™ instruction architecture is such a case. In this case, scanning in the first scanning mode should skip over an addressable memory location having contents which are identified as an unlikely instruction contained in a single addressable memory location.

If most of the character data are represented in the program by codes that are also used in the instruction architecture, then the first scanning mode should skip over these codes that are likely to represent strings of character data instead of instructions. Preferably the first scanning mode skips over any string of at least four printable ASCII characters. This test for a string of printable ASCII characters is performed in step 502. If such a character string is found, the scan pointer is incremented in step 503; otherwise execution continues in step 507. In step 502, for example, the data contained at the program address indicated by the scan pointer, and at 1, 2, and 3 plus the scan pointer, are used to index a table including flags that are set to indicate printable ASCII characters, and are otherwise cleared. A character string is found, causing execution to branch to step 503 rather than to continue to step 507, when the data contained at every one of these four program addresses are printable ASCII characters. Step 502 could therefore be coded as:

```
X ← CHARACTER_TABLE
    (PROGRAM(SCAN_POINTER))
IF X.EQ.0 THEN GO TO STEP_507
X ← CHARACTER_TABLE
    (PROGRAM(SCAN_POINTER+1))
IF X.EQ.0 THEN GO TO STEP_507
X ← CHARACTER_TABLE
    (PROGRAM(SCAN_POINTER+2))
IF X.EQ.0 THEN GO TO STEP_507
X ← CHARACTER_TABLE
    (PROGRAM(SCAN_POINTER+3))
IF X.NE.0 THEN GO TO STEP_503
GO TO STEP 507
```

When a memory location is skipped over, the scan pointer is incremented by one address location in step 503. Possibly this will advance the scan pointer out of the unknown code area of memory. In step 504, this is tested by comparing the scan pointer to the maximum limit of the instruction memory area, and if the scan pointer is in the instruction memory area, by indexing the table (224 in FIG. 17) in step 501 to determine whether the scan pointer has advanced into known code. If the scan pointer is advanced out of the instruction memory area, then the scan for plausible code is finished, and the percentage of code found is computed in the final step 499. If the scan pointer is in known code, then execution loops back to step 503 to increment the scan pointer by one memory location, to scan over the known code. If the scan pointer is in unknown code, then execution loops back to step 505 to inspect the contents of the next unknown code memory location.

When the unknown code is not skipped over in step 506, then in step 507 an instruction decode pointer is set to the scan pointer, and in step 508 an attempt is made to decode an instruction. In step 509, for example, the opcode of the instruction is fetched and used as an index to a table holding the number of specifiers and decoding data for the opcode, and each specifier is fetched and decoded. In step 509, the instruction decode pointer is tested in a fashion similar to steps 502 and 504 whenever it is incremented during decoding to determine whether the instruction decode pointer is advanced out of the unknown code area of memory. If so, execution branches to step 503; otherwise, in step 510, execution also branches to step 503 if an illegal instruction opcode or illegal specifiers are detected during decoding.

When steps 508 to 510 decode a legal instruction, then execution continues in the second scanning mode beginning in step 511. In step 511 the entry or entries in the address table (224 in FIG. 17) indexed by the address locations of the decoded instruction and the table entries are marked to indicate the beginning of a plausible code instruction and any middle portions of the decoded instruction. Then in step 512 the address table is also indexed with the address following the decoded instruction to determine whether it is the address of an already decoded instruction; if it is, it should be the beginning of a decoded basic block, in which case the scan for plausible code continues in step 535 of FIG. 29. Otherwise, the scan for plausible code continues in step 513 of FIG. 28.

In step 513 the instruction decode pointer is incremented and an attempt is made to decode another instruction. The decoding process is terminated, however, whenever the instruction decode pointer is advanced out of the unknown code memory area, as tested in step 514, or whenever an illegal opcode or specifier is found, as tested in step 516. When the decoding process is terminated in steps 514 or 516, the table (224 in FIG. 17) is cleared in step 517 of any indications of decoded instructions back to and including the address of the scan pointer, and execution loops back to step 503 to continue scanning in the first scanning mode.

When a legal instruction is decoded in step 516 of the second scanning mode, then in step 518 execution branches back to step 511 unless an execution transfer instruction is decoded, in an attempt to decode additional instructions up to including an execution instruction. When an execution transfer instruction is found in step 518, the third mode of the scan for plausible code begins in step 521 of FIG. 29.

Turning to FIG. 29, in step 521 the entry or entries in the table (224 in FIG. 17) indexed by the address locations of the execution transfer instruction, and the table entries are marked to indicate the beginning of a plausible code instruction and any middle portions of the instruction. In step 522 the destination specifier is tested to determine whether it is a computed destination address; if so, then in step 523 backward symbolic execution may be attempted back to the scan pointer in an attempt to obtain a definite value for the destination. If an unknown value is obtained, as tested in step 524, then execution branches to step 517 of FIG. 28 to reject the full block of code back to the scan pointer and to continue scanning in the first scanning mode.

In step 525 the destination address is checked for validity for example, depending on whether it is an absolute or absolute indirect or relative or relative indirect address, as set out above in FIG. 27. Also, the destination address is considered invalid if it is in the instruction area of memory but in the middle of a previously decoded known or plausible instruction, as indicated by indexing the table (224 in FIG. 17). If the destination address is invalid, then execution branches to step 517 of FIG. 28 to reject the full block of code back to the scan pointer and to continue scanning in the first scanning mode.

In step 526, the variable END_OF_BLOCK is set equal to the instruction decode pointer. In step 527, execution branches to step 528 if the valid destination is a external address. In step 529, execution also branches to step 28 if the valid destination is at the address of a previously decoded instruction, as indicated by indexing the table (224 in FIG. 17). When step 528 is reached, the full block of code going back to the scan pointer is validated as plausible code. Therefore in step 528 a block descriptor is created for the block of plausible code. Included in this basic block descriptor is an attribute "byte length" set to the number of bytes in the block, which is calculated as one plus the difference between the scan pointer and the END_OF_BLOCK.

When step 527 determines that the valid destination address is an internal address and step 529 determines that the internal address is not at a previously decoded instruction, then the destination address must be in an area of instruction memory that is not a previously decoded instruction. If an instruction can be decoded beginning at the destination address, then the previously decoded full block of code is considered to be plausible code; otherwise, the previously decoded full block of code is not considered to be plausible code. Therefore in step 531 the instruction decode pointer is set to the destination address and an attempt is made to decode an instruction. In steps 532 and 533 the decoding process is considered unsuccessful if the instruction decode pointer is advanced to a previously decoded instruction, or if an illegal opcode or specifier is decoded. Otherwise, when a legal instruction is decoded, execution continues to step 528, where a block descriptor is created for the basic block of code from the scan pointer to the address of the execution transfer instruction found in step 518 of FIG. 28.

In step 530 an attempt is made to continue building a flowgraph of plausible code, beginning at the destinations of the execution transfer instruction found in step 518 of FIG. 28. This is done by calling the flowgraph building routine of FIG. 18, beginning at step 236. Preferably, however, the plausible code flowgraph is not commingled with the known flowgraph, so that only known code is translated. Blocks of plausible code, for example, are not be added to the lists of successors and predecessors for blocks of known code, and blocks of known code are not added to the lists of predecessors and successors for the blocks of unknown code. In any event, the basic block descriptors have an attribute identifying a basic block as known code or plausible code.

When the building of the flowgraph of plausible code terminates, it is still possible that some plausible code was not found by the flowgraph building process. Therefore, in step 530, the scan pointer is set to END_OF_BLOCK. In addition, when step 512 of FIG. 28 finds that the execution path from the plausible code runs into a block of known code, scanning for plausible code must also continue to find any more plausible code. In this case, in step 535 the END_OF_BLOCK is set to the instruction decode pointer, and in step 536 a block descriptor is created for the block of plausible code from the scan pointer to the END_OF_BLOCK, but the flowgraph building step 530 is skipped; step 534 is performed after step 536.

At this point the third scanning mode is finished, and scanning is continued in the first scanning mode in step 503 of FIG. 28.

Figure 30:
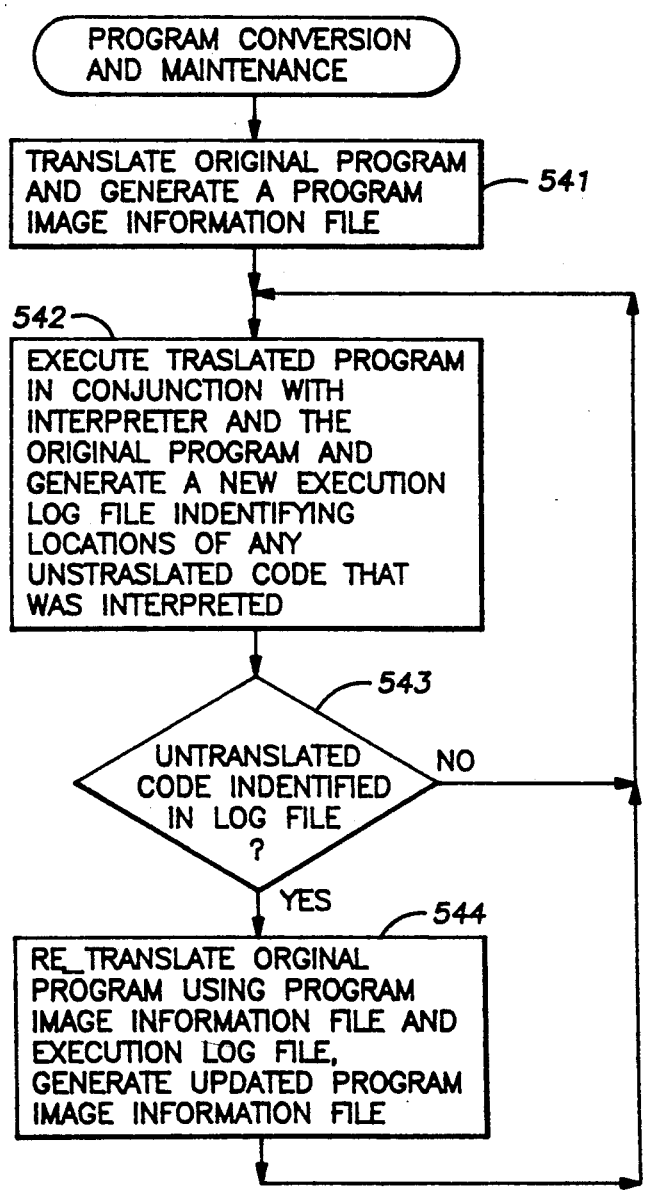
FIG. 30 is a flowchart of a general procedure for program conversion and maintenance by iteratively retranslating an original program with the benefit of an execution log file identifying locations of untranslated program code that was interpreted during program execution.

Turning now to FIG. 30, there is shown a flowchart of a method for using the execution log file (88 in FIG. 9) to assist in locating untranslated instructions in the original program. As introduced above, and as shown in step 541 of FIG. 30, an original program is translated, and the translator generates an image information file for the program. Then in step 542 the translated program is executed (by the RISC computer 50 in FIG. 9) in conjunction with the interpreter and the original program. During this execution, information is recorded in the execution log file whenever execution switches from the translated program to the interpreter in order for the interpreter to determine a computed destination address to untranslated code. The interpreter, for example, records information identifying the origin address in the original program of the execution transfer instruction having the unresolved computed destination address, and the value computed for that destination address in the original program. Preferably this information is in the form of a pair of the origin and destination addresses in the original program.

After execution of the translated program in step 542, the execution log file is inspected in step 543 to determine whether the interpreter was called and determined the location of any untranslated code. If so, then in step 544 the original program is retranslated using the image information file for the program, and the execution log file. Before building the flowgraph, for example, the destination addresses in the execution log file are added to the list of 225 of undecoded blocks. After building the flowgraph, the predecessors of any blocks beginning at the unresolved entry points are inspected to determine whether they include blocks including the respective origin addresses; if not, then linkages to the predecessors are added and backward symbolic execution is re-iterated through these new linkages. Therefore the translator may use the origin addresses as well as the destination addresses to investigate possible execution paths in the original program including paths that were not discovered during the first translation of the original program and were not taken during execution of the translated program or interpretation of the untranslated portions of the original program.

To aid in the successive re-translation of a program, the flowgraph data structure (211 in FIG. 17) and table 224 in the converted program could be stored in a file. In this case, re-translation could begin where the building of the original flowgraph terminated. To continue building the flowgraph, the table 224 is indexed with the origin addresses to find the blocks including them. Then the destination addresses from the execution log file are loaded into the queue (225 in FIG. 17) together with a list of predecessors including the blocks containing their respective origin addresses. Then the building of the flowgraph is restarted at the first step 229 in FIG. 18.

After the original program is re-translated in step 544, the retranslated program is executed in step 542. Preferably this feedback of information from execution to re-translation is performed after each execution of the translated program so that all of the instructions in the original program that are actually located will be translated.

Figure 31:
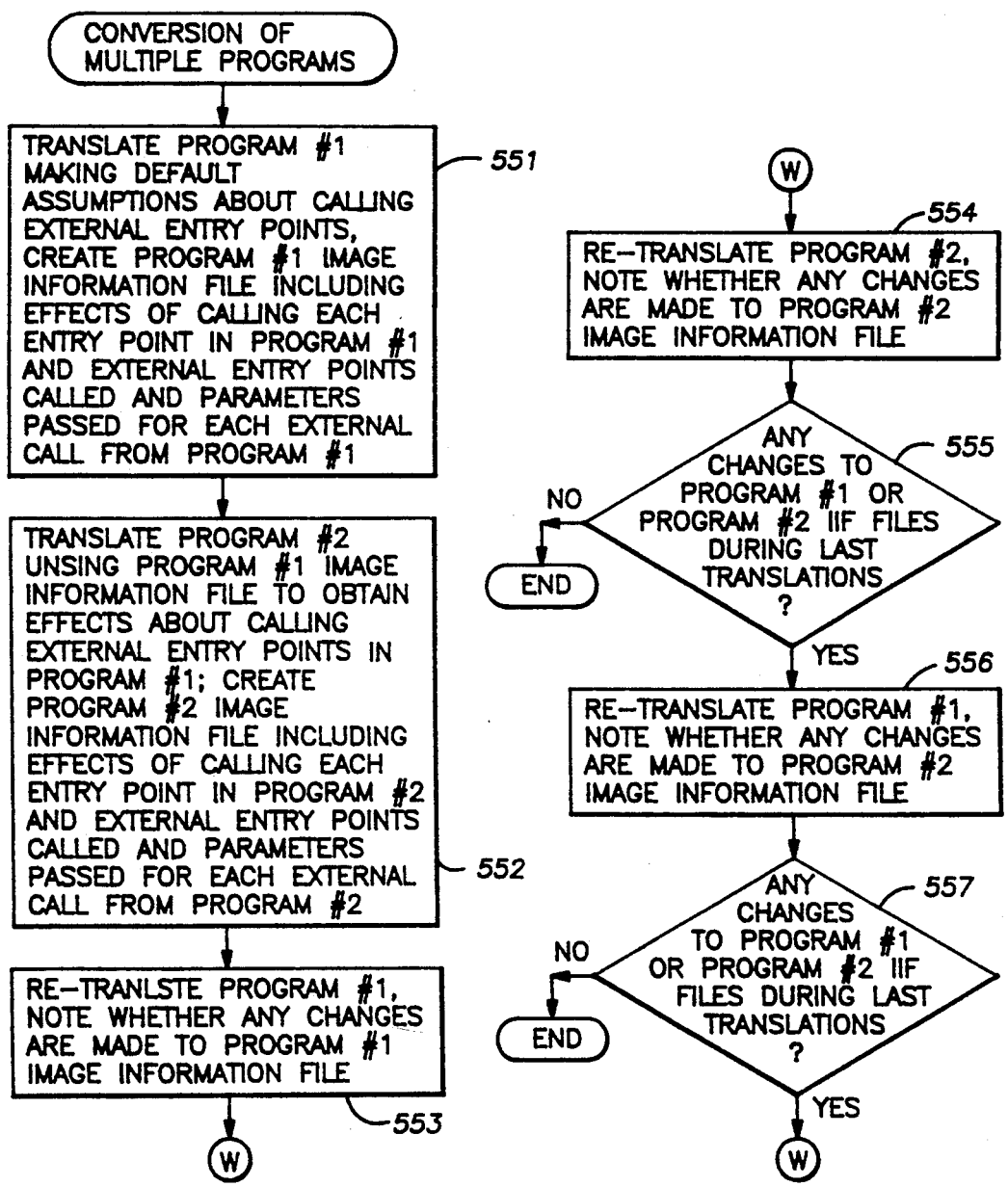
FIG. 31 is a flowchart of a procedure for alternately translating and retranslating two mutually dependent programs and testing for convergence in a situation where the two programs cannot be easily merged or translated together at the same time.

Turning now to FIG. 31, there is shown a procedure for translating mutually dependent programs in situations where it is undesirable or impossible to translate the programs at the same time, for example, in a situation where the data structures shown in FIG. 17 would greatly exceed the capacity of random access memory in the computer performing the translation. Two programs are mutually dependent when they call each other. These mutual dependencies often interfere with the process of locating and translating instructions in the program. In particular, return points must be properly connected, which requires information about the image being called.

As introduced above, image information files generated or updated during translation of original programs are used to store information about the effects of calling each available entry point in the programs. When translating an image, a call to an entry point in another image is translated by using the information recorded about the effects of calling that entry point.

Mutual dependencies, however, may create a situation where the effects of calling an entry point in a second image are dependent on the first image, and are not known until the first image is translated. But the translation of the first image may require information about these effects of calling the entry point in the second image. Such conflicting mutual dependencies arise, for example, in a case where the first image calls the entry point in the second image and passes a procedure-parameter identifying the address of a procedure in the first image, but the second image then calls back to the procedure of the first image. To translate the first image, information about the effects of calling the entry point in the second image should be known, such as the fact that the second image calls back the first image. This information, however, cannot be determined by examining the first image. To translate the second image, information about calling the first image should be known such as the set of possible values of the procedure-parameter passed during the call-back to the first image, and the effects of the call-back for each possible value of the procedure parameter. This information, however, cannot be determined by examining the second image. Therefore a conflicting situation arises where each image should be translated before the other image for the translations to have all of the required information.

As shown in FIG. 31, the conflict due to mutual dependencies is resolved by multiple translations. During the translation of a first program (PROGRAM#1) in step 551, the translator finds that there is no information regarding the effects of calling the entry points of a second program (PROGRAM#2), because the second program has not yet been translated. The translator therefore makes default assumptions about the calls to the entry points of the second program, such as a normal return and no callbacks. When the second program is translated in step 552, the translator determines that the second image does have call-backs, which is contrary to the default assumptions.

As shown in steps 553 to 557 in FIG. 31, a process of iterative retranslation could be used in which the image information files are used to pass new information discovered during the prior translation of one program to the retranslation of the other. Steps 555 and 556 terminate the process of iterative retranslation when a condition of strict convergence occurs. Strict convergence occurs when each of the two programs is retranslated in alternate sequence until no change occurs in the image information files. Convergence, however, can be assured with fewer translations by sensing when no relevant changes have occurred in the image information files.

An assumption underlying the simplification of the test for strict convergence is that a second translation of an individual program will not change when it is retranslated with its image information file generated during its initial translation. With this assumption, one may conclude that the translation of the second program will affect the retranslation of a first program only if image information about the second program changes in a way that is relevant to the translation of the first program.

Figure 32:
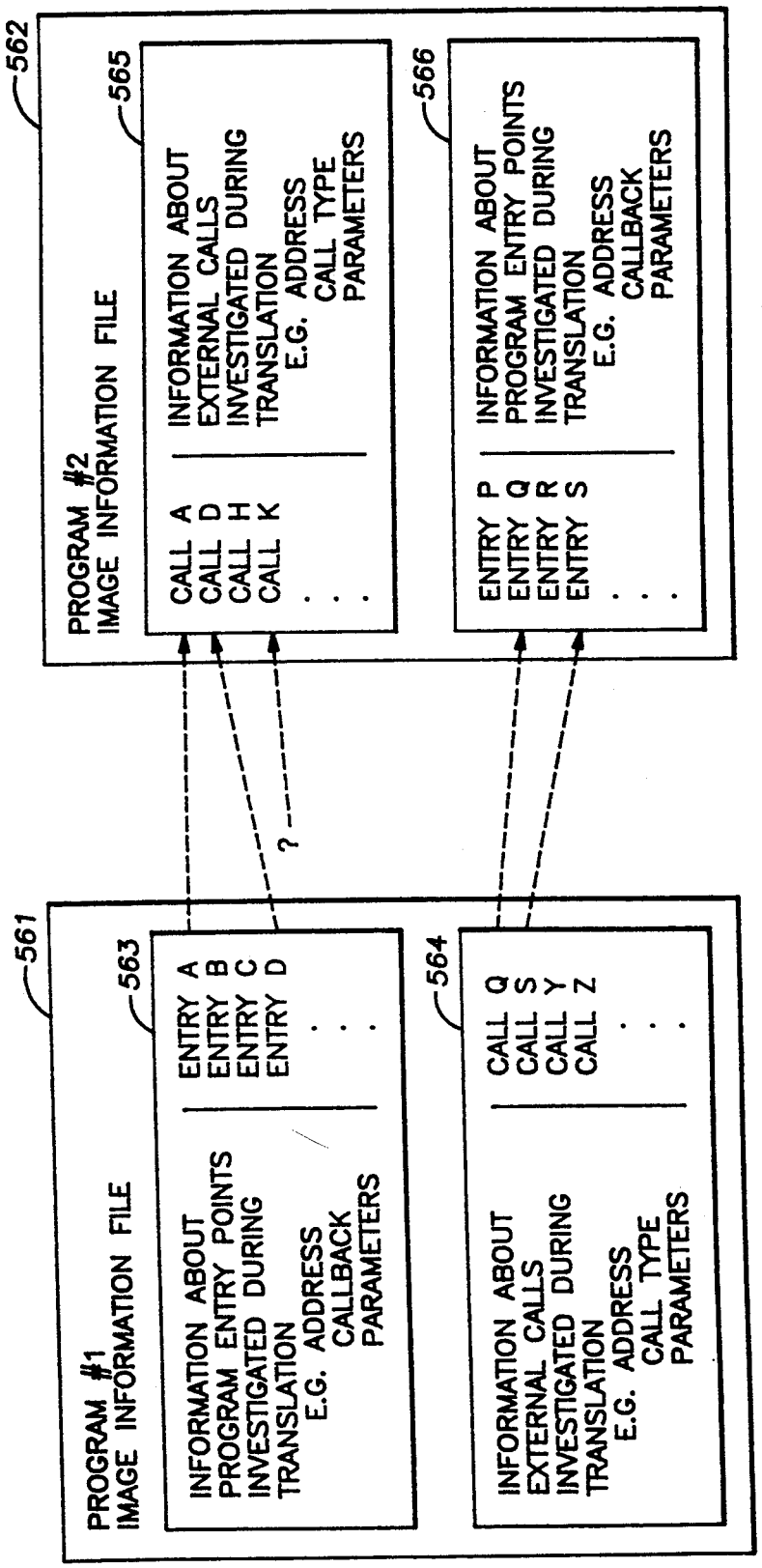
FIG. 32 is a block diagram of image information files for two mutually dependent programs and showing linkages between the files.

Turning now to FIG. 32, there are shown in FIG. 32 an image information file 561 for the first program and an image information file 562 for the second program just after the initial translation of the first program and initial translation of the second program. The image information file 561 for the first program includes information about first program entry points (ENTRY A, ENTRY B, ENTRY C, ENTRY D, ...) investigated during initial translation of the first program. This information may include, for each entry point, the address of entry point, and any callback parameters associated with that entry point, that were discovered in step 372 of FIG. 24 and recorded in the image information file 561 in step 373 of FIG. 24 during translation. In addition, the image information file 561 includes information 564 about calls (CALL Q, CALL S, CALL Y, CALL Z) from the first program to external entry points in other programs, which was recorded in the image information file 561 in steps 256, 258 or 259 of FIG. 19 during translation. This information may include, for example, the external destination address of the call, the type of call (e.g., CALLS or CALLG), the number of parameters associated with the call, and any definite values of the parameters. Definite values of the parameters, for example, might be obtained by backward symbolic execution from the call instructions. In a similar fashion, the second program includes information 565 about calls (CALL A, CALL B, CALL H, CALL K) from the second program to external entry points in other programs, and information 566 about program entry points (ENTRY Q, ENTRY R, ENTRY S), obtained during the initial translation of the second program.

Consider now whether the first program would change if it were retranslated with the benefit of the information in the image information file 562 of the second program. By matching the addresses of the program entry points in information file 561 for the first program with the addresses of the external calls in the image information file 562 for the second program, and by matching the addresses of the external calls in the image information file 561 for the first program with the addresses of the program entry points in the image information file 562 for the second program, the relevant external calls and entry points in the image information file 562 for the second program are identified. If the information about these external calls and program entry points in the image information file 562 for the second program differ in any way from the default assumptions that could affect a retranslation of the first program, then the first program should be retranslated. Moreover, if the image information file 562 has external calls (such as CALL K in FIG. 32) to program #1 that call an untranslated code location in the first program, then the first program should be retranslated, using the address of the untranslated call location as an initial unresolved block entry point. In addition to external calls to untranslated portions of the program under consideration for retranslation, particularly relevant changes include new definite values for call parameters for external calls to entry points in the program under consideration for retranslation because these definite values may be used during retranslation by backward symbolic execution to resolve a destination address to untranslated code in the other program, and new callback parameters for program entry points called by the program under consideration for retranslation because backward symbolic execution of these callback parameters during retranslation may resolve to values of new program entry points in untranslated code in the program under consideration for retranslation.

Figure 33:
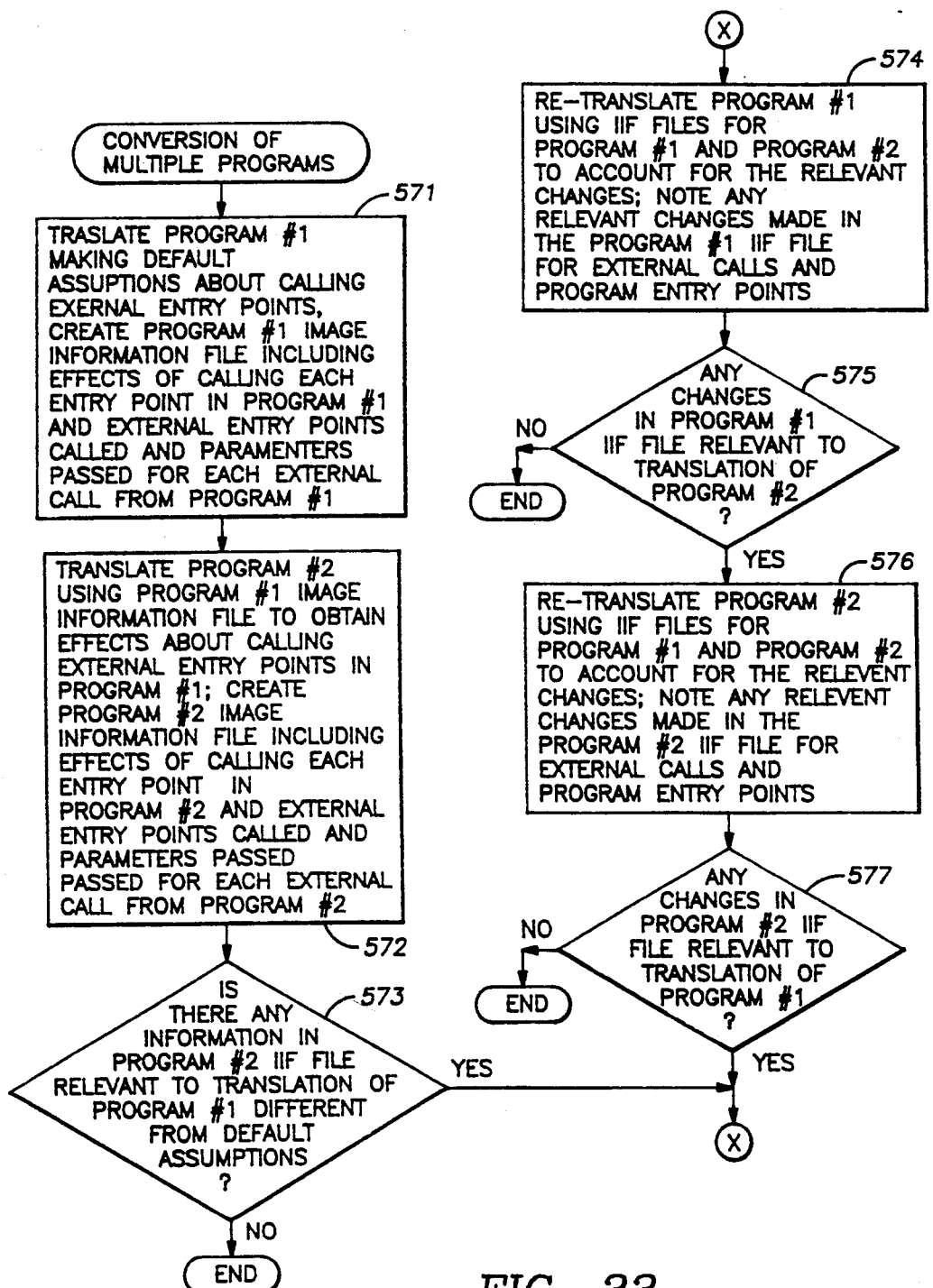
FIG. 33 is a flowchart of a procedure which exploits linkages between the information files for two mutually dependent programs in order obtain rapid convergence when the programs are alternately translated and retranslated.

Turning now to FIG. 33, there is shown a flowchart of a procedure for the alternate iterative translation of two original programs that obtains fast convergence by performing retranslation of one program only after there has been a relevant change in the content of the image information file for the other program. The first step 571 and the second step 572 are the same as the first step 551 and the second step 552 in the procedure of FIG. 31. In the third step 573 of FIG. 33, however, the relevant entries in the image information file (562 in FIG. 32) for the second program are inspected for any changes from the default assumptions that might possibly affect retranslation of the first program, as discussed above with reference to FIG. 32. If any such changes are discovered, then the first program is re-translated in step 574; otherwise, no re-translation of the first program or the second program is needed.

During the re-translation of the first program in step 574, changes made to the external call and program entry point information in the image information file for the first program are noted, for example by flagging the changed entries and keeping copies of the old entries, or by flagging new entries. After the re-translation of the first program, then in step 575 the relevant changed entries in the image information file (561 in FIG. 32) for the first program are inspected for any changes that might possibly affect retranslation of the second program, as discussed above with reference to FIG. 33. If any such changes are found, then the second program is re-translated in step 576; otherwise no re-translation of the first program or the second program is needed.

During the re-translation of the second program in step 577, changes made to the external call and program entry point information in the image information file for the second program are noted, for example by flagging the changed entries and keeping copies of the old entries, or by flagging new entries. After the re-translation of the second program, then in step 577 the relevant changed entries in the image information file (562 in FIG. 32) for the second program are inspected for any changes that might possibly affect retranslation of the first program, as discussed above with reference to FIG. 32. If any such changes are found, then the first program is re-translated in step 574; otherwise no re-translation of the first program or the second program is needed.

This process of multiple translations and checked assumptions may iterate a number of times, but eventually the process will converge. In many cases, the process will converge upon an accurate description of each image, and then further retranslation will not be necessary. A runtime library, for example, typically includes a collection of images that have mutual dependencies among themselves, but which are called by user programs at specified entry points and do not have mutual dependencies with the user-programs. In this case the process of multiple translations and checked assumptions will converge upon an accurate description of each image, including complete information about the effects of calling each image at the specified entry points. A file including this information can be used for the translation of user programs, without requiring any retranslation of the runtime library images.

Although the invention has been described above in connection with a CISC-to-RISC code translator, the invention is also very useful for translating CISC code of one programming language to CISC code of another programming language, for example, to transport a program from one kind of digital computer to another kind of digital computer, or to transport a program from one kind of operating system to another kind of operating system. Moreover, the analysis and error checking features of the invention can be used for testing and debugging a program without translating it.

APPENDIX A

INTERMEDIATE CODE REPRESENTATION

Data Access Tuples

1. LITREF (Literals)

Literals values are represented with LITREF tuples, whose reference attributes point to literal nodes in the symbol table. The node may be for a named literal (such as SYM$LOFFSET), or a constant such as zero or one.

A LITREF may only appear as a source operand.

| Examples: Source | | Intermediate Representation | | |
|---|---|---|---|---|
| .WORD | 1 | L01: | litref | [#1] |
| | | L02: | data.uint16 | (L01) |
| push1 | #512 | L01: | litref | [#512] |
| | | L02: | instr | [push1] (L01) |

2. REGREF (Registers)

Direct register references are represented with REGREF tuples. These contain only a register number attribute, and can be used directly either as source or destination operands.

In the tuples, the register number is not the register number used in the source; it is one of the set of mtu__reg__k__* constants, which are defined for the RISC computer registers R0–R31, AP, FP, and SP.

The REGREF tuple has a symbol node attribute which can be used to associate a symbolic name with this register instance. It also has attributes used by the code generator.

| Examples: Source | | Intermediate Representation | | |
|---|---|---|---|---|
| push1 | r0 | L01: | regref | [r0] |
| | | L02: | instr | [push1] (L01) |
| pop1 | r0 | L01: | regref | [r0] |
| | | L02: | instr | [pop1] (L01) |

3. MEMREF/FETCH (Non-symbolic Memory References)

Most operands in MACRO code are memory references through registers.

The MEMREF tuple is used to represent these, and has two components; a base register operand, and an optional offset operand. The base register operand is always the address of a REGREF tuple. If present, the offset operand is a pointer to either a LITREF, SYMREF, or COMP_OP tuple. If the offset operand is not specified, an offset of zero is assumed.

The value of a MEMREF tuple is the address of the specified memory location. To refer to memory in a source operand, a FETCH tuple should be used to indicate the value at the location is needed. MEMREF can be used directly as a destination operand, or as the source in a MOVAx or similar instruction. This implies that the MACRO compiler front end will need to distinguish address-context references from value-context references, which could be a straightforward table lookup on instruction type and operand number. For modify operands, such as the designation of an INCL instruction, the address-context form should be used.

FETCH is also used on IDXREF and SYMREF tuples, described below:

The MEMREF tuple contains three flags which may be set to further qualify the references:
DEFERRED, which indicates an additional level of indirection. For example, @offset(Rn).
AUTOINCREMENT, which indicates a post-increment of the base register.
AUTODECREMENT, which indicates a pre-decrement of the base register. This cannot be specified with DEFERRED, or with AUTOINCREMENT.

SP, FP, and AP based references are all represented as MEMREF operands.

The MEMREF tuple has a symbol node attribute which can be used to associate a symbol name with this memory location. It also has attributes that can be used by the code generator to optimize multiple references to the same base location.

| Examples: Source | | | Intermediate Representation | |
|---|---|---|---|---|
| push1 | (r0) | L01: | regref | [r0] |
| | | L02: | memref | (L01) |
| | | L03: | fetch | (L02) |
| | | L04: | instr | [push1] (L03) |
| push1 | @(r0)+ | L01: | regref | [r0] |
| | | L02: | memref | [deferred, autoinc] (L |
| | | L03: | fetch | (L01) |
| | | L04: | instr | [push1] (L02) |
| pop1 | 4(r0) | L01: | litref | [#4] |
| | | L02: | regref | [r0] |
| | | L03: | memref | (L02, L01) |
| | | L04: | instr | [pop1] (L03) |
| push1 | @foo(sp) | L01: | symref | [foo] |
| | | L02: | regref | [sp] |
| | | L03: | memref | [deferred] (L02, L01) |
| | | L04: | fetch | (L03) |
| | | L05: | INSTR | [push1] (L04) |

4. SYMREF (Symbol Table Reference)

The SYMREF tuple is used for representing a reference to an item with a symbolic name. The name "SYMREF" should be understood to mean "SYMbol table REFerence" rather than "SYMbol node REFerence," because the symbol table node it points to may be a Symbol Node, External Node, Label Node, or Routine Node.

The value of the tuple is the value of the symbol. For Symbol nodes, this implies that a FETCH is not used to get the symbol's value. Symbol nodes are like Literal nodes in this respect; they are simply symbolic names for some compile-time value.

For External, Label, and Routine nodes, a FETCH may be required depending on the context. An address or immediate mode reference will not require a FETCH. (Immediate mode references are only legal on Externals). For value references, a FETCH of the SYMREF is required. For example, a branch to an External, Label, or Routine will use the SYMREF directly. A MOVL instruction of the value at some Label, for example, will use a FETCH of the SYMREF.

A DEFERRED flag in the SYMREF tuple can be used to indicate indirection. This flag is only usable on SYMREFs of External and Label nodes.

| Examples: Source | | | | Intermediate Representation |
|---|---|---|---|---|
| AD-DRESS | foo_label | L01: | symref | [foo_label] |
| | | L02: | data_addr | (L01) |
| push1 | foo_label | L01: | symref | [foo_label] |
| | | L02: | fetch | (L01) |
| | | L03: | instr | [push1] (L01) |
| brb | foo_label | L01: | symref | [foo_label] |
| | | L02: | branch | (L01) |
| calls | #1, foo_rout | L01: | litref | [#1] |
| | | L02: | symref | [foo_rout] |
| | | L03: | calls | (L02, L01) |
| push1 | #foo_val | L01: | symref | [foo_val] ! external |
| | | L02 | instr | [push1] (L01) |

Label And Entry Point Tuples

1. LABEL

A LABEL tuple represents a branch target within a routine. The label symbol to which it refers is also pointed to by SYMREF tuples used as target operands of branch tuples.

Labels declared with the UNWIND_TARGET directive in the source are represented with normal LABEL tuples. An UNWIND_TARGET flag is set in the tuple, however.

| Examples: Source | | | | Intermediate Representation |
|---|---|---|---|---|
| foo: | push1 #0 | L01: | label | [foo] |
| | | L02: | litref | [#0] |
| | | L03: | instr | [push1] (L02) |
| foo:: | .unwind_target | L01: | label | [foo, unwind_target] |

2. JSB_ENTRY, CALL_ENTRY, IO_INTERRUPT_ENTRY, EXCEPTION_ENTRY

Entry Point Directive tuples flag the start of routines declared with one of the JSB_ENTRY, CALL_ENTRY, IO_INTERRUPT_ENTRY, or EXCEPTION_ENTRY directives in the source. The tuple points to an MTU Entry node for the declared routine.

The MTU Entry node contains the register usage and other information specified in the source directive.

| Examples: Source | | | Intermediate Representation |
|---|---|---|---|
| foo:: | .jsb_entry | L01: | jsb_entry [foo] |
| foo:: | .call_entry | L01: | call_entry [foo] |

Control Flow Tuples

1. BRANCH

BRANCH tuples specify a branch to either a specific target label, or an indirect branch through a memory location. The first operand must be the address of either a SYMREF tuple identifying a Label Symbol node, or a value-producing tuple specifying the branch address (REGREF or FETCH).

BRANCH tuples are used for BRB, BRW, and JMP instructions.

Note that for the indirect branch case, the code generator will produce a JSB rather than a branch.

Examples:

| Source | | Intermediate Representation | | |
|---|---|---|---|---|
| brb | foo | L01: | symref | [foo] |
| | | L02: | branch | (L01) |
| jmp | bar | L01: | symref | [bar] |
| | | L02: | branch | (L01) |
| jmp | 4(R10) | L01: | litref | [#4] |
| | | L02: | regref | [r10] |
| | | L03: | memref | (L01, L02) |
| | | L04: | fetch | (L03) |
| | | L05: | branch | (L04) |

2. CALLS/CALLG

CALLS and CALLG tuples correspond to a VAX ™ call instruction to the routine specified in the first operand, which is a symbol or memory reference. The second operand is either a parameter count (for CALLS) or the address of the parameter list for CALLG.

Examples:

| Source | | Intermediate Representation | | |
|---|---|---|---|---|
| calls | #2, foo | L01: | litref | [#2] |
| | | L02: | symref | [foo] |
| | | L03: | calls | (L02, L01) |
| callg | (ap), (r10) | L01: | regref | [ap] |
| | | L02: | regref | [r10] |
| | | L03: | memref | (L01) |
| | | L04: | memref | (L02) |
| | | L05: | callg | (L04, L03) |

3. RETURN

The RETURN tuple corresponds to a VAX ™ return instruction.

The analyzer will further tag the RETURN tuple with a symbol node for the routine being returned from, and with a flag indicating whether the interpreter must be called to emulate the return.

Examples:

| Source | Intermediate Representation | | |
|---|---|---|---|
| ret | L01: | | return |

4. JSB

The JSB tuple corresponds to a VAX ™ JSB or BSBx instruction. It has a single operand which is either a SYMREF pointing to a symbol node address, or a value producing tuple representing an indirect JSB target.

Examples:

| Source | | Intermediate Representation | | |
|---|---|---|---|---|
| bsbw | foo | L01: | symref | [foo] |
| | | L02: | jsb | (L01) |
| jsb | (r10) | L01: | regref | [r10] |
| | | L02: | memref | .(L01) |
| | | L03: | jsb | (L02) |

5. RSB/REI

The RSB and REI tuples corresponds to a VAX ™ RSB and REI instructions, respectively.

The analyzer will further annotate these tuples with a pointer to the symbol node for the routine being returned from.

Examples:

| Source | Intermediate Representation | | |
|---|---|---|---|
| rsb | L01: | | RSB |

6. CONDBR

The CONDBR tuple is used to represent all VAX ™ conditional branch instructions. The tuple has an opcode attribute (specifying the VAX ™ branch opcode), and a destination operand which is the address of either a SYMREF tuple pointing to a symbol node, or a value-producing tuple representing an indirect destination. The presence of additional optional operands is dependent on the conditional branch type. For example, BLEQ would have no additional operands, while BLBC would have an operand specifying the item to be tested, and BBS would have two additional operands.

The following table shows the conditional branch types and required additional parameters. The Type column indicates the allowed operand types for the operand; "Value" indicates that LITREF, SYMREF (of compile time Symbol), COMP_OP, REGREF, and FETCH (of SYMREF, MEMREF, or IDXREF) are allowed, while "Addr" indicates that REGREF, SYMREF, MEMREF, and IDXREF are allowed. Operand 1 is always the branch destination.

| Branch | Op 2 | Type | Op 3 | Type | Op 4 | Type | Comment |
|---|---|---|---|---|---|---|---|
| ACBx | Limit | Value | Addend | Value | Index | Addr | |
| AOBxxx | Limit | Value | Index | Addr | | | |
| B (cc) | | | | | | | BBEQ, |
| BBx | Pos | Value | Base | Addr | | | |
| BBxx | Pos | Value | Base | Addr | | | BBSS, |
| BBxxI | Pos | Value | Base | Addr | | | BBSSI/ |
| BLBx | Src | Value | | | | | |
| SOBxxx | Index | Addr | | | | | |

Examples:

| Source | | Intermediate Representation | | |
|---|---|---|---|---|
| acbl | #10,#1,r0,10$ | L01: | litref | [#10] |
| | | L02: | litref | [#1] |
| | | L03: | regref | [r0] |
| | | L04: | symref | [10$] |
| | | L05: | condbr | [acbl](L04, L01, L02, |
| aobleq | #10,4(r0),10$ | L01: | litref | [#10] |
| | | L02: | litref | [#4] |
| | | L03: | memref | [r0] (L02) |
| | | L04: | symref | [10$] |
| | | L05: | condbr | [aobleq] (L04, L01, L0 |
| bleq | 10$ | L01: | symref | [10$] |
| | | L02: | condbr | [bleq] (L01) |

| | | | | |
|---|---|---|---|---|
| blbc | g foo$flag,(r0) | L01: | symref | [foo$flag] |
| | | L02: | fetch | (L01) |
| | | L03: | regref | [r0] |
| | | L04: | condbr | [blbc] (L03, L02) |
| bbs | #<base+bit., r0, 4(r10) | | | |
| | | L01: | symref | [base] |
| | | L02: | symref | [bit] |
| | | L03: | comp_op | [add] (L01, L02) |
| | | L04: | regref | [r0] |
| | | L05: | litref | [#4] |
| | | L06: | regref | [r10] |
| | | L07: | memref | (L06, L05) |
| | | L08: | fetch | (L07) |
| | | L05: | condbr | [bbs] (L08, L03, L04) |

Instruction Tuples

1. INSTR

The INSTR tuple is the way all other MACRO instructions are represented. Its instruction attribute is a constant signifying the opcode, and its operands represent the instruction operands. The opcode constant is normally one of the mtu_vax_k_* values, which represent VAX ™ opcodes. It may also be one of mtu_evax_k_*, which represent built-ins for RISC-specific The set of operand types allowed is instruction dependent. In general, LITREF, SYMREF, COMP_OP, REGREF, and FETCH (of SYMREF, MEMREF, or IDXREF) operators are allowed for operands whose values are used, while REGREF, SYMREF, MEMREF, and IDXREF are allowed for operands whose addresses are used. For "modify" type operands, such as the destination in an "INCx" instruction, the address form should be used.

The INSTR tuple has condition code usage flags which provide the code generator with this information computed by the analyzer. They will specify whether the N and Z, C, and/or V bit values must be simulated by the code generated by the current instruction. An additional "local NZ" bit is set if the only use of N/Z is by one or more conditional branch instructions which immediately follow. This allows the code generator to use the result value directly, in some cases.

Examples:
| Source | | | | |
|---|---|---|---|---|
| | | | Intermediate Representation | |
| incl | 4(r0) | L01: | litref | [#4] |
| | | L02: | regref | [r0] |
| | | L03: | memref | (L02, L01) |
| | | L04: | instr | [incl] (L03) |
| add13 | r0,foo$1_value,(sp)+ | | | |
| | | L01: | regref | [r0] |
| | | L02: | symref | [foo$1_value] |
| | | L03: | fetch | (L02) |
| | | L04: | regref | [sp] |
| | | L05: | memref | [autoincrement] (L04) |
| | | L06: | instr | [add13] (L01 , L03, L05 |
| movc5 | (r0),4(r0),#32,foo$w_buf_len,foo$r_buffer | | | |
| | | L01: | regref | [r0] |
| | | L02: | memref | (L01) |
| | | L03: | fetch | (L02) |
| | | L04: | litref | [#4] |
| | | L05: | regref | [r0] |
| | | L06: | memref | (L05, L04) |
| | | L07: | fetch | (L06) |
| | | L08: | litref | [#32] |
| | | L09: | symref | [foo$w_buf_len] |
| | | L10: | fetch | (L09) |
| | | L11: | symref | [foo$r_buffer] |
| | | L12: | instr | [movc5] (L03,L07,L08,L10, |
| insque | 8(r0),foo$q_head | | | |
| | | L01: | litref | [#8] |
| | | L02: | regref | [r0]* |

Examples:
| Source | | Intermediate Representation | |
|---|---|---|---|
| L03: | memref | (L02, L01) | |
| L04: | symref | [foo$q_head] | |
| L05: | instr | [insque] (L03, L04) | |

What is claimed is:

1. A method of operating a digital computer having an addressable memory, said addressable memory containing a computer program, said computer program including instructions and data at respective address locations of said addressable memory, each of said instructions consisting of contents of a variable number of contiguous ones of said address locations depending upon an operation specified by said each of said instructions, said method identifying address locations of said addressable memory that appear to contain said instructions of said computer program, said method comprising the steps of:

a) selecting program addresses in numerical sequence, and attempting to decode an instruction in said addressable memory at each program address until an initial instruction is decoded; and when said initial instruction is decoded, then b) attempting to decode a string of instructions immediately following said initial instruction until an execution transfer instruction is decoded, and when an attempt to decode an instruction fails, continuing said selecting program addresses and said attempting to decode an instruction at each program address as set out in said step a), and when an execution transfer instruction is decoded, then c) attempting to decode an instruction at a destination address of the decoded execution transfer instruction, and when the attempt to decode an instruction at the destination address of the decoded execution transfer instruction fails, continuing said selecting program addresses and said attempting to decode an instruction at each program address as set out in step a), and when the attempt to decode an instruction at the destination address of the decoded execution transfer instruction succeeds, then identifying, as said address locations of said addressable memory that appear to contain said instructions of said computer program, the address locations including said initial instruction and said string of instructions including said execution transfer instruction.

2. The method as claimed in claim 1, wherein program addresses are selected in numerical sequence in step a) by a scan pointer, and program addresses are selected in step b) by an instruction decode pointer for decoding the instructions.

3. The method as claimed in claim 1, further comprising the step of building a flowgraph of instructions by continuing to decode instructions in execution paths continuing from the destination of said execution transfer instruction when step c) decodes an instruction at said destination address of said decoded execution transfer instruction.

4. The method as claimed in claim 1, wherein said instructions include instructions having opcodes and variable-length specifiers used with the same opcodes, and wherein attempts to decode some of said instructions fail because specifiers required for opcodes of said some of said instruction are not decoded.

5. The method as claimed in claim 1, wherein some program addresses of said computer program are known to contain instructions, and wherein said step a) skips over the program addresses that are known to contain instructions.

6. The method as claimed in claim 1, wherein some program addresses of said computer program are known to contain instructions, and wherein the decoding of an instruction is not permitted when an instruction being decoded partially overlaps program addresses known to contain an instruction.

7. The method as claimed in claim 6, wherein an estimate of the fraction of known instructions in said computer program is computed as the ratio of the number of program addresses known to contain instructions to the sum of the number of program addresses known to contain instructions and the number of other program addresses in said program that contain instructions in execution paths including instructions decoded in both steps a) and b) and for which said execution transfer instruction has a valid destination address.

8. The method as claimed in claim 1, wherein some program addresses of said computer program are known to contain instructions, and further comprising a step d) of identifying, as said address locations of said addressable memory that appear to contain said instructions of said computer program, the address locations including said initial instruction and said string of instructions including said execution transfer instruction when said destination address of said decoded execution transfer instruction is a program address known to contain an instruction.

9. The method as claimed in claim 1, wherein said step a) skips over a program address containing a value that is included in a predefined set of values, regardless of whether an attempt to decode an instruction starting at the program address would be successful.

10. The method as claimed in claim 9, wherein said set of values includes values that indicate instructions having a length of one program address location.

11. The method as claimed in claim 9, wherein said set of values includes opcodes of privileged instructions.

12. The method as claimed in claim 9, wherein said set of values includes the value of zero.

13. The method as claimed in claim 1, wherein said step a) skips over a program address that is the first address of a string of alphanumeric characters.

14. The method as claimed in claim 13, wherein said string of alphanumeric characters includes at least four printable ASCII characters.

15. A digital computer system for identifying instructions that appear to be true instructions of a computer program; said digital computer system comprising an addressable memory, said addressable memory containing said computer program, said computer program including data and said instructions of said computer program at respective address locations of said addressable memory, each of said instructions consisting of contents of a variable number of contiguous ones of said address locations depending upon an operation specified by said each of said instructions, said digital computer system further comprising:
first means for selecting program addresses in numerical sequence,
second means for attempting to decode an instruction at each program address selected by said first means for selecting and for indicating when an initial instruction is decoded,
third means, activated when said second means decodes an initial instruction, for attempting to decode a string of instructions in said addressable memory immediately following said initial instruction and including an execution transfer instruction, for indicating when an execution transfer instruction is decoded, and for activating said first means for selecting when a string of instructions immediately following said initial instruction and including an execution transfer instruction is not decoded; and
fourth means, activated when third means decodes an execution transfer instruction, for attempting to decode an instruction at a destination address of the decoded execution transfer instruction, and for activating said first means for selecting when an instruction is not decoded at the destination address of the decoded execution transfer instruction, and when an instruction is decoded at the destination address of the decoded execution transfer instruction, then for identifying, as said instructions that appear to be true instructions of said computer program, said initial instruction and said string of instructions including said execution transfer instruction.

16. The digital computer system as claimed in claim 15, further comprising means for building a flowgraph of instructions by continuing to decode instructions in execution paths continuing from the destination of said execution transfer instruction when said fourth means decodes an instruction at said destination address of said decoded execution transfer instruction.

17. The digital computer system as claimed in claim 15, wherein some addresses of said computer program are known to contain instructions of said computer program, and wherein said first means skips over the program addresses that are known to contain instructions of said computer program.

18. The digital computer system as claimed in claim 15, wherein said first means skips over a program address containing a value that is included in a predefined set of values, regardless of whether an attempt to decode an instruction starting at the program address would be successful.

19. The digital computer system as claimed in claim 15, wherein said first means skips over a program address that contains the first character in a string of alphanumeric characters.

20. A method of operating a digital computer having an addressable memory, said addressable memory containing a computer program, said computer program including instructions and data at respective address locations of said addressable memory, each of said instructions consisting of contents of a variable number of contiguous ones of said address locations depending upon an operation specified by said each of said instructions, said method identifying address locations of said addressable memory that appear to contain said instructions of said computer program, said method comprising the steps of:

a) selecting program addresses in numerical sequence, and attempting to decode an instruction in said addressable memory at each program address until an initial instruction is decoded; and when said initial instruction is decoded, then b) attempting to decode a string of instructions immediately following said initial instruction until an execution transfer instruction is decoded, and when an attempt to decode an instruction fails, continuing said selecting program addresses and said attempting to decode an instruction at each program address as set out in said step a), and when an execution transfer instruction is decoded, then c) attempting to decode an instruction at a destination address of the decoded execution transfer instruction, and when the attempt to decode an instruction at the destination address of the decoded execution transfer instruction fails, continuing said selecting program addresses and said attempting to decode an instruction at each program address as set out in step a), and when the attempt to decode an instruction at the destination address of the decoded execution transfer instruction succeeds, then identifying, as said address locations of said addressable memory that appear to contain said instructions of said computer program, the address locations including said initial instruction and said string of instructions including said execution transfer instruction, wherein some program addresses of said computer program are known to contain instructions, and wherein said step a) skips over the program addresses that are known to contain instructions, wherein the decoding of an instruction is not permitted when an instruction being decoded partially overlaps program addresses known to contain an instruction, and wherein said step a) skips over a program address containing a value that is included in a predefined set of values, regardless of whether an attempt to decode an instruction starting at the program address would be successful.

21. The method as claimed in claim 20, wherein said set of values includes values that indicate instructions having a length of one program address location.

22. The method as claimed in claim 20, wherein said set of values includes opcodes of privileged instructions.

23. The method as claimed in claim 20, wherein said set of values includes the value of zero.

24. The method as claimed in claim 20, wherein said step a) skips over a program address that is the first address of a string of alphanumeric characters.

25. The method as claimed in claim 24, wherein said string of alphanumeric characters includes at least four printable ASCII characters.

26. A method of operating a digital computer having an addressable memory, said addressable memory containing a computer program, said computer program including instructions and data at respective address locations of said addressable memory, each of said instructions consisting of contents of a variable number of contiguous ones of said address locations depending upon an operation specified by said each of said instructions, said method identifying address locations of said addressable memory that appear to contain said instructions of said computer program, said method comprising the steps of:

a) selecting program addresses in numerical sequence, and attempting to decode an instruction in said addressable memory at each program address until an initial instruction is decoded; and when said initial instruction is decoded, then b) attempting to decode a string of instructions immediately following said initial instruction until an execution transfer instruction is decoded, and when an attempt to decode an instruction fails, continuing said selecting program addresses and said attempting to decode an instruction at each program address as set out in said step a), and when an execution transfer instruction is decoded, then c) attempting to decode an instruction at a destination address of the decoded execution transfer instruction, and when the attempt to decode an instruction at the destination address of the decoded execution transfer instruction fails, continuing said selecting program addresses and said attempting to decode an instruction at each program address as set out in step a), and when the attempt to decode an instruction at the destination address of the decoded execution transfer instruction succeeds, then identifying, as said address locations of said addressable memory that appear to contain said instructions of said computer program, the address locations including said initial instruction and said string of instructions including said execution transfer instruction, wherein some program addresses of said computer program are known to contain instructions, and wherein said step a) skips over the program addresses that are known to contain instructions, wherein the decoding of an instruction is not permitted when an instruction being decoded partially overlaps program addresses known to contain an instruction, and wherein said step a) skips over a program address containing a value that is included in a predefined set of values, regardless of whether an attempt to decode an instruction starting at the program address would be successful, wherein said set of values includes values that indicate instructions having a length of one program address location, said set of values includes opcodes of privileged instructions, and said set of values includes the value of zero, and wherein said step a) skips over a program address that is the first address of a string of at least four printable ASCII alphanumeric characters.

* * * * *